(12) United States Patent
Guinibert et al.

(10) Patent No.: US 7,762,007 B2
(45) Date of Patent: *Jul. 27, 2010

(54) LAUNDRY APPLIANCE

(75) Inventors: Allen James Guinibert, Auckland (NZ); Russell Joseph Jackson, Auckland (NZ); Geoffrey Simon Frazerhurst, Auckland (NZ)

(73) Assignee: Fisher & Paykel Appliances Limited, Auckland (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 11/739,484

(22) Filed: Apr. 24, 2007

(65) Prior Publication Data

US 2007/0186440 A1 Aug. 16, 2007

Related U.S. Application Data

(62) Division of application No. 10/963,395, filed on Oct. 12, 2004, which is a division of application No. PCT/NZ03/00065, filed on Apr. 10, 2003.

(30) Foreign Application Priority Data

Apr. 10, 2002 (NZ) ..................................... 518290
Apr. 4, 2003 (NZ) ..................................... 525195

(51) Int. Cl.
*F26B 19/00* (2006.01)
*F26B 11/02* (2006.01)
(52) U.S. Cl. .............................. 34/601; 34/603; 34/140; 34/82; 34/235
(58) Field of Classification Search .................. 34/595, 34/601, 603, 140, 72, 82, 235
See application file for complete search history.

(56) References Cited

U.S. PATENT DOCUMENTS

| 2,904,895 | A | | 9/1959 | Bochan |
| 3,009,259 | A | * | 11/1961 | Simpson .................. 34/601 |
| 3,121,621 | A | | 2/1964 | Jackson |
| 3,398,590 | A | | 8/1968 | Campbell et al. |
| 3,514,867 | A | | 6/1970 | Patrick |
| 3,954,241 | A | | 5/1976 | Carlson |
| 3,991,962 | A | | 11/1976 | Kovats |
| 4,262,870 | A | | 4/1981 | Kretchman et al. |

(Continued)

FOREIGN PATENT DOCUMENTS

DE 2915815 11/1980

(Continued)

*Primary Examiner*—Jiping Lu
(74) *Attorney, Agent, or Firm*—Trexler, Buhsnell, Giangiorgi, Blackstone & Marr, Ltd.

(57) ABSTRACT

A laundry appliance includes a cabinet or surround structure with an attachment for a removable front panel and a removable front panel for attachment to the cabinet. The appliance is a drum and a drum support structure supporting the drum for rotation. There is a movement interface between the drum support structure and the cabinet or surround structure, allowing the drum support structure to move between an operating condition within the cabinet and a maintenance condition wherein the drum and drum support structure are at least substantially disposed outside the envelope defined by the cabinet. In the operating condition the drum and support structure are hidden behind the removable front panel. They may be moved out to the maintenance condition after removal of the front panel.

15 Claims, 46 Drawing Sheets

U.S. PATENT DOCUMENTS

| | | | |
|---|---|---|---|
| 4,640,022 | A | 2/1987 | Suzuki et al. |
| 4,770,275 | A | 9/1988 | Williams |
| 4,949,923 | A | 8/1990 | Daily |
| 5,584,549 | A | 12/1996 | Lybarger et al. |
| 5,657,667 | A | 8/1997 | Noga et al. |
| 5,678,430 | A | 10/1997 | Merlin et al. |
| 6,109,562 | A * | 8/2000 | Crone ................... 244/119 |
| 7,225,562 | B2 * | 6/2007 | Guinibert et al. ............ 34/601 |
| 7,257,905 | B2 * | 8/2007 | Guinibert et al. ............ 34/82 |

FOREIGN PATENT DOCUMENTS

| | | |
|---|---|---|
| DE | 19613298 | 7/1997 |
| DE | 29723441 | 11/1998 |
| EP | 026254 | 4/1981 |
| EP | 096017 | 12/1983 |
| EP | 401734 | 12/1990 |
| EP | 483909 | 5/1992 |
| EP | 0943721 | 9/1999 |
| FR | 2478151 | 9/1981 |
| FR | 2717509 | 3/1995 |
| GB | 2292391 | 2/1996 |
| GB | 2297588 | 8/1996 |
| JP | 62-243594 | 10/1987 |
| JP | 1-135394 | 5/1989 |
| JP | 2-128789 | 5/1990 |
| JP | 2-206499 | 8/1990 |
| JP | 2-241486 | 9/1990 |
| JP | 2-274294 | 11/1990 |
| JP | 3-80898 | 4/1991 |
| JP | 5-42295 | 2/1993 |
| JP | 6-23193 | 2/1994 |
| JP | 6-269599 | 9/1994 |
| JP | 10235079 | 9/1998 |
| JP | 2000230608 | 8/2000 |
| SU | 1469221 | 3/1989 |
| WO | WO95/08016 | 3/1995 |
| WO | WO00/28126 | 5/2000 |
| WO | WO00/28127 | 5/2000 |

* cited by examiner

LAUNDRY APPLIANCE

This application is a divisional application of U.S. patent application Ser. No. 10/963,395 filed on Oct. 12, 2004, which is a divisional application of PCT/NZ03/00065 which has an international filing date of Apr. 10, 2003 and was published in English on Oct. 23, 2003 under International Publication Number WO 03/087459. The disclosure of U.S. patent application Ser. No. 10/963,395 is herein incorporated by reference in its entirety.

BACKGROUND TO THE INVENTION

1. Field of the Invention

The present invention relates to laundry appliances and in particular consumer laundry appliances for the drying of damp textile articles, such as items of clothing, towels and bed linen.

2. Summary of the Prior Art

Prior art clothes drying machines are generally of a type having a rotatable metal drum supported within a rectangular cabinet. The rotatable drum includes an open end facing the front of the cabinet and a substantially closed end at the rear of the cabinet. Access is gained to the open end of the drum by opening a door or hatch on the front face of the cabinet.

The prior art clothes dryer has a significant ergonomic disadvantage to a top loading laundry appliance. It is a particular disadvantage when washing has to be transferred from a top loading clothes washing machine to a front loading clothes dryer.

U.S. Pat. No. 3,514,867 describes a drum type clothes dryer including a belt tensioning arrangement enabling reversal.

JP 2-274294 describes an automatic door opening and closing arrangement for a rotary drum which requires stopping the drum at a rotary position for operating a door stopper provided on the drum door. Operation of the door stopper into an engagement released state also brings the drum door into a non-movable state relative to the cabinet.

WO 0028127 describes a laundry appliance including a rotating cylindrical drum with a hatch forming part of the cylindrical surface. The drum is stopped to allow disengagement of the hatch from the drum and engagement relative to the cabinet at the commencement of an opening operation. It is also stopped for the reversed process at the end of a closing operation.

U.S. Pat. No. 5,678,430 describes a top loading automatic washer with the drum provided to rotate on a horizontal axis. The laundry carrying drum has a hinged opening and is retained within a water collection tub with a spring loaded flexible sliding tub door.

EP 483909 describes a device for halting the drum of a top loading horizontal axis laundry machine in a loading and unloading position.

FR 2478151 describes a drum and hatch construction for a top loading horizontal axis washing machine.

WO 00/28126 describes a top loading horizontal axis washing machine wherein user access to the drum is provided by moving the drum at least partially out of a surrounding cabinet to expose an access opening. Rocking, pivoting and sliding arrangements are described.

U.S. Pat. No. 4,262,870 describes a retractable self levelling assembly for supporting a laundry appliance. The assembly has two spaced apart upwardly and outwardly angled slots for slidably receiving pins which connect supporting feet to opposite ends of an adjustable tension bar.

U.S. Pat. No. 4,949,923 describes a self levelling assembly for an appliance with legs slidably received through channels for vertical movement. Each leg is provided with outwardly extending pins engaged within upwardly converging slots of a stabiliser bar.

U.S. Pat. No. 3,954,241 describes a self adjusting levelling assembly for an appliance with includes a pair of mounting brackets each provided with a vertically shiftable, floor engaging leg member. The leg members are interconnected by a cable such that they are free to shift vertically relative to their corresponding brackets in a reciprocal relationship when not supporting a normal proportional share of the weight of the appliance.

U.S. Pat. No. 4,770,275 describes a leveler for a ladder which has a pair of sliding legs telescopically engaged in respect of upright tubes. A wire rope is fixed to upper regions of the legs and extends between the tubes. The wire is engaged with a support guide fixed relative to the ladder structure.

U.S. Pat. No. 3,991,962 describes a self levelling mechanism for an appliance cabinet which includes a polypropylene foot at each corner of the cabinet. Each foot is interconnected by a continuous cable for vertical movement in unison relative to the cabinet and to each other. A locking wedge is provided for each foot for locking each foot in fixed relation with the cabinet.

WO 95/08016 describes a bulk lint collector for a clothes dryer. An annular lint filter rotating with the dryer drum extends from one end of the drum and encircles the dryer door. Lint is collected in a cavity in the dryer door and removable by removing an outer face panel of the door.

SUMMARY OF THE INVENTION

It is an object of the present invention to provide a laundry drying appliance and or associated parts and or associated methods which at least go some way towards overcoming disadvantages of the prior art or which will at least provide the public with the useful choice.

In a first aspect the invention may broadly be said to consist in a laundry appliance including:

a cabinet, base or surround structure, including an attachment for a removable front panel, a removable front panel for attachment to said cabinet, base or surround structure, a drum, a drum support structure supporting said drum for rotation, a movement interface between said drum support structure and said surround structure, allowing said drum support structure to move between an operating condition within said cabinet or surround structure and behind said removable front panel, and a maintenance condition with said removable front panel removed and wherein said drum and said drum support structure are at least substantially disposed outside the envelope defined by said cabinet or surround structure.

In a further aspect the invention may broadly be said to consist in a clothes drying appliance including:

a base structure, a drum, a drum support structure supporting said drum for rotation, a movement interface between said drum support structure and said base structure, an outlet duct supported on said drum support structure and including an inlet end connected with an air outlet of said drum and an outlet end, and an exhaust duct connected with said base structure and including an outlet port outside said base structure and an inlet port positioned to mate with said outlet of said outlet duct with said drum supporting structure in an operating position on said base structure.

In a further aspect the invention may broadly be said to consist in a clothes drying appliance including:
   a base structure,
   a drum,
   a drum support structure supporting said drum for rotation about a horizontal axis,
   a movement interface between said drum support structure and said base structure,
   an inlet duct supported on said drum support and including an outlet end connected with an air inlet of said drum and an inlet end, and
   an inlet air heater is fixed to said base structure and includes a cowling with an outlet end, said outlet end of said cowling positioned to mate with said inlet of said inlet duct with said drum supporting structure in an operating position on said base structure.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

FIG. 10 shows the drum hatch engaging member in a non-engaging position. FIG. 11 shows the drum hatch engaging member in an engaging position.

FIG. 33 illustrates the requirement for complete engagement of the labyrinth arrangements for the lid to fully close.

FIG. 33a also includes the drum hatch track 109 and hatch engaging member 300, illustrating that incomplete closure of the drum hatch maintains connection between the drum hatch and the cabinet.

FIG. 36 is a cross sectional elevation showing an alternative inlet duct seal to that depicted in FIGS. 4 and 4a.

DETAILED DESCRIPTION

Figure 1:
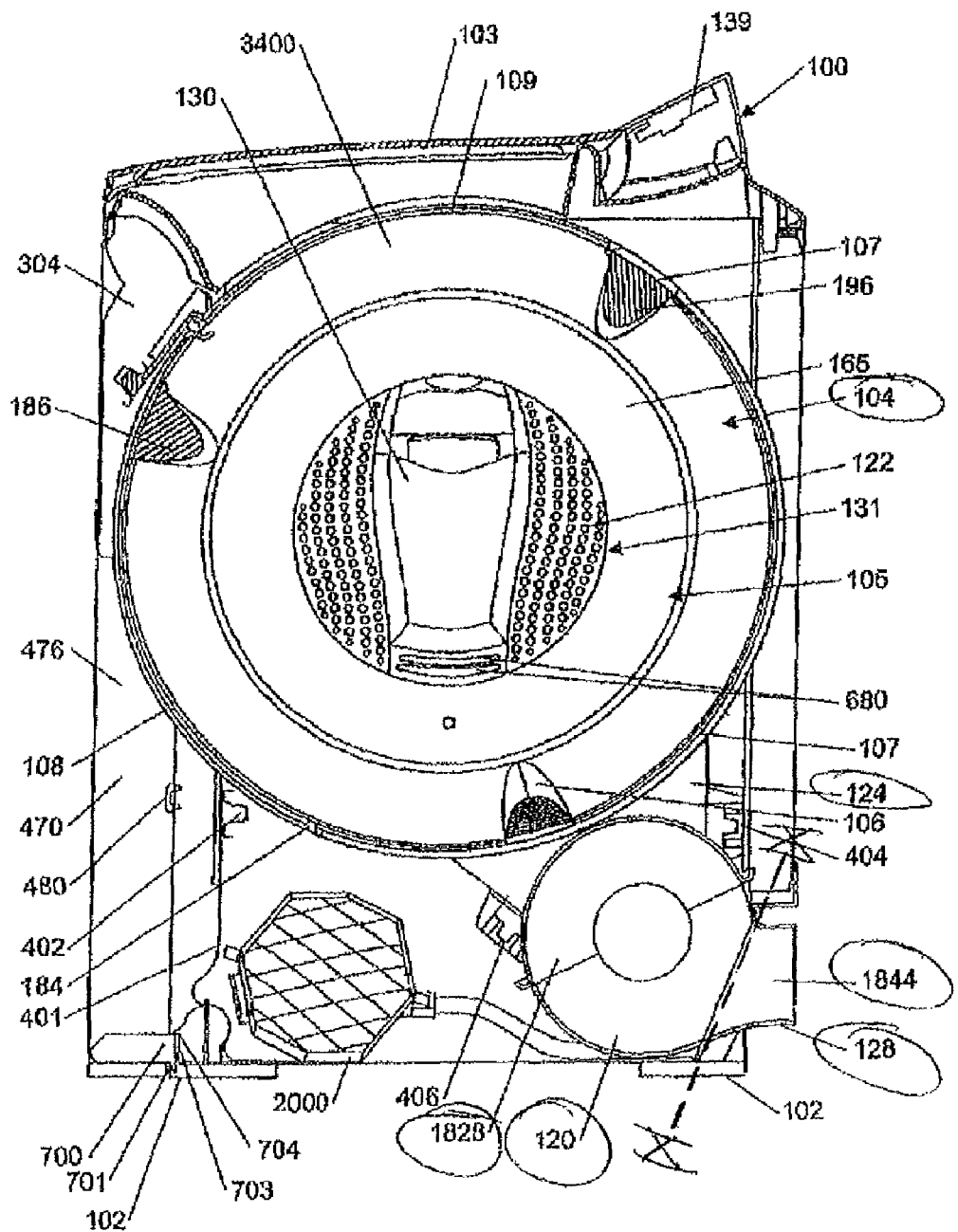
FIG. 1 is a cross sectional side elevation (from the right side) through a clothes dryer according to the preferred embodiment of the present invention.
Figure 2:
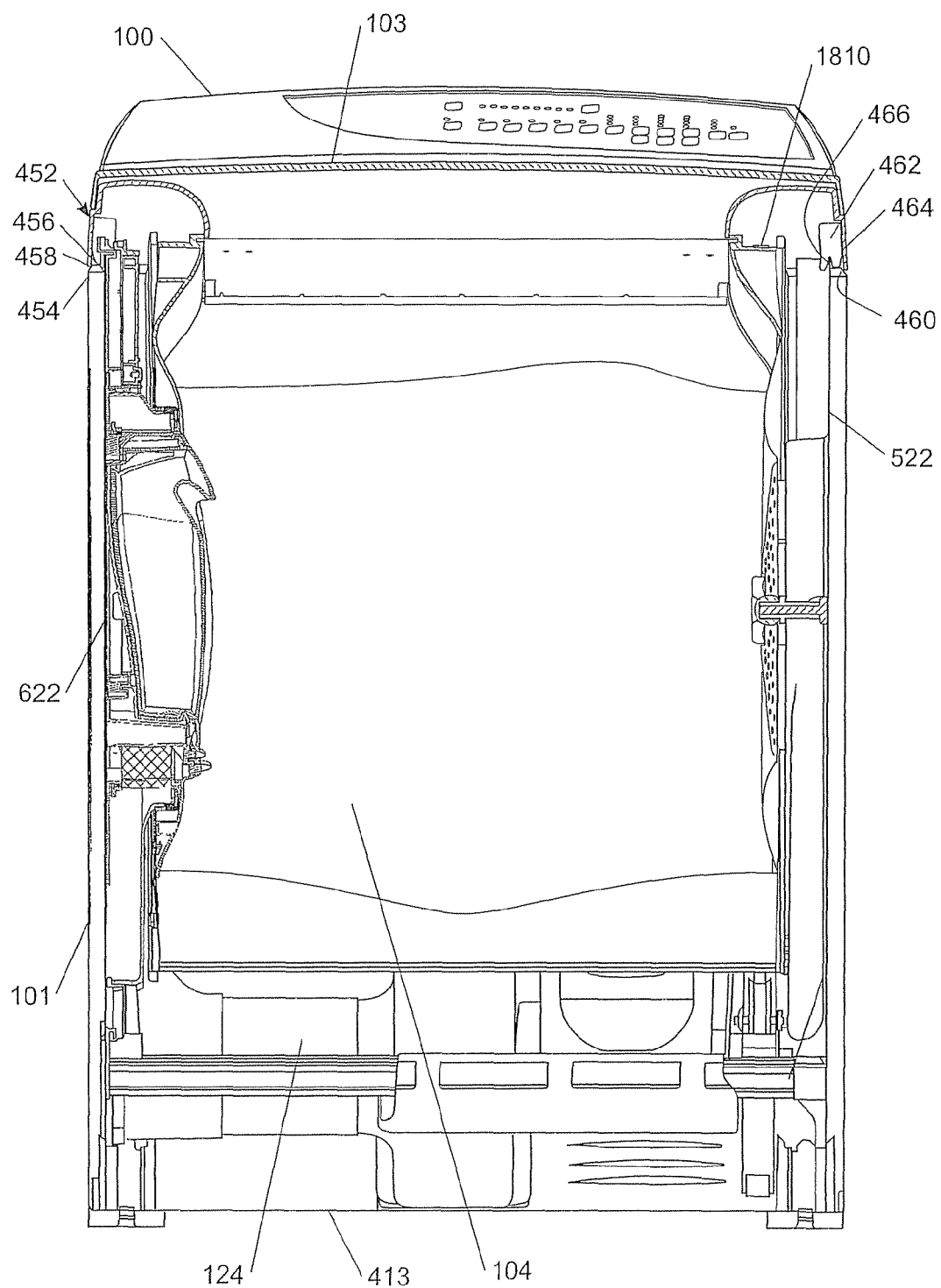
FIG. 2 is a cross sectional front elevation through a clothes dryer according to the preferred embodiment of the present invention.

Referring to FIGS. 1 and 2, clothes dryer 100 includes a cabinet 101 with a top mounted hinging lid 103. The cabinet 101 includes four side walls and a floor. Feet 102 are provided on the lower surface of the cabinet 101 to support the cabinet on a supporting surface (eg: floor). A cylindrical drum 104 is supported horizontally within the cabinet 101. The drum 104 includes a sliding hatch opening in its circumferential skin. The cabinet 101 includes a contoured opening below the lid 103 to in use allow access to the sliding opening of the drum 104.

The drum 104 is supported horizontally within the cabinet 101 from its ends 105 and 110. Each drum end is supported on a chassis. In the preferred form, and in accordance with one of the inventions herein, the chassis is moved forward from the cabinet 101 with the front of the cabinet removed. In the preferred form described and illustrated movement of the chassis from the cabinet, together with the drum and other mechanical assemblies, is by a pivoting movement around a pivot axis adjacent the lower front edge of the cabinet. However other movement interfaces may be adopted including a rocker interface or sliding interface. For example a rocker interface may take the form of two or more downwardly extending curved rockers rolling on appropriate tracks supported on the base panel. A sliding interface may include two or more supporting telescopic rail supporting the chassis side panels.

Provision of a movement interface to allow for movement of the chassis subassembly out of the cabinet is not a necessary feature of dryers according to many of the inventions herein which are equally applicable to dryers where the subassembly is fixed within the cabinet. By way of example only, drum opening and closing, mechanical drive, lint collection, self levelling feet, drum opening and closing and actuation thereof are all aspects of the present dryer which can operate independently and be incorporated into laundry machines of other type and form without departing from the intended scope of the respective invention.

The preferred chassis includes a pair of side panels 522 and 622, preferably formed of sheet metal and having rolled edges 400 turned inwards to form a stiffening flange around its perimeter. Connecting beams 402, 404 and 406 extend between the chassis side panels 522 and 622 below the level of the drum 104. The connecting beams may be formed from pressed or folded sheet metal and to a profile having appropriate stiffness properties. The beams may be secured at their ends to the panels 522 and 622 in any appropriate manner. For example, the foremost beam 402 may be secured to a turned in flange 401 along the forward edge of the panels by resistance welding or fasteners, the rear most beam 404 may be similarly secured and the intervening beam 406 may be fastened by way of brackets or resistance welded folded tabs.

Figure 13A:
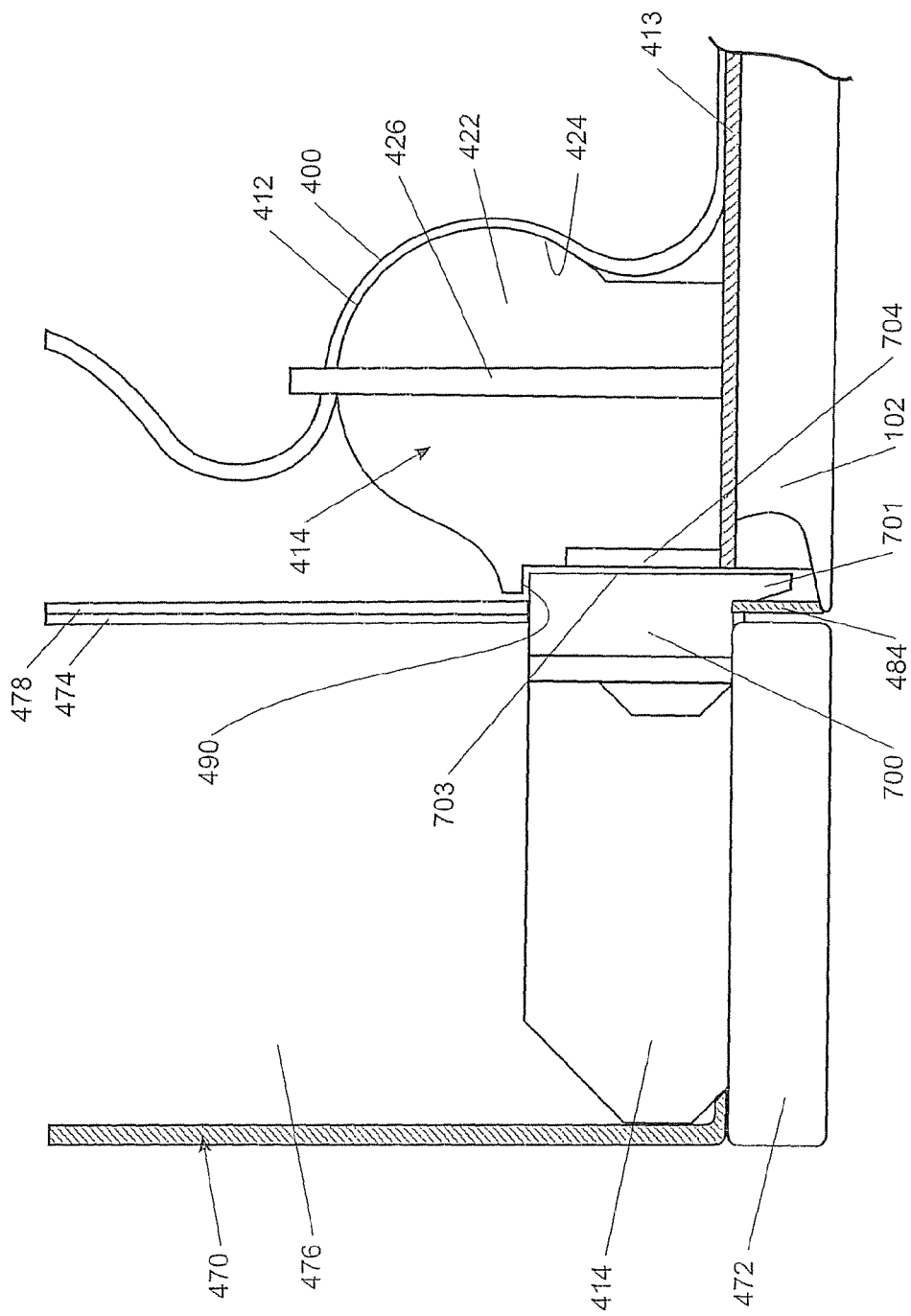
FIG. 13A is an enlarged view of the front foot region of FIG. 1.
Figure 13B:
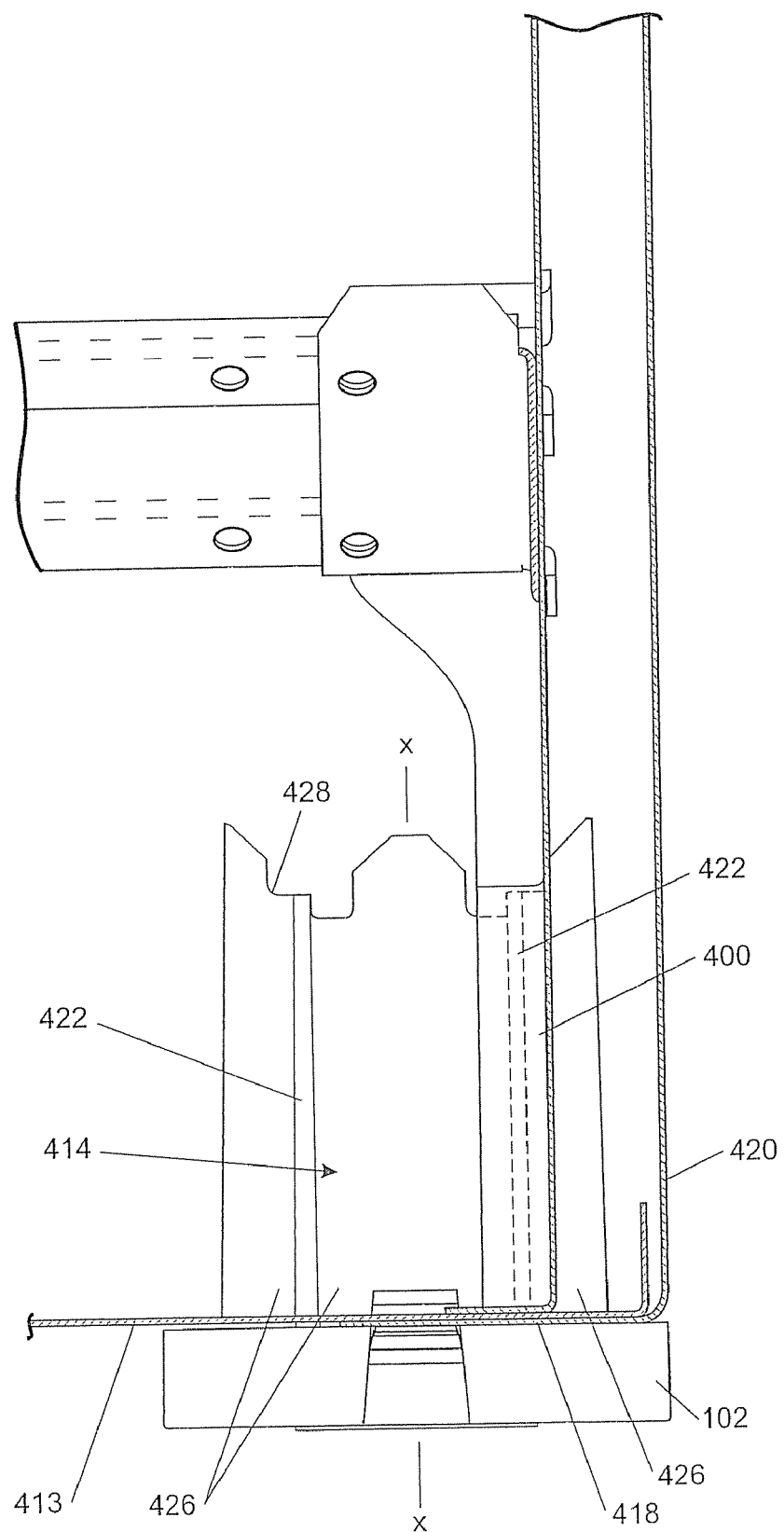
FIG. 13B is an enlarged view of the right side foot region of FIG. 2.
Figure 25:
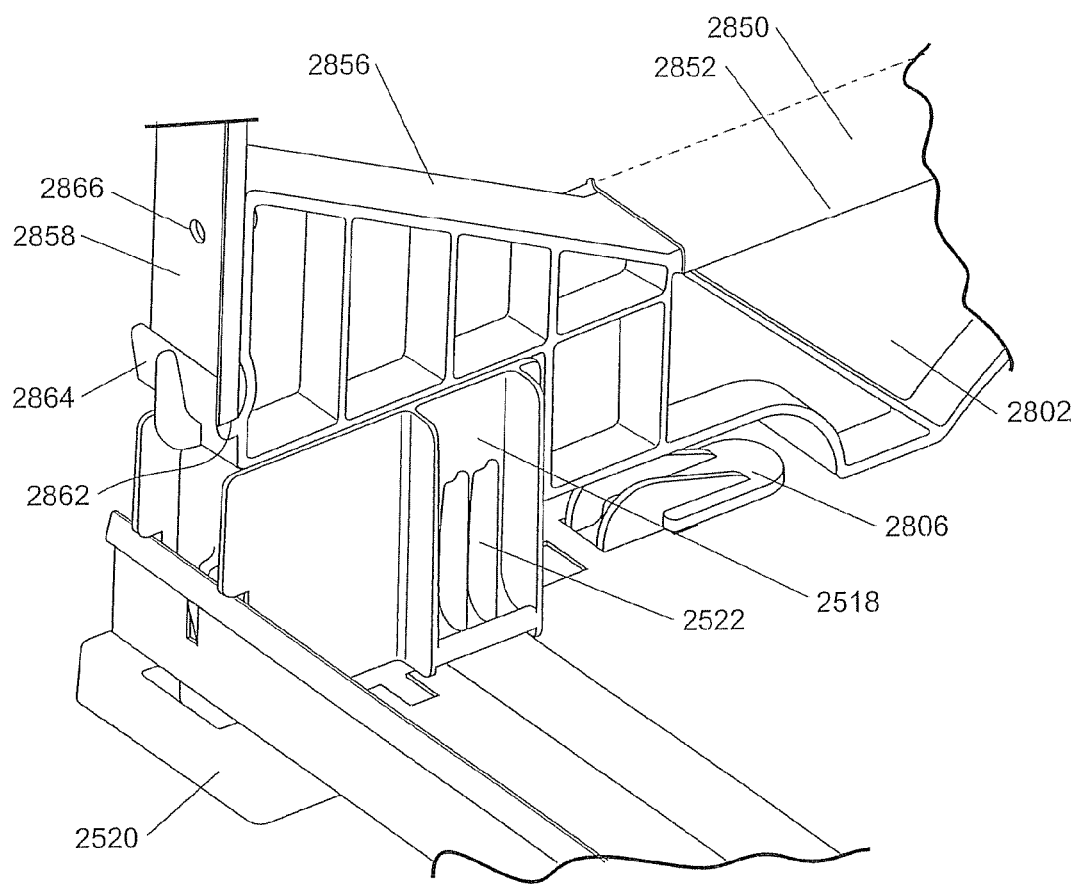
FIG. 25 is a view of a rear foot arrangement according to an alternative embodiment which incorporates a self levelling mechanism governed by a restraining band.
Figure 28:
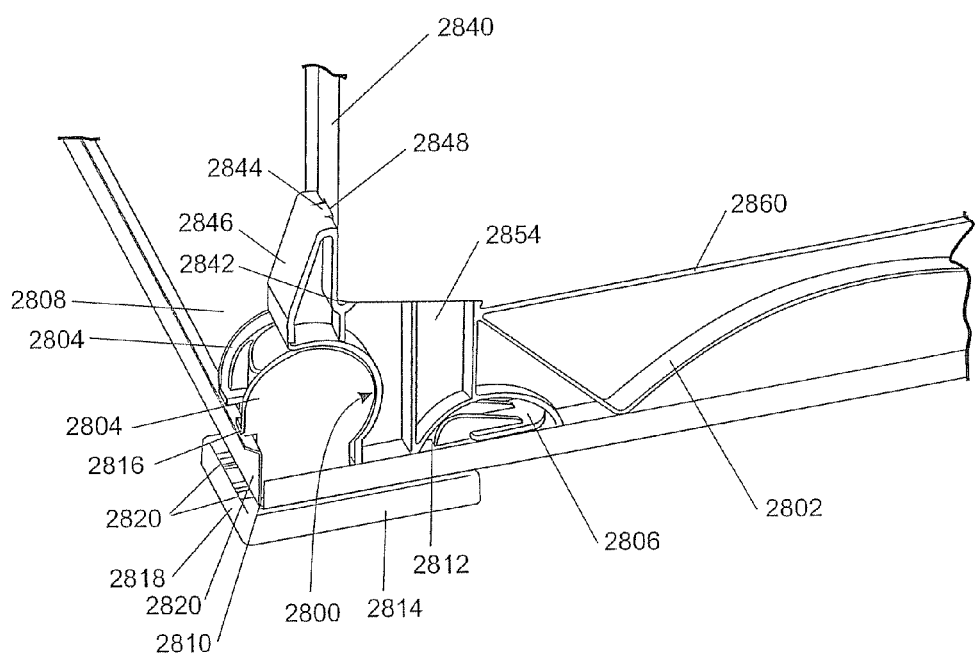
FIG. 28 is a view of a front foot according to an alternative embodiment, wherein the lower edge of the supporting side panel is fixed to a plastic stiffening rail. The stiffening rail incorporates bearing features for providing pivoting action over the front foot.

Referring now also to FIGS. 13A and 13B the lower forward and rearward corners of the side chassis sheets are supported. Each corner includes an arcuate bearing edge 412 of part circular contour, which together co-operate to locate and support the chassis on upward projections at each corner of the cabinet. The inwardly turned flange 400 along the edge of each chassis follows this contour, reinforcing the edge and providing a bearing surface 412. An alternative lower edge arrangement is depicted in FIGS. 25 and 28 and described below.

The four cabinet feet 102 each connect with an adjacent cabinet side panel and with the cabinet base panel 413. The feet 102 each include an arrangement 414 of upwardly extending intersecting walls which fit through complementary apertures in the turned in lower edges 418 of the side walls 420 and in the base panel 413. The upwardly extending intersecting walls 414 of each foot 102 include a pair of load bearing walls 422 aligned parallel to the side walls of the cabinet and whose side profile can be seen with respect to FIG. 1. The load bearing walls 422 include a bearing edge 424 of part circular profile, complimentary to the part circular bearing surfaces 412 of the side chassis sheets. An intersecting wall 426 also extends upwardly from each foot 102. The intersecting wall 426 is aligned parallel with the front face of the cabinet, and therefore perpendicular or at least substantially perpendicular to the load bearing walls 422. The intersecting wall 426 intersects each load bearing wall 422 near its mid point, buttressing the load bearing walls 422 against lateral movement. The intersecting wall 426 has an upper edge which is at some points higher than the upper most parts of the load bearing walls 422. The upper edge of the intersecting wall 426 includes downwardly extending notches 428 to at least the level of the load bearing edges of the load bearing walls 422, the notches 428 accommodate the inwardly extending flange 400 of the respective chassis side sheet 522 or 622. The notches serve to laterally locate the respective inwardly turned flange on its respective load bearing wall.

The particular form of the load bearing surfaces of the foot is not critical. It is important that the structure is sufficiently strong to locate the drum support structure in use and during transport. The arrangement illustrated in FIGS. 13A and 13B includes the pair of spaced apart load bearing walls and is symmetric about a line XX so that the same part can be used as both left and right feet. While advantageous, this is not necessary. An alternative arrangement with quite different form, is illustrated in FIGS. 25 to 28. Again the feet are symmetric so that the same part can be used as either right or left foot but a different upstand is used for front feet than for rear feet. This arrangement is described in more detail below.

Referring to FIG. 1 and FIG. 13A the front face of the cabinet is formed together with the forward portions of the side faces, as a removable front unit 470. The removable front panel includes lower front foot portions 472, whose rearward edges 703 mate with complementary recesses 704 in the corresponding front feet 102. The rear edges 474 of the side wall portions 476 of the front unit 470, and the front edges 478 of the remaining side walls 420 of the cabinet are turned inward as flanges. The turned in flanges 474, 478 butt one another with the front unit 470 in place, and are aligned by clips 480 which protrude from one abutting turned in flange to fit within slots or recesses in the other abutting turned in flange.

The lower edge of the removable front unit 470 includes a front foot portion 472 adjacent each side wall portion thereof. Each front foot portion 472 includes a rearwardly extending locking member 700 including a downwardly extending locking tongue 701. Tongue 701 engages behind a front wall 484 of the respective front foot 102. Lateral rear wall 703 of the locking member 700 fits within recesses 704 of the front foot load bearing members 422. The upper edge of wall 703 engages under a downwardly facing ledge 490 defining the upper boundary of recess 704. Full engagement of locking member 701 with the foot 102 requires a small rearward pivoting of the front panel unit 470 about its foot connection with the reminder of the cabinet. Disengagement requires a small forward pivoting. This pivoting may be accomplished by a slight lifting, but is otherwise inhibited by the surface supporting of the front of the cabinet in the vicinity of the join. Slight lifting of the front of the cabinet allows relative pivoting of the feet.

An alternative foot arrangement which includes an alternative form of support of the side chassis panel is illustrated in FIGS. 25 to 28. In this arrangement the side chassis is provided with a plastic stiffening member 2802 extending along its lower edge. The stiffening member is connected to the lower edge of the panel, preferably clipping in place and being further secured by fasteners. The front end of the stiffening member 2802 includes a bearing surface 2800 to bear on upstand walls 2804. The upstand walls 2804 pass upwardly through an aperture 2810 in base panel 2808. An engagement extension 2806 passes upward through the base panel 2808 through another aperture 2812. The engagement extension 2808 and the upstand 2804 each extend beyond the bound of the respective aperture, in opposite directions. The upstand, including walls 2804 and connecting lateral bracing, is a separate component from pedestal 2814. Engagement extension 2806 is integral with pedestal 2814.

In connecting the foot to the base panel, the engagement extension 2806 is passed through its respective aperture 2812 and the pedestal 2814 is pivoted up to a position against the under face of base panel 2808. The upstand component is inserted through its aperture 2810 from above and clips into the pedestal component 2814. The leading edge 2816 of the upstand component overhangs the leading edge 2818 of the pedestal component 2814 leaving a recess 2820 for receiving the rearward edges of the front foot portions of the removable front unit. Apertures 2820 in the upper surface of the forward portion of pedestal component 2814 are exposed in the recess 2820 for receiving the locking tongues of the removal front unit.

The stiffening member 2802 may be attached to the chassis side panels in any convenient fashion. In the form illustrated in FIGS. 25 to 28 it engages with the stiffening member 2802 by a clip arrangement at its forward end and a fastener at its rearward end, with the side panel and stiffening member each configured so that the side panel bears on the stiffening member along most of its length. At the forward end turned in flange 2840 sits in a trough 2842 behind an upstand 2846. A projection 2844 from upstand 2846 extends through an aperture 2848 in the flange 2840. Turned in flange 2850 along the lower edge of the side panel sits on a longitudinal rail 2860 of the stiffening member 2802. The flange 2850 includes a downwardly turned edge 2852 to provide lateral support from one direction. Relative to the turned down edge 2852 the panel extends behind a forward upstand portion 2854 and a rear upstand portion 2856 of the stiffening member 2802, to provide lateral support in the other direction. A turned in flange 2858 on the rearward edge of the side panel sits in a trough 2862 formed by an outward and upward projection 2864 of rear upstand 2856. A fastener inserted through hole 2866 secures the side panel in position on the stiffening member 2802.

Figure 26:
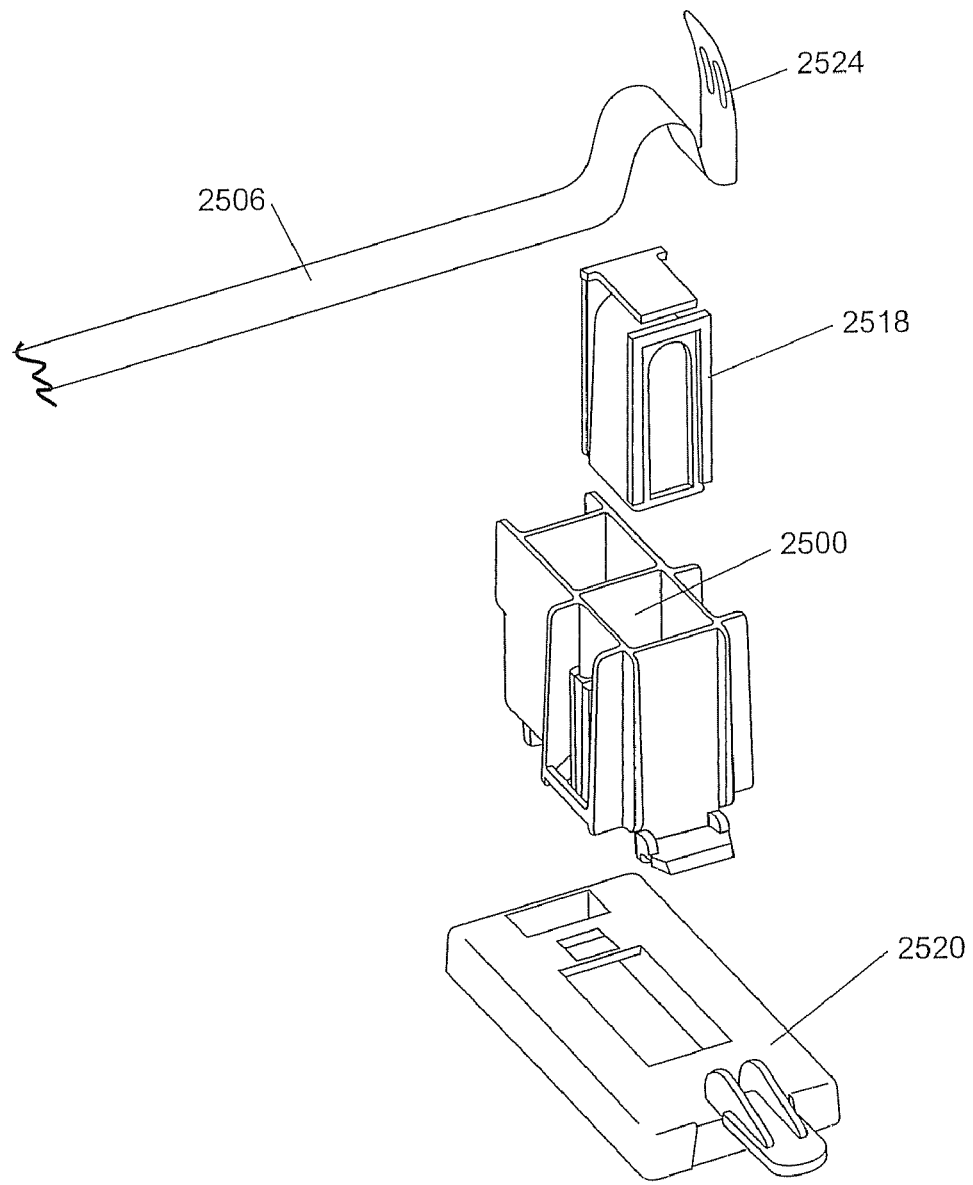
FIG. 26 is an assembly drawing of the self levelling foot arrangement of FIG. 25.
Figure 27:
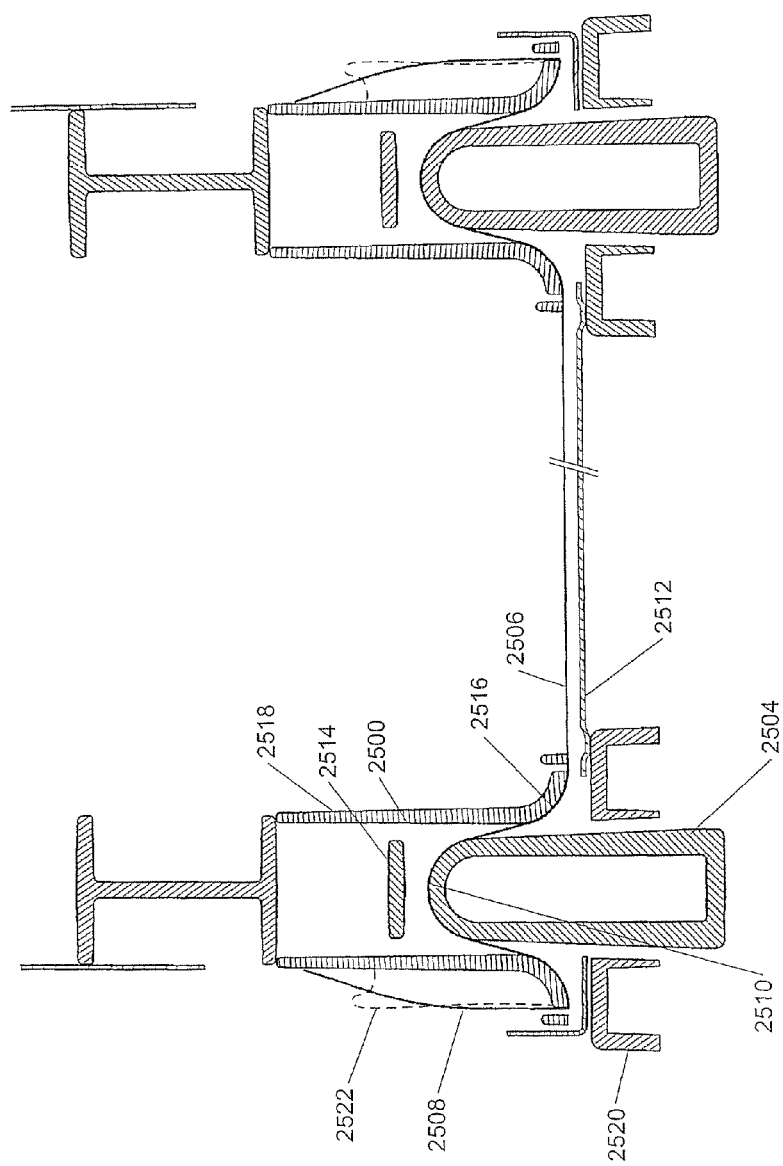
FIG. 27 is a cross section of the self levelling foot arrangement of FIG. 25 taken along a line coaxial with the restraining band.

An alternative form of rear foot, illustrated in FIGS. 25 to 27 includes a foot arrangement which provides for automatic levelling. The arrangement includes a first socket 2500 connected with the cabinet adjacent one side and a second socket connected with the cabinet, adjacent the other side. The first socket is provided in association with one rear foot assembly, the second socket is provided associated with the other rear foot assembly. A foot 2504 downwardly protrudes from each socket. The foot is moveable along an axis into and out of the socket.

A non-extensile band 2506, fixed at one end 2508 relative to the first socket, passes through the first socket, including over an upper bearing surface 2510 of the first foot. The band passes across the back of the cabinet, adjacent the base panel 2512 and through the second socket, including over an upper bearing surface of the second foot, and is fixed at its other end relative to the second socket.

Each foot 2504 includes a retaining tongue 2514 spaced above the upper bearing surface.

Each socket includes a downward bearing surface 2516 at least in the region where the band passes out of the respective socket towards the other socket.

Each socket is formed within an internal upstand component 2518, and within an external pedestal component 2520. The internal upstand component and the pedestal component are mutually engaged with the base panel 2512 of said appliance therebetween the foot passes into the upstand member through an aperture in the base panel.

The upstand member includes a band engagement (such as 2522 in FIG. 25, but on the other face) and illustrated in dotted lines in FIG. 27 on the side facing away from the other upstand member. The band engagement engages slots 2524 in the band. When one foot rises, the other drops, the pair being limited by the band. The upper bearing surface of each foot and the downward bearing surface 2516 bear on the band in opposite directions under pressure, preventing movement once the appliance weight is bearing on the feet.

The restraining force applied to each foot by the band is balanced laterally due to the band passing fully over the foot and being secured to the non-moving structure. Force in a fore and after direction is substantially balanced due to the use of a non-extensile metal band of much greater width than thickness, as opposed to a wire or other low aspect ratio alternative. With its width the metal band provides a distributed load on the bearing surfaces of the feet and the sockets so as not to bite into the material from which these surfaces are formed. This allows these components to be manufactured from suitable plastics.

Figure 8:
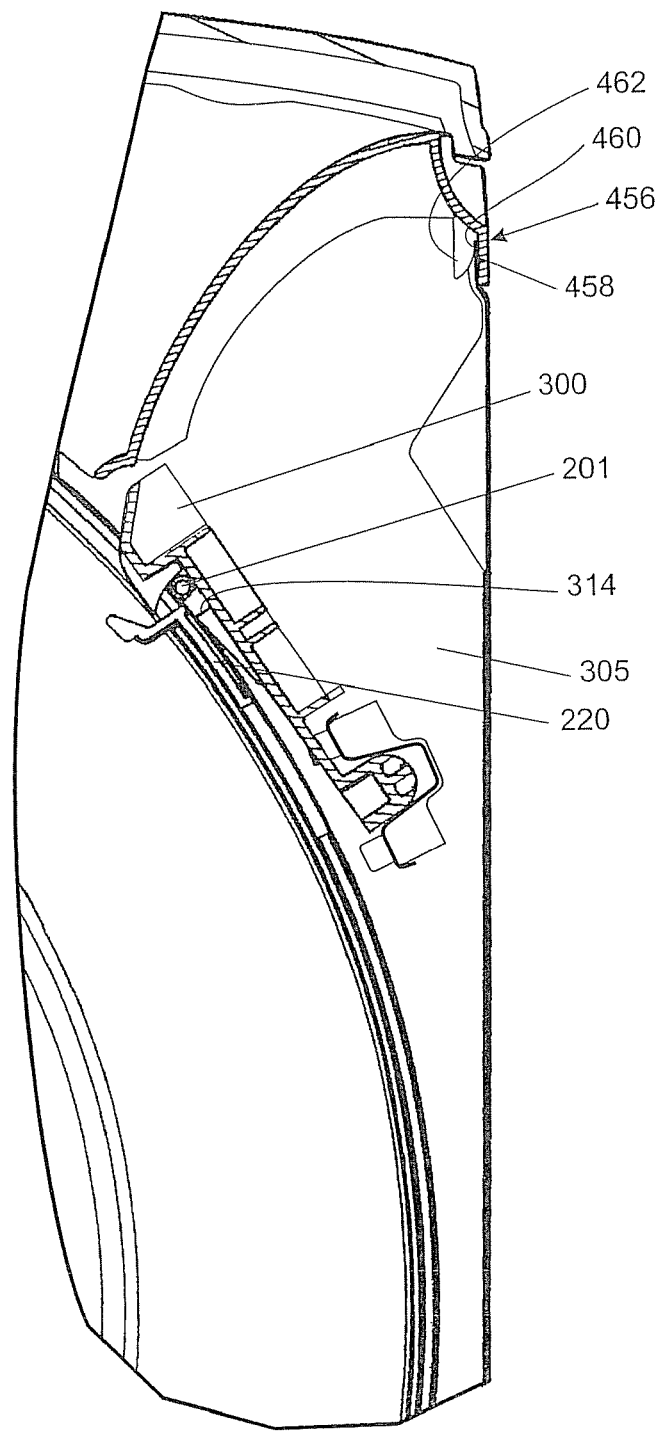
FIG. 8 is cross a sectional side elevation (from the left side) through a clothes dryer according to the preferred embodiment of the present invention, the position corresponding to during a drum opening operation.
Figure 9:
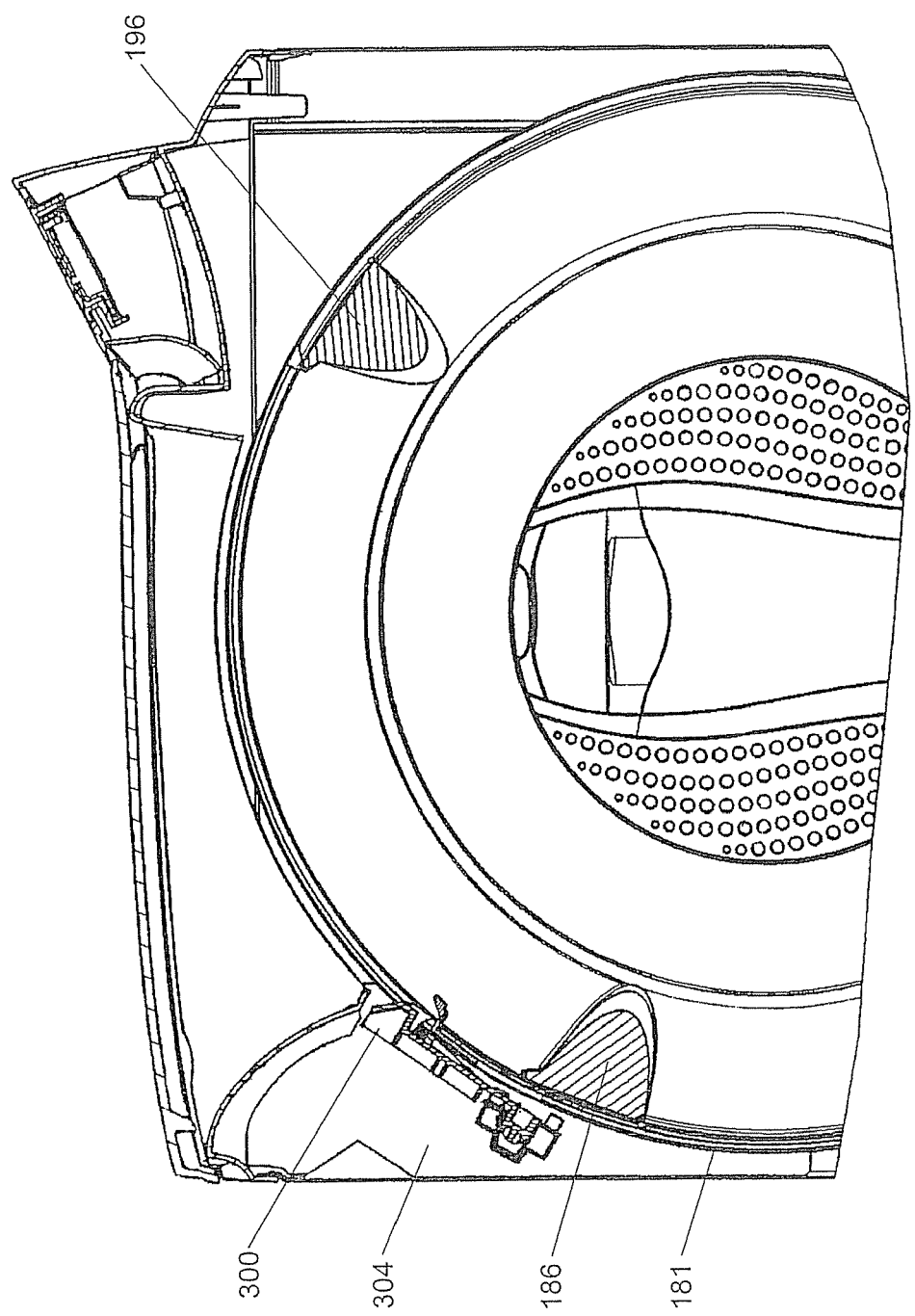
FIG. 9 is a cross sectional side elevation (from the right side) through a clothes dryer according to the preferred embodiment of the present invention, shown in an operating configuration with the drum fully open.

Referring particularly to FIGS. 2 and 8 the dryer console 450, lid 103 and a surrounding frame 452 (with tapered access opening) together comprise a "top deck" component which is secured to the upper edge 454 of the side, rear and front walls of the cabinet. The downwardly extending peripheral sides 456 of the top deck frame 452 fit over upper edge flanges 458 of the front, side and rear faces of the cabinet. These edge flanges are located internally adjacent the peripheral sides 456 of the sides and front of the top deck, within tapering slots 460 in locating members 462 extending transversely from the inner surface 464 of the side walls 456. Slots or recesses 466 in the locating members of the peripheral side walls of the sides of the top deck also retain the upper edges of the chassis side walls 522 and 622 against lateral movement.

Figure 14:
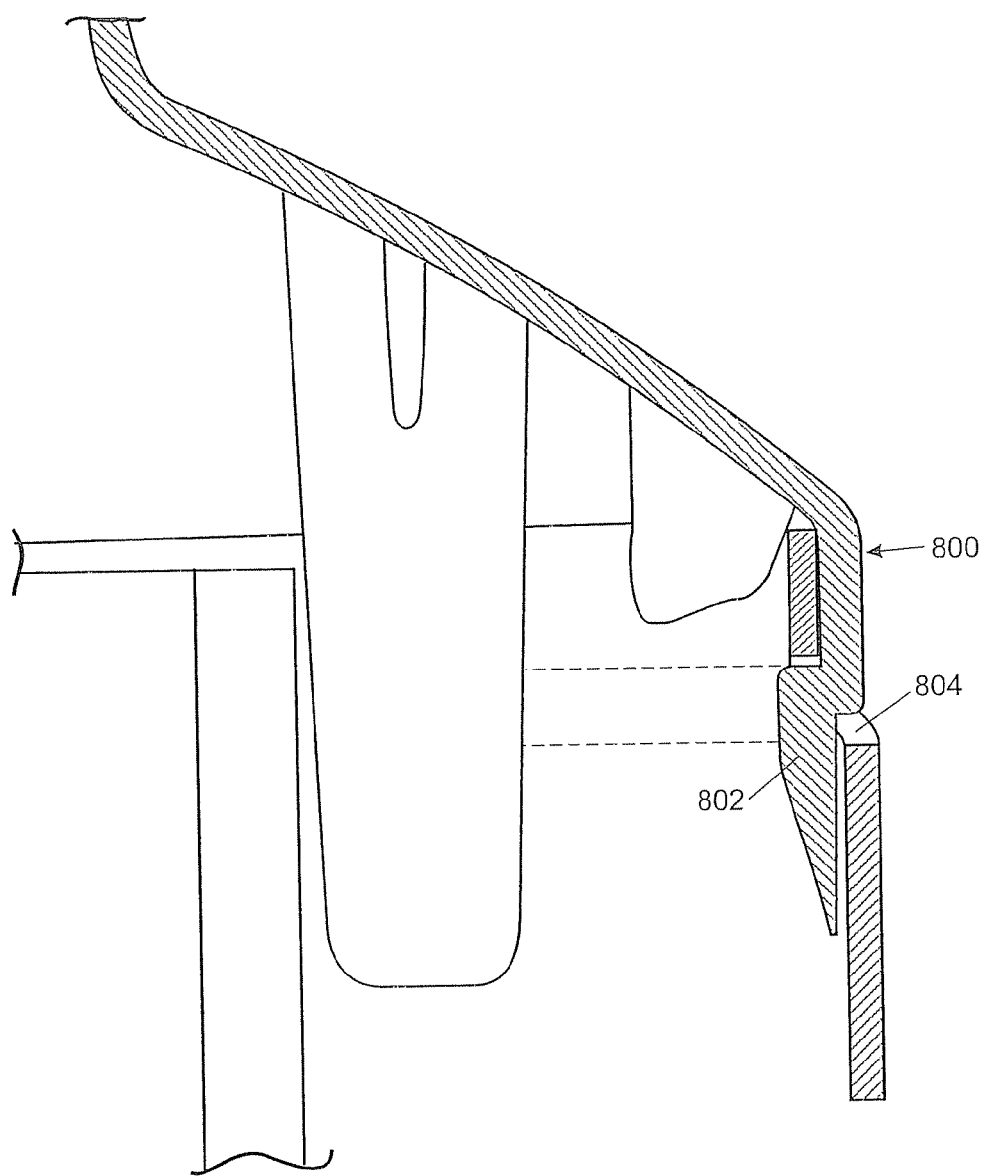
FIG. 14 is an enlarged view of the upper rear region of FIG. 1 showing the joining between the rear edge of the top deck and the upper edge of the rear face of the cabinet.

Referring to FIG. 14 the top deck is maintained in a secured relationship with the upper edge of the cabinet by a clipping arrangement at its rear side 800. The clipping arrangement comes into engagement by juxtaposing the clip portions 802 extending from the top deck rear periphery with lateral slots 804 in the upper edge of the cabinet, with the top deck held in a tilted condition with the front side higher than the rear side. Subsequently lowering the front edge of the top deck brings the top deck into a substantially horizontal orientation with respect to the top edges of the cabinet, with the top edges of the cabinet located within the tapering slots 460 of the locating members 462 around the sides and front. This maintains the alignment of the top edges of the side walls and retains the upper end of the removable front unit 470 in place against the respective side walls. The top deck is secured in this orientation by fasteners connecting it with the top edge of the cabinet. Preferably these fasteners connect between the top deck and side housings 304 and 305 (see FIGS. 1 and 6 to 9). The side housings 304 and 305 are in turn connected with the respective chassis side sheets 522 and 622.

For maintenance of the internal dryer components the top deck may be released from the upper edge of the cabinet by removing the associated fastenings. With the top deck released its front portion may be tilted up to disengage from the upwardly extending flange of the front unit. The front feet engagement may be released by lifting the front portion of the dryer and pivoting the front unit forward. The front unit is now completely removable from the remainder of the cabinet while the top deck is tilted up. With the front unit removed electrical connections between the components carried by the supporting chassis and the top deck may be broken and the entire drum and supporting chassis may be pivoted from the cabinet, with the bearing surfaces of the lower front corners of the chassis side walls sliding over the complimentary bearing edges of the upwardly extending front foot bearing walls. The chassis carries the drum, motor, fan and drive pulley assemblies and presents these components to the maintenance person in front of the cabinet. The heater component, whether gas or electric, is secured to the base panel and is available for inspection and maintenance with the drum and supporting chassis in its more usual operating position once the front unit has been removed.

Figure 24:
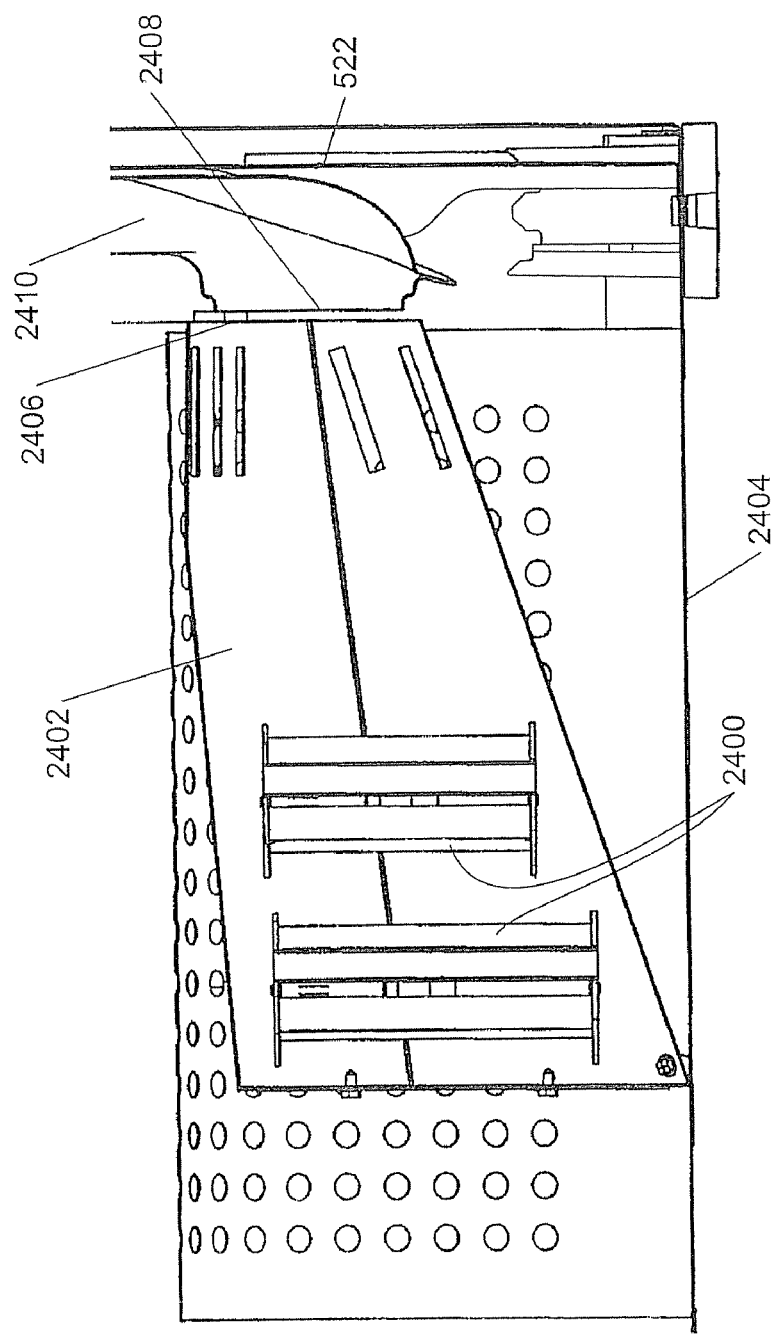
FIG. 24 is a cross sectional front elevation of the portion of the lower left side of the machine showing the heater and heater housing and its juxtaposition with the hot air inlet duct opening in an operating position.

Referring to FIG. 24 the heater component 2400, whether gas or electric, is located at the entrance of an inlet duct 2402 mounted on the base panel 2404. The inlet duct has an open outlet end 2406 which is aligned with an inlet opening 2408 of a hot air inlet manifold 2410 with the chassis in its operating position. The hot air inlet manifold is secured to the inlet end tilt out chassis 522.

Figure 23:
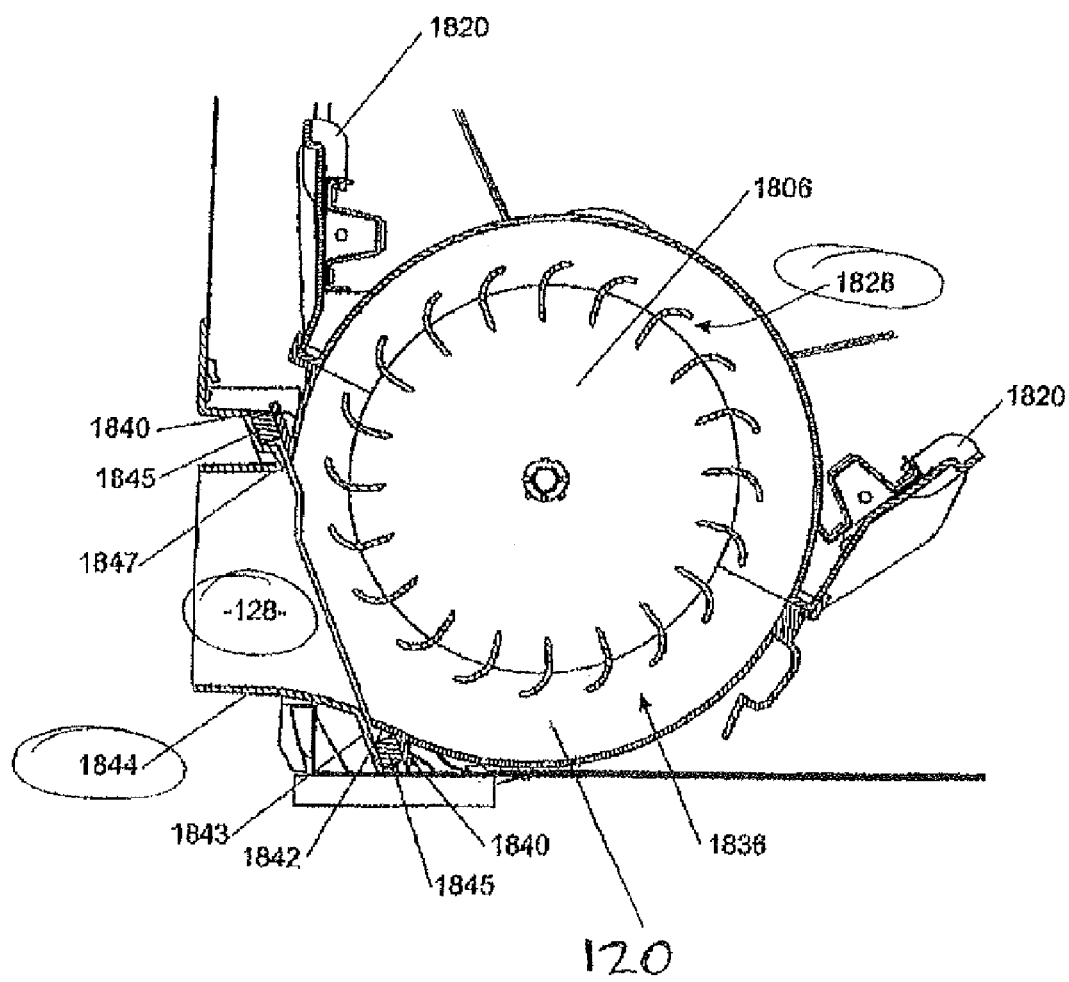
FIG. 23 is a cross sectional side elevation of the portion of the machine including the fan, fan housing and exhaust outlet port.

Referring to FIG. 23, in tilting the chassis and its attendant components into and out of the dryer cabinet a connection is also made or broken between the squirrel cage fan housing 120 and a cabinet outlet port component 1844 which includes the cabinet exhaust outlet 128. The construction and arrangement of this connection is described in more detail later.

Referring to FIGS. 1 to 3 and 34 the cylindrical drum 104 has a pair of circular drum ends and a cylindrical drum skin connecting therebetween. The cylindrical drum skin is made up of a first part-cylindrical skin 107 connected permanently with the drum ends 105, 110 and a part-cylindrical drum hatch 108 whose edges slide within a pair of circumferential tracks 109 defining the side edges of a drum opening. The permanently connected drum skin portion 107 is supported by vanes 106, 186 and 196 as well as by its permanent connection to the drum ends. The vanes 106, 186 and 196 each span between the drum ends and are connected with both the drum ends and the drum skin. The tracks 109 are provided on a drum end support member 3400 connected to the periphery of the drum around that part of the circumference that defines the drum opening. The vanes 186 and 196 connect between the ends of the drum end support members. The vanes 186 and 196 form front and back edges of the drum opening. Together, the vanes 186 and 196 and the drum end support members 3400 define the drum opening.

The drum 104 is rotatably supported within the cabinet 101 by a spindle at one end and an annular bearing surface at the other end.

Figure 4:
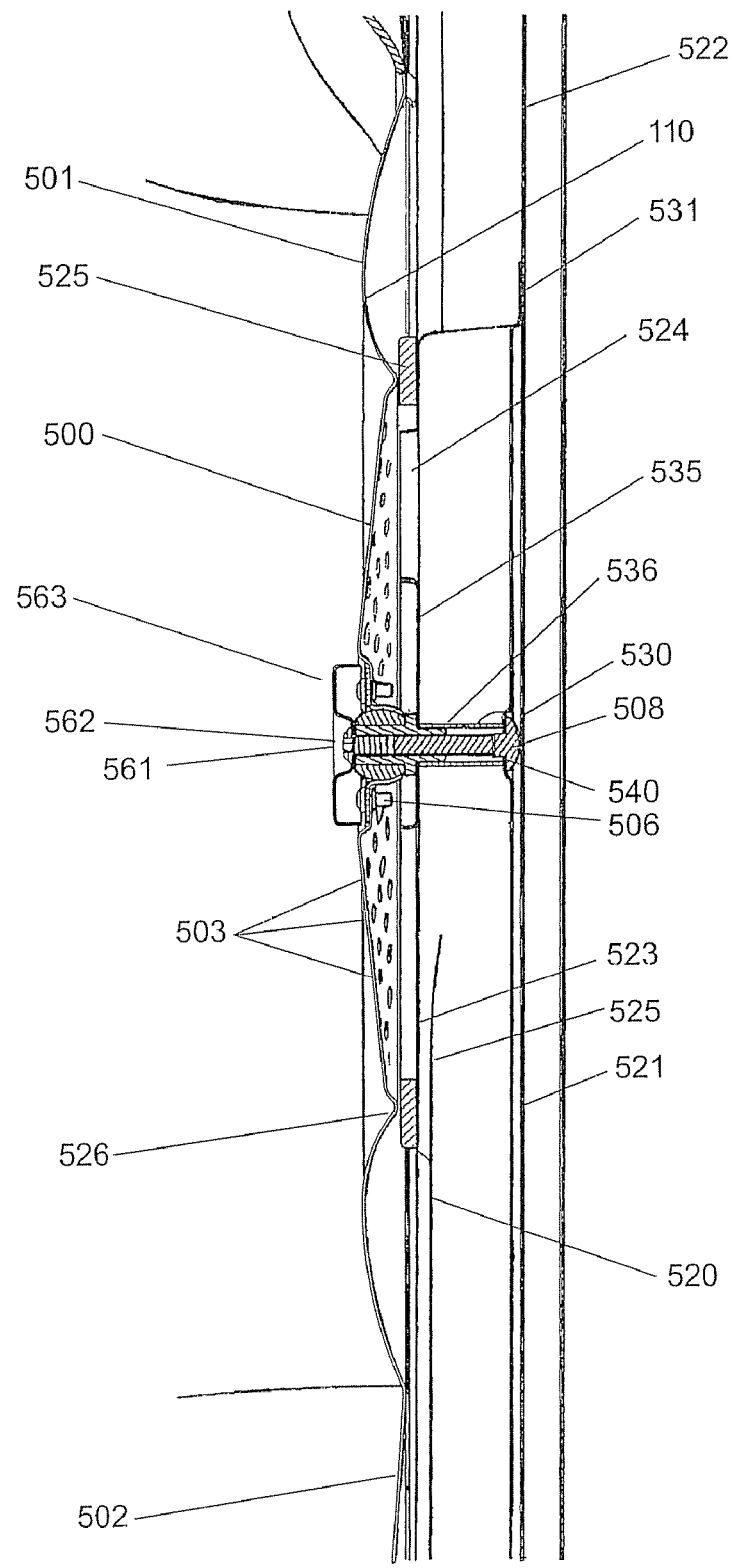
FIG. 4 is an enlarged view of the region of FIG. 2 including the air intake end of the drum.
Figure 4A:
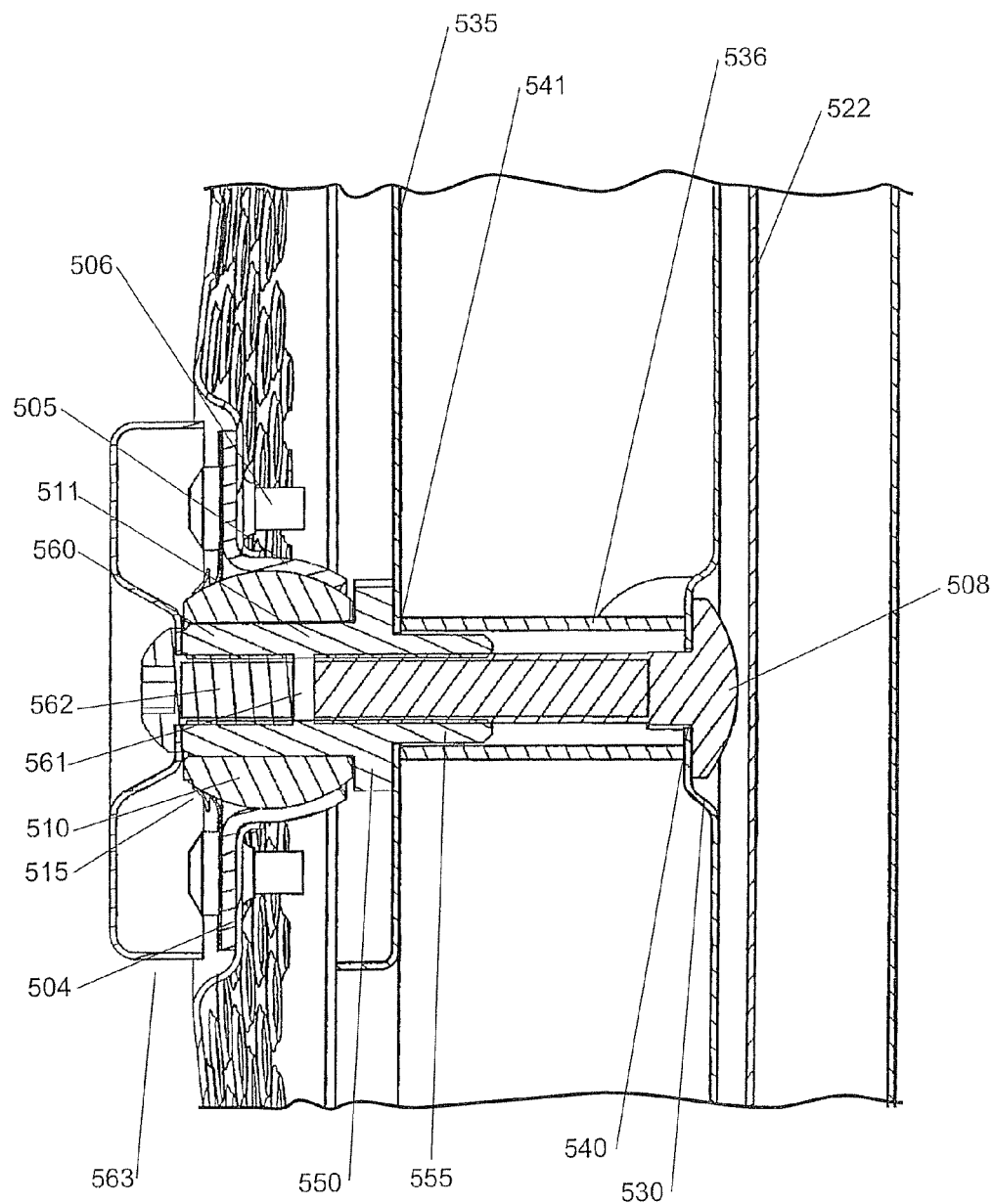
FIG. 4A is an enlarged view of the bearing region of FIG. 4.

Referring to FIGS. 4 and 4A the air inlet drum end 110 includes an inwardly domed central portion 500. The central portion 500 includes a plurality of perforations (eg 503) forming air inlet 121. A flat hub portion 504 at the centre of region 500 has a bearing housing 505 fastened thereto, for example by rivets 506. A spherical bush 510 is secured within the bearing housing 504 by a thin metal spring cover 515 secured to the bearing housing 504 by the fasteners 506.

The hot air inlet manifold 2410 is secured to the inlet end tilt out chassis 522. The hot air inlet manifold comprises an inner side pressed plate 520 and an outer side pressed plate 521, secured together and to the chassis 522 around the perimeter 531. The perimeter may be secured together and to the chassis 522 for example by fasteners or resistance welding. The inner side plate 520 includes hot gases outlet openings 523 which are adjacent the perforated central portion 500 of drum end 110 when assembled. Openings 523, 524 are spaced around a central hub portion 535 of the plate 520, leaving spokes intact supporting the central hub region 535.

The outer plate 521 includes a depressed central region 530 with an aperture 540 therethrough. The depressed region 530 accommodates the head of a bolt 508 when assembled. The inner plate 520 includes an aperture 541 aligned with aperture 540 of outer plate 521. A compression tube 536 is located between the inner and outer plates 520, 521 to maintain the separation between the plates 520 and 521 in the vicinity of apertures 541 and 540 respectively. A bearing shaft 511 has a locating spigot 555 fitted within compression tube 536 through aperture 541. The bearing shaft includes a thrust receiving flange 550 located against the outer surface of central portion 535 of the inner plate 520. An outer end face of the spherical drum bearing 510 bears against the other side of thrust flange 550. The bearing shaft 511 includes a stub shaft 560 extending into the drum. The stub shaft 560 fits within an inner bore of the spherical bearing 510.

The bearing shaft 511 includes a central axial bore 561 for receiving bolts 508 and 562 which complete the assembly. Bolt 508 passes through aperture 540 and the bore of the compression tube 536 to be secured within one end of the central bore 562 of bearing shaft 511. This leaves the stub shaft protruding from the inner sheet 520 of the hot gases manifold. With the spherical bearing 510 fitted over the stub shaft 560 a protective cap 563 is secured to the end of stub shaft 560 by a bolt 562. The protective cap 563 covers the flat hub region of the drum end and associated bearing holder 505 and fasteners 506. The bolt 562 secures against a flat and central hub of the cover 563. The flat and central hub of cover 563 extends beyond the end face of the stub shaft 560 to retain the spherical bearing 510 on the stub shaft.

An annular seal is created between the drum end and the inner plate 520 of the hot gases inlet manifold by an annular seal 525 located about the circumference of the inlet openings 523, 524. The soft felt seal 525 is fixed to the drum facing surface of inner plate 520. The drum end 110 has an inwardly dished ring 501 concentrically outside the dished central region 500, leaving an outwardly facing annular ridge 526 therebetween. The outwardly facing annular ridge 526 presses into the felt seal 525 to provide an annular seal between the manifold and the drum end 110.

Figure 36:
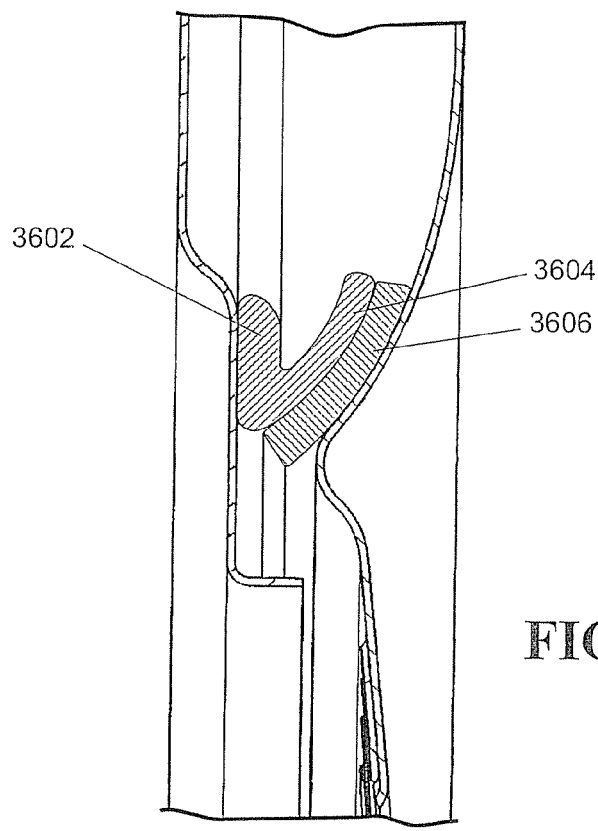
Figure 37:
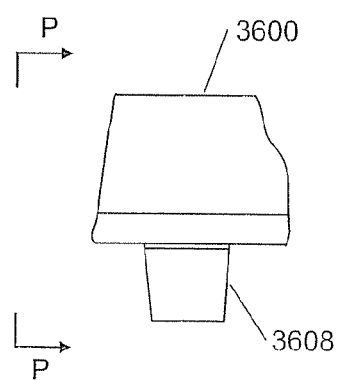
FIG. 37 is a side elevation of a portion of seal support member of the embodiment of FIG. 36, the portion including a connecting lug extending from the base leg.
Figure 38:
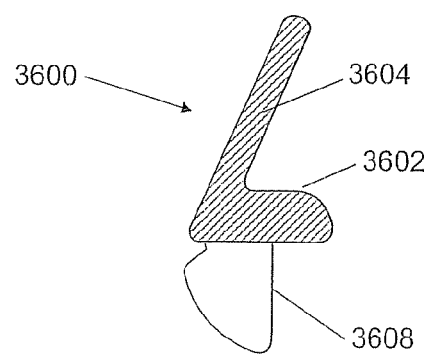
FIG. 38 is a cross section through line P-P of the support member of FIG. 37.

According to an alternative embodiment illustrated in FIGS. 36 to 38 the annular sliding seal at the drum inlet includes a resilient elastomeric support member 3600. The support member 3600 is substantially constant cross section having a base leg 3602 and a flexion leg 3604. A felt strip 3606 is secured to the flexion leg 3604 and the base leg 3602 is connected with the inlet duct. In place such as illustrated in FIG. 36, the flexion leg 3604 is contorted from a relaxed position (illustrated in FIG. 38), biasing the felt strip against the drum end surface.

The resilient member 3600 includes protruding lugs 3608, which secure the base leg 3602 to the inlet duct by extending through apertures in a supporting panel of the inlet duct. The support member may be manufactured by extruding a constant cross section profile including the profile of protruding lug 3608, and removing longitudinal sections of the lug portion of the profile to leave protruding lugs 3608 at intervals along the strip. The strip may be extruded from known elastomers, such as Silicone.

Figure 5:
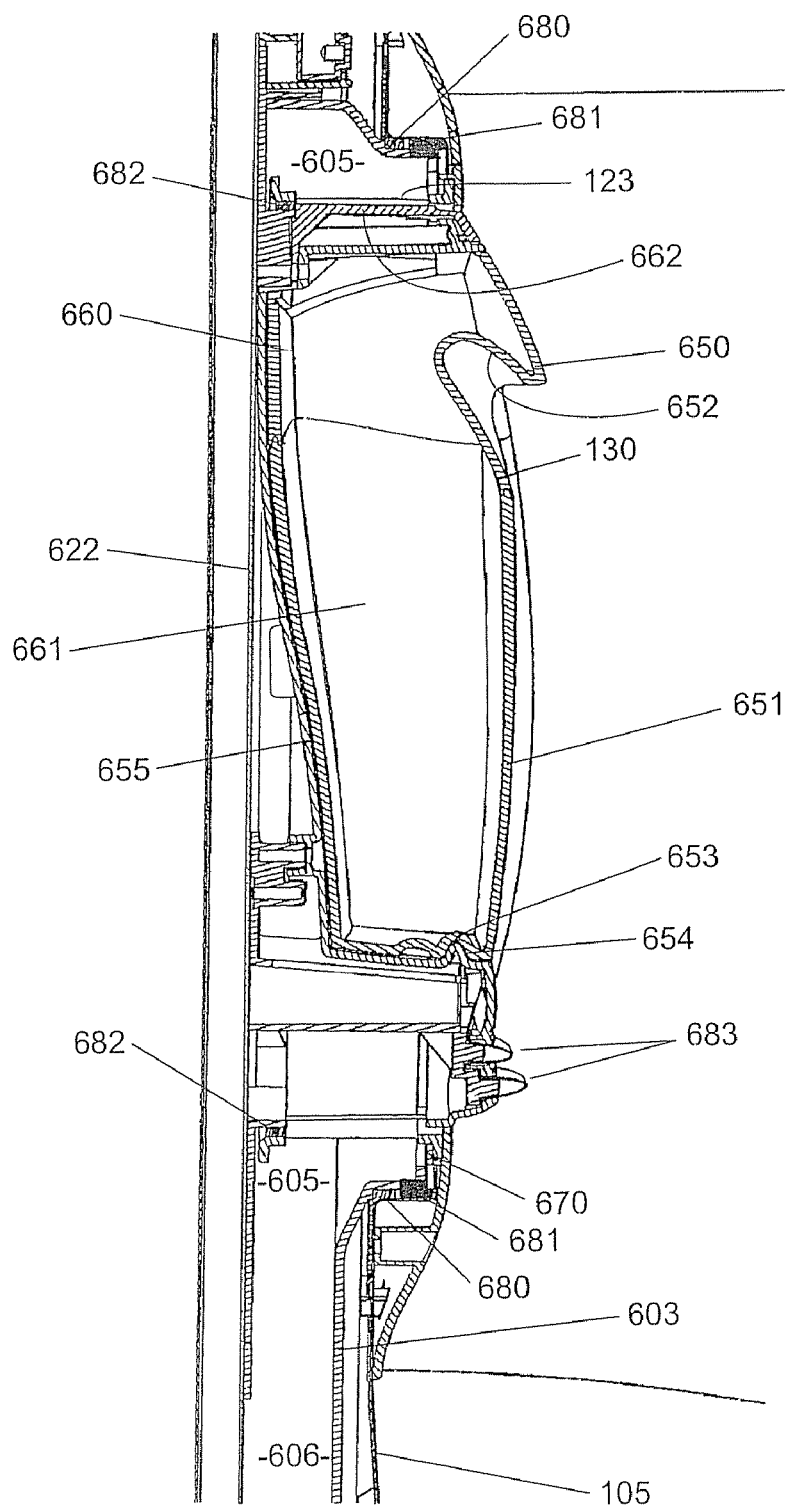
FIG. 5 is an enlarged view of the region of FIG. 2 including the air outlet end of the drum.
Figure 5A:
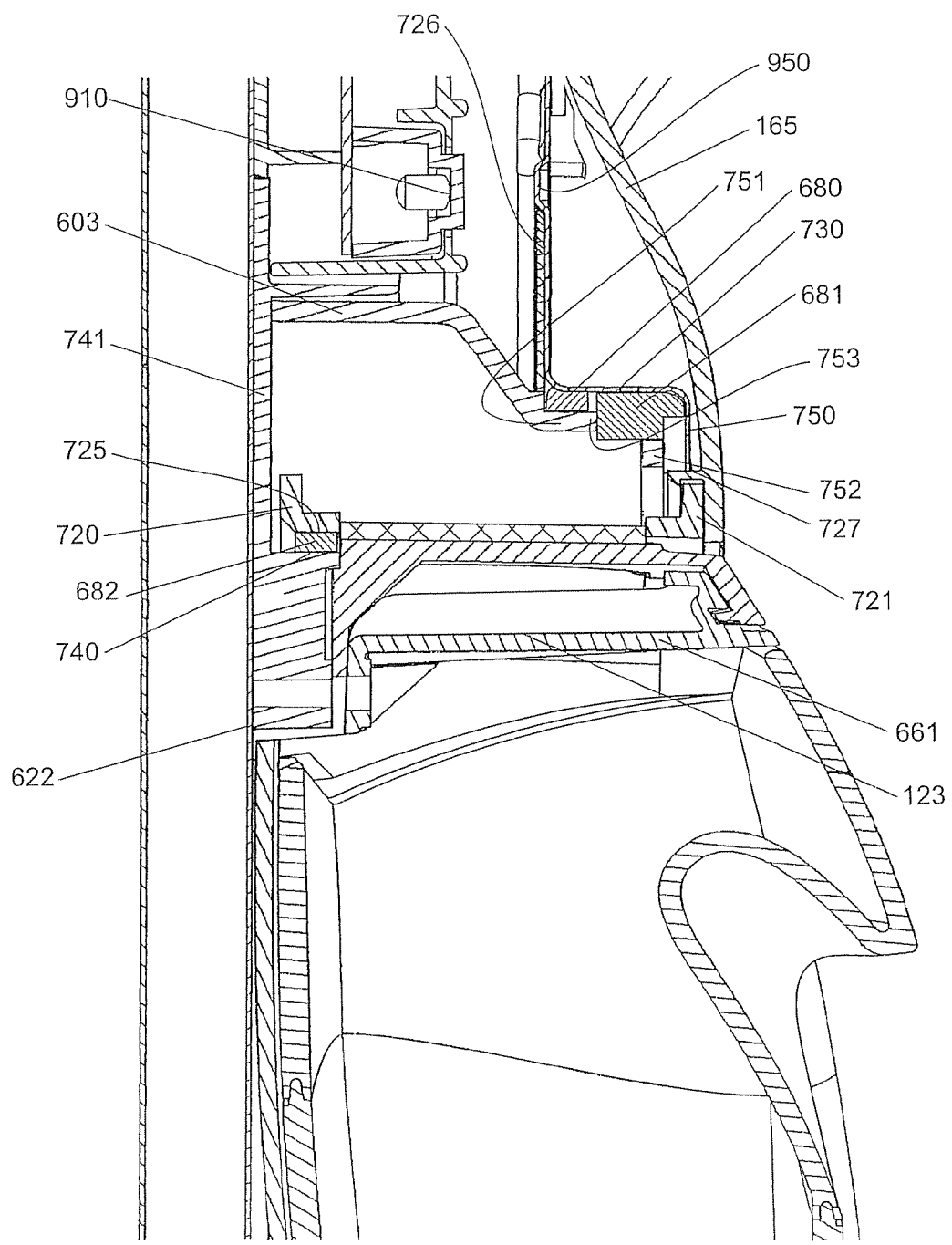
FIG. 5A is an enlarged view of the upper end of the lint filter housing and bearing region of FIG. 5.
Figure 5B:
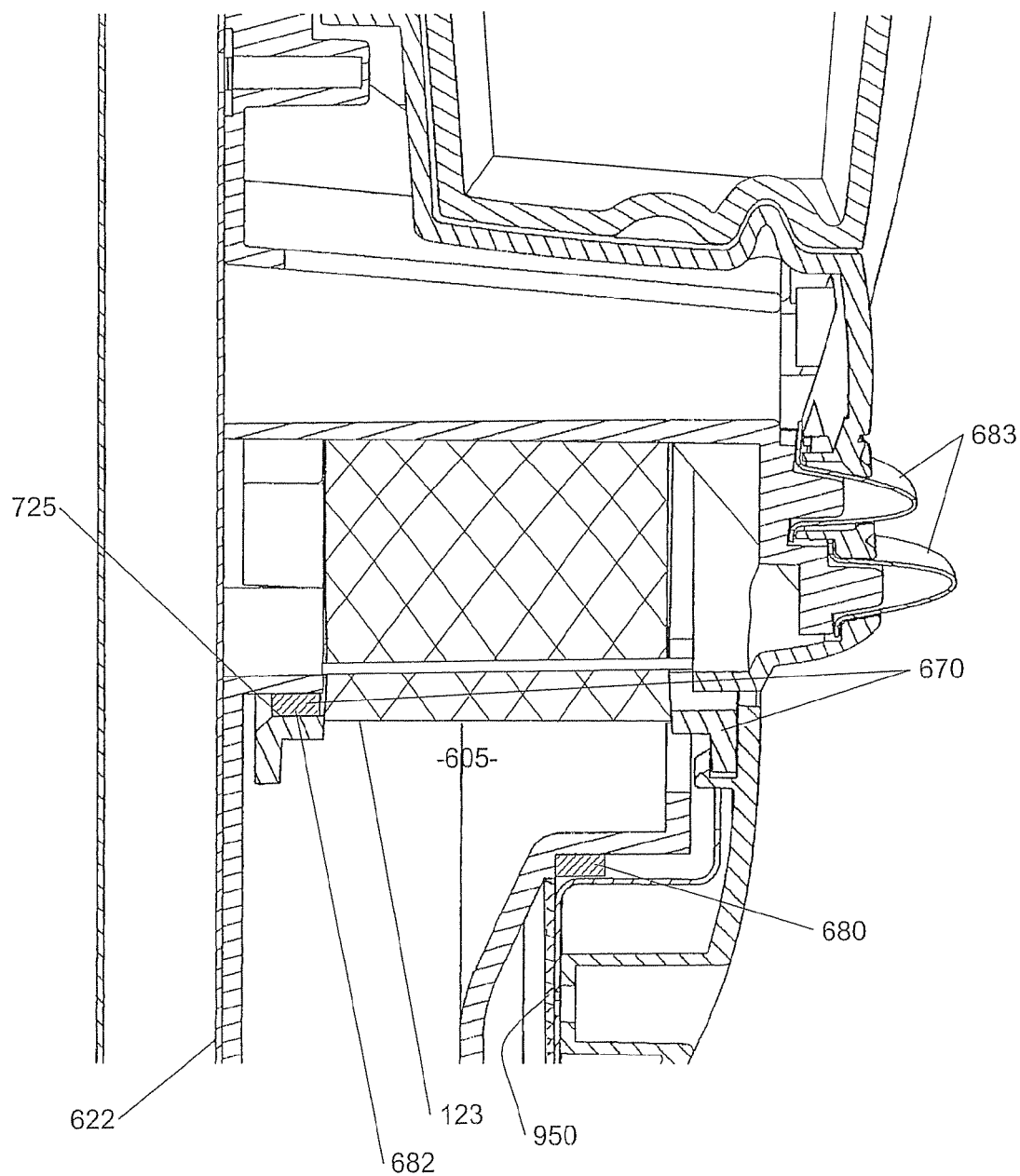
FIG. 5B is an enlarged view of the lower end of the lint filter housing and bearing region of FIG. 5.
Figure 6:
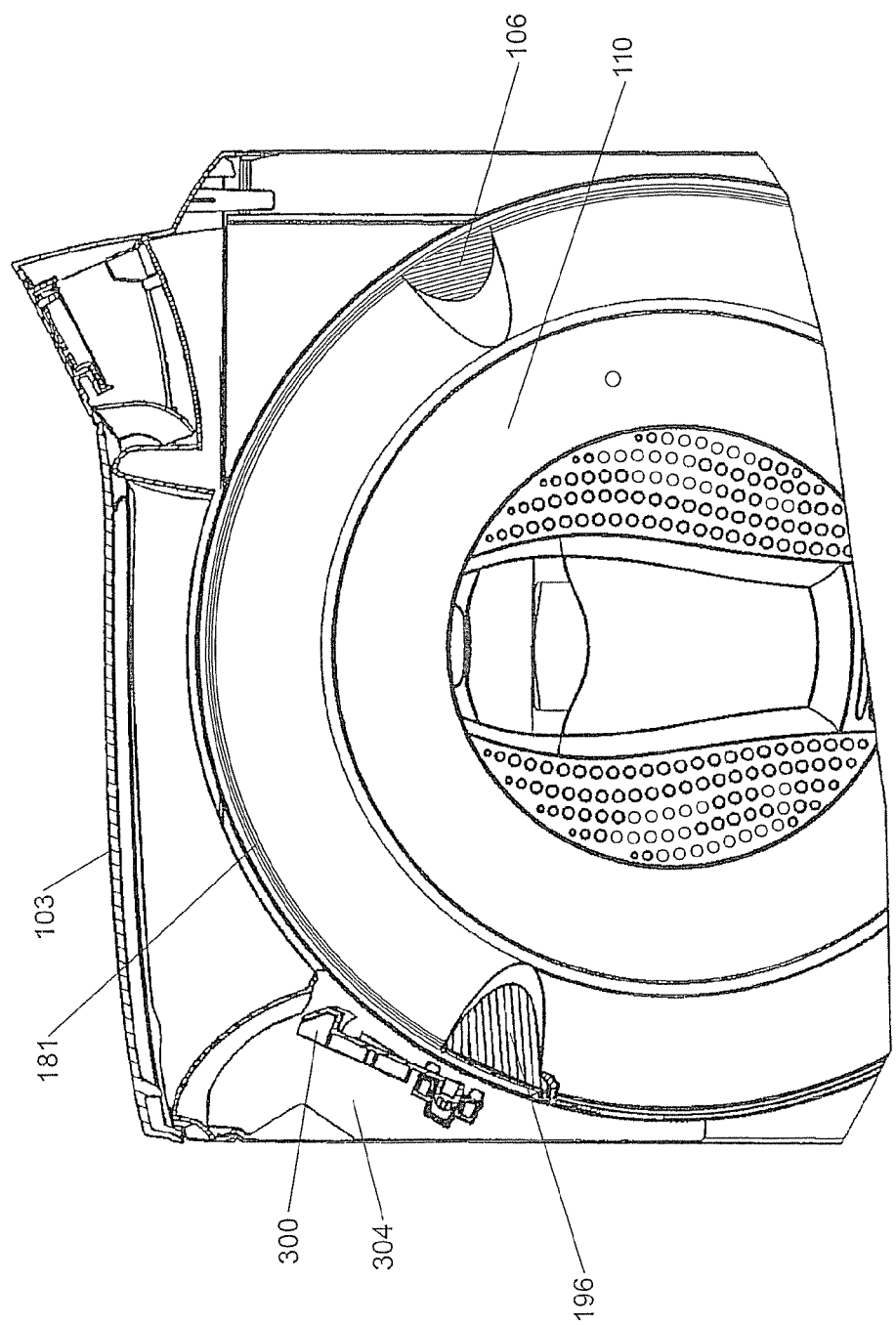
FIG. 6 is a cross sectional side elevation (from the right side) through a clothes dryer according to the preferred embodiment of the present invention, shown in an operating configuration with the drum fully closed.
Figure 35:
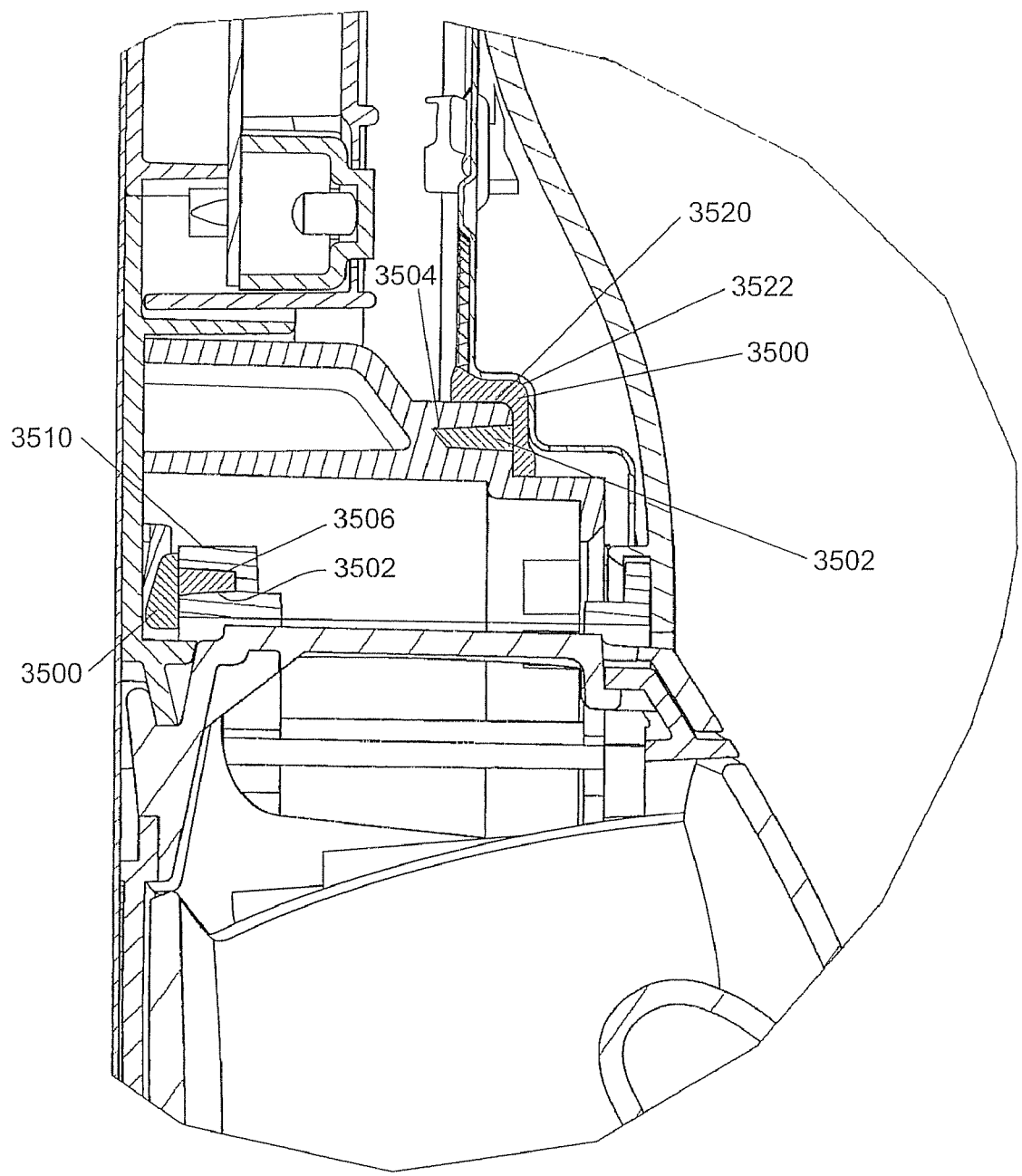
FIG. 35 is a cross section of an alternative outlet duct seal arrangement to that depicted in FIG. 5 and FIGS. 5a and 5b.

Support of the drum at its outlet end and further detail of the drum air outlet can be seen with reference to FIGS. 1, 5A and 5B. An alternative seal arrangement illustrated in FIG. 35 is also described. The drum end 105 includes a domed annular cover 165 secured thereto. A stationary central hub 131 is secured to the outlet end chassis 622. The central hub 131 has fore and aft perforated regions 122, and a central lint collecting container 130, removable from within the drum.

The lint collecting container 130 preferably includes an upper portion 650 and a lower portion 651. The upper portion 650 includes a handle element 652 moulded therein. The lower portion 651 is preferably formed of a clear or see through plastic material. The lower portion 651 includes a locating groove 653 to engage with a retaining ridge 654 of a housing 655 when in place. The upper portion 650 is held in place in the housing 655 by a resilient engagement of detents 660 in its lateral side walls 661 with cooperating protrusions in the housing.

The lint collector 130 is open at its upper end to receive lint peeled from an annular lint receiving surface 123 by a fixed position scraper 662. Lint falls from scraper 662 through the upper opening of the lint collector 130.

Figure 3:
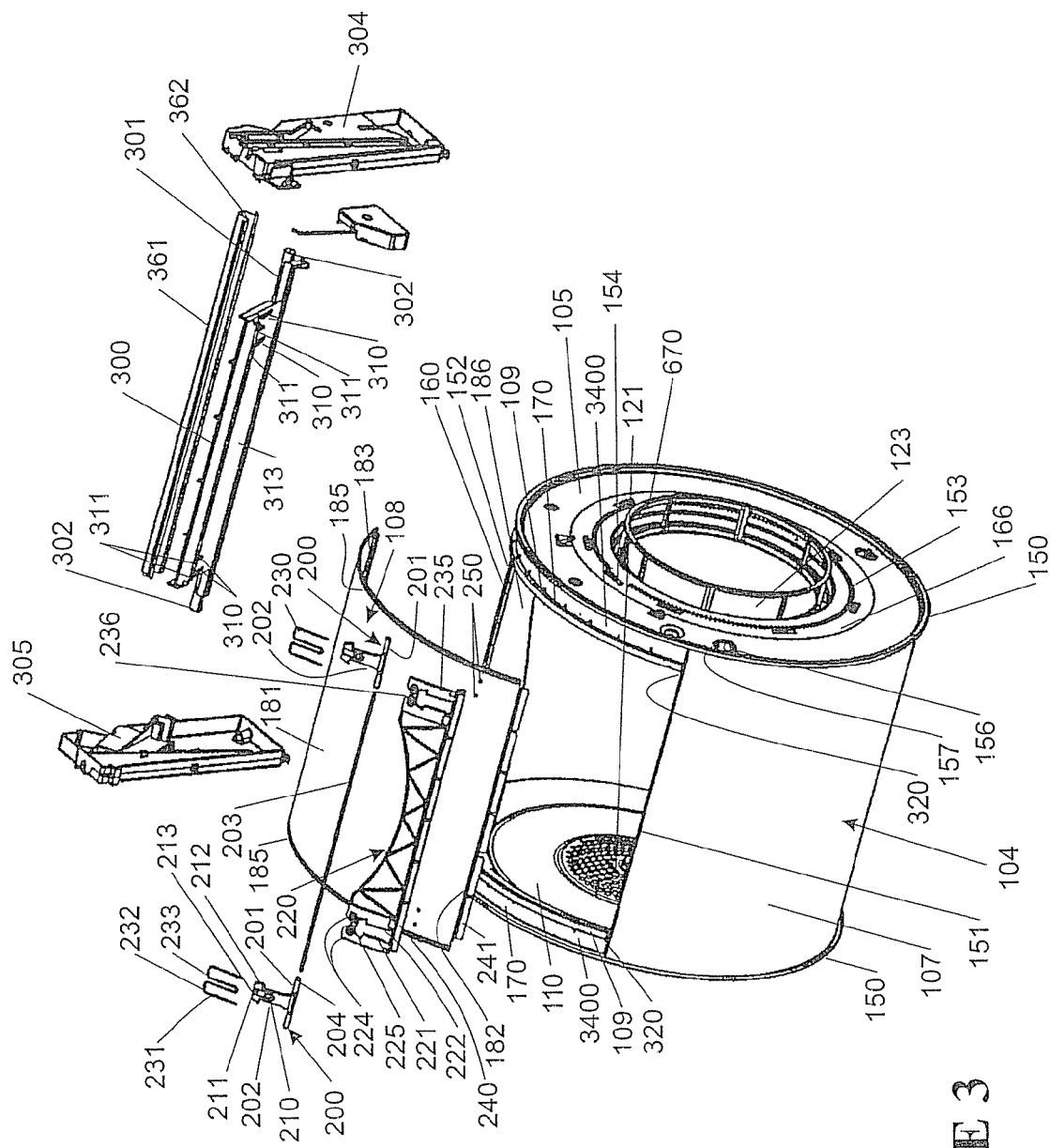
FIG. 3 is an isometric view assembly drawing, from the rear, showing the drum, and hatch engagement mechanism of the dryer of FIG. 1.
Figure 3A:
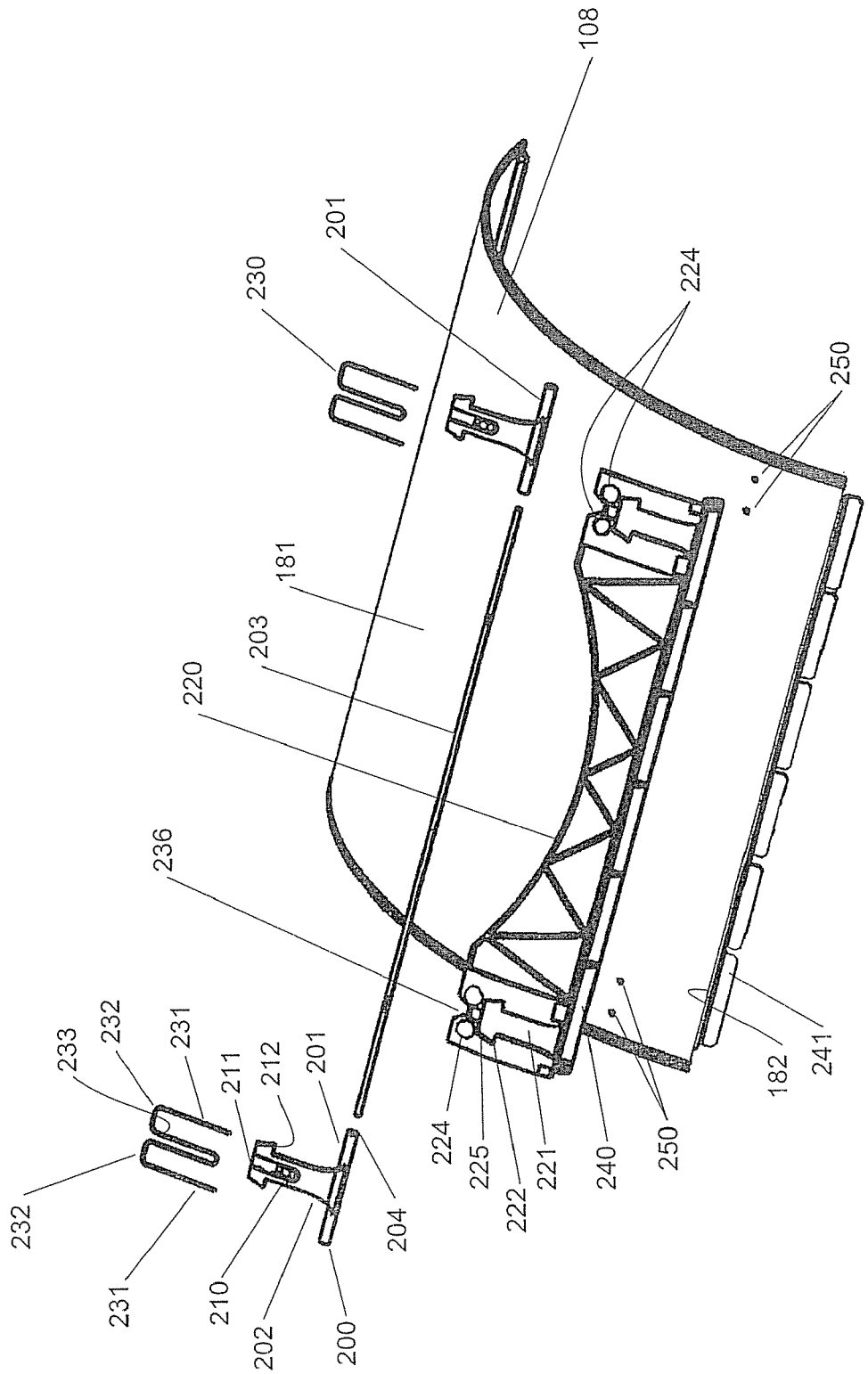
FIG. 3A is an enlarged view of the region of FIG. 3 including the hatch.
Figure 3B:
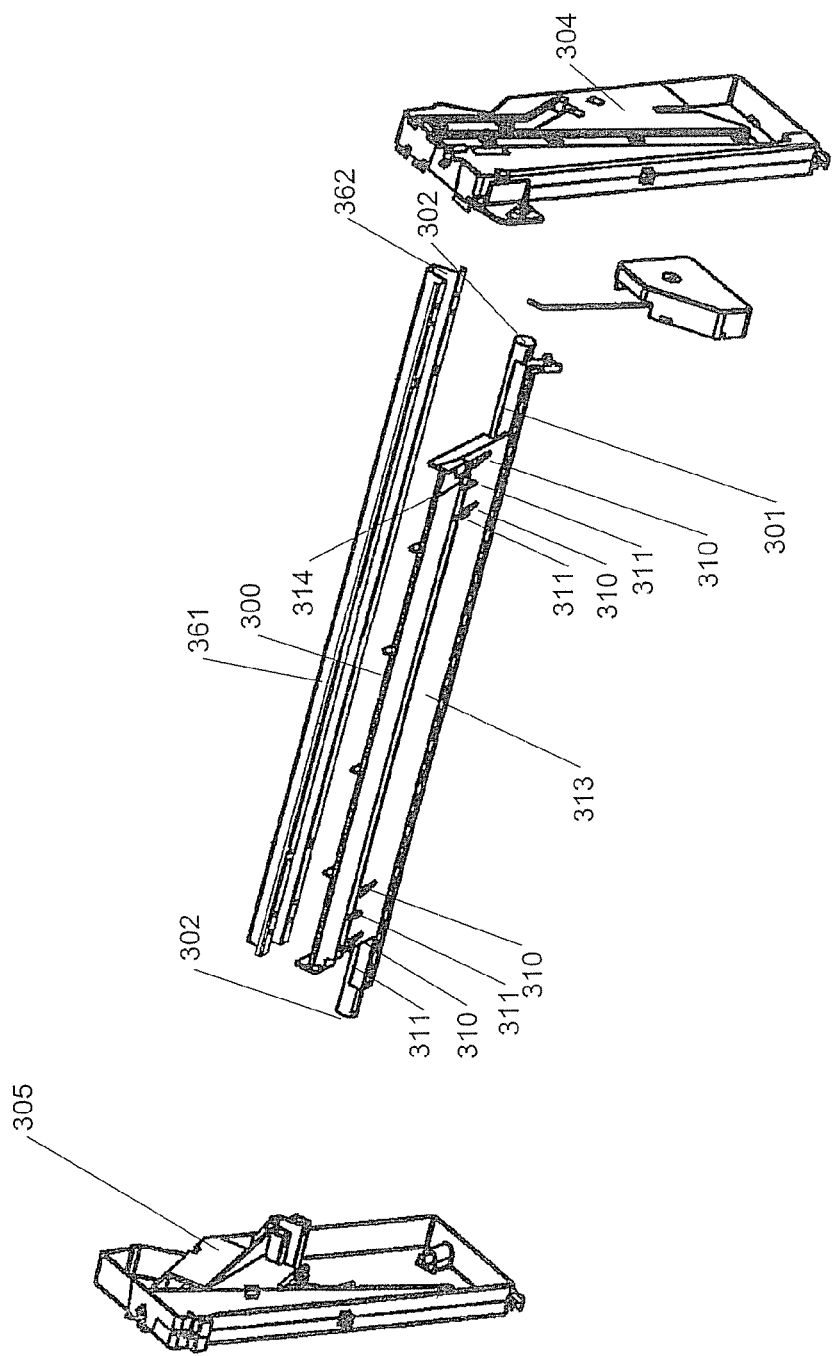
FIG. 3B is an enlarged view of the region of FIG. 3 including the hatch engaging member door and side housings.

The annular lint receiving surface 123 extends axially from the outer face of domed ring 165 at its inner edge, and rotates with the drum. The lint receiving surface 123 is supported on a ladder frame 670 which has a pair of spaced apart ring members with laterally extending rings spanning therebetween at intervals around its circumference. The form of supporting structure 670 is illustrated in FIG. 3. One ring member is fixed to the outer facing surface of domed cover 165. This may be, for example, by adhesive by plastic welding, or by fastening with any suitable fastener.

A pair of horizontal electrodes 683 are also fixed with the stationary central portion 131. The electrodes 683 are utilised in the dryer controller for sensing conductivity of the clothes load, and thereby the associated moisture content.

The annular lint filter 123 surrounds the stationary portion 131, and in turn is surrounded by an exhaust gases outlet manifold housing 603. The exhaust gases outlet manifold housing 603 is fixed to the inner face of the outlet end chassis 622 by suitable fasteners. The manifold housing 603 may for example comprise a plastic moulding, which forms an annular manifold chamber 605 in combination with the chassis 622. The annular chamber 605 exits to an outlet duct 606 at its lower end which in turn leads to a lateral outlet duct 124 connected with the fan housing 120.

FIGS. 5A and 5B are blown up views of regions of FIG. 5 showing regions of that cross section including detail of the annular supporting mechanism of the drum. The supporting mechanism is annular and therefore the main supporting details in FIG. 5A are mirrored in FIG. 5B.

In FIG. 5A it can be seen that the annular lint filter 123 is secured to the air outlet end of the drum. In particular the inner ring member 721 is clipped in place against the inwardly dished end facia 165 by a series of clips on an annular wall 727 extending from the outer face of the fixture 165. Such connection may alternatively or in addition be made by suitable fasteners, adhesives or plastic welding or the parts might be integrally formed. The stainless steel drum end 726 includes an annular inward step 730 between an outer planar portion and an inner planar portion, the inner planar portion comprising an annular flange 750 extending radially inwardly. The annular step 730 forms an essentially cylindrical portion.

The annular manifold 605 is enclosed between the manifold housing 603 and a manifold housing supporting part 741 fixed to the chassis plate 622. The manifold housing 603 includes a generally cylindrical portion 751 whose outer surface is generally parallel with the inner surface of cylindrical portion 730 of stainless steel drum end 726. The generally cylindrical portion 751 of the manifold housing 603 has a radially inwardly extending flange 752 extending from its open end, principally providing reinforcement and rigidly to the open end. The generally cylindrical portion 751 includes a plurality of receiving slots 753, extending from its corner with the flange 752, toward the supporting member 741. The slots 753 are spaced around the circumference of the cylindrical portion 751 and each receive a plastic bearing insert 681. The plastic bearing inserts 681 may be formed from any suitable hard wearing low friction material, for example TEFLON impregnated polyethylene.

An annular sealing strip 680 is also provided in the space between the cylindrical portion 730 of the drum end 726 and the cylindrical portion 751 of the housing 603. The sealing strip 680 may for example be a felt strip adhered to the outer surface of the cylindrical portion 751 of the housing 603, typically partially compressed to fit in the space between the two surfaces.

The plastic bearing inserts 681 preferably extend beyond the face of the flange 752 to at least partially butt the corner between cylindrical portion 730 and inwardly turned flange 750 of the drum end 726 and/or the face of the flange 750. The inserts 681 thus provide both radial and thrust bearing surfaces for the drum end against the perimeter of the outlet manifold housing 603.

An additional annular seal 682 is provided between the outer ring member 720 of the lint filter 123 and the housing supporting member 741. The housing supporting member 741 includes an annular inward step forming a substantially cylindrical radially outwardly facing surface 740, facing the radially inwardly facing surface 725 of the ring member 720. The annular seal 682, for example, a felt strip, is secured to the face 725 of ring member, for example by an adhesive. The strip is preferably lightly compressed in fitting between the surfaces 725 and 740.

According to an alternative form illustrated in FIG. 35 the sliding seal between the drum end and the outlet duct and/or the filter screen and the outlet duct, comprises a felt strip 3500 connected to a plastic bead 3502. The plastic bead 3502 is engaged in a retainer channel 3504 or 3506.

The retainer channel 3504 for the seal between the drum end and the duct is located in the outer face of the outlet duct. The retainer channel 3506 for the seal between the filter screen and the outlet duct is located in annular support member 3510 of the filter screen.

The retainer channel 3504 is located so that the felt strip of the seal between the drum end and the outlet duct fits within the space between an annular corner 3520 of said outlet duct and an annular corner 3522 of the drum end and extends around this corner.

The annular manifold chamber 605 is thus defined by fixed components carried by the chassis 622 (the manifold housing 603 and manifold housing supporting member 741) and rotating components of the drum end (including lint filter 123 with associated supporting structure, facia 165 and drum end 726, with the seal being maintained between the stationary and rotating components by annular seals 680 and 682. The lint collecting container 130 and perforated air inlet panel 131 and associated supporting assemblies are in effect disposed within the drum, backing on to the manifold supporting member 741 and surrounded by the lint filter 123.

Referring to FIGS. 1, 2 and 18 to 21 a motor 1800 drives rotation of the drum 104 via a belt and pulley reduction drive. The motor 1800 may be a standard induction motor with a driven shaft projecting from both ends. A drive pulley 1802 for driving rotation of the drum 104 is connected to one projecting end 1804 of the drive motor shaft. The drive belt 1810 passes around the drive pulley 1802 and around the drum 104 adjacent one end. A squirrel cage fan 1806 is connected to the other projecting end of the drive motor shaft for producing a drying air flow through the drum 104. The drying air flow through drum 104 is produced by the squirrel cage fan 1806 rotating within fan lousing 120 to draw air sequentially through the intake and heating duct, the drum inlet 121 (on drum end 110), the drum outlet 122 (on drum end 105), the annular lint filter 123 and the outlet duct 606 and lateral duct 124, and to exhaust the air through an exhaust port 128 at the rear of the cabinet 101.

A heater is located in the air inlet duct. The heater may comprise either a gas heater arrangement or an electrical heating coil arrangement, both of known type. Operation of the heating unit, whether of gas or electric type is controlled by an electronic control module 139.

Electronic control module 139 also controls the energisation of the drive motor for the drum and fan as will be described later in this specification. Motor speed control may, for example, be by PWM duty cycle control, on mains supply or by inverter frequency control of a rectified supply. The latter is preferred due to improved speed control and lower belt loads during reversal.

Air exiting drum 104 passes through the annular lint filter screen 123 of substantially cylindrical form and extending from the drum end 105. The air flow passes outward through the lint filter screen 123, depositing a lint layer on the internal surface of the screen. The manifold housing support 741 supports the perforated air outlet facia 122 which in turn supports the bulk lint collecting container 130 within a central aperture 131 of drum end 105. A scraper which forms part of bulk lint collecting container 130 (or alternatively supported directly by the air outlet duct) peels entrained lint from the surface of lint collecting screen 123 to fall through an opening in the top end of container 130 and collect within the container 130. The container 130 is removable from within the drum for emptying.

The air outlet end arrangement as described is the preferred form. However a comparatively simple conventional configuration might also be adopted.

For example a bearing assembly similar to that at the air inlet end of the drum could be used, with a lint filter screen provided covering the perforated air outlet, a protecting cover to guard the filter screen from the tumbling dryer load.

Motor Drive Assembly and Belt Tensioner

Figure 29:
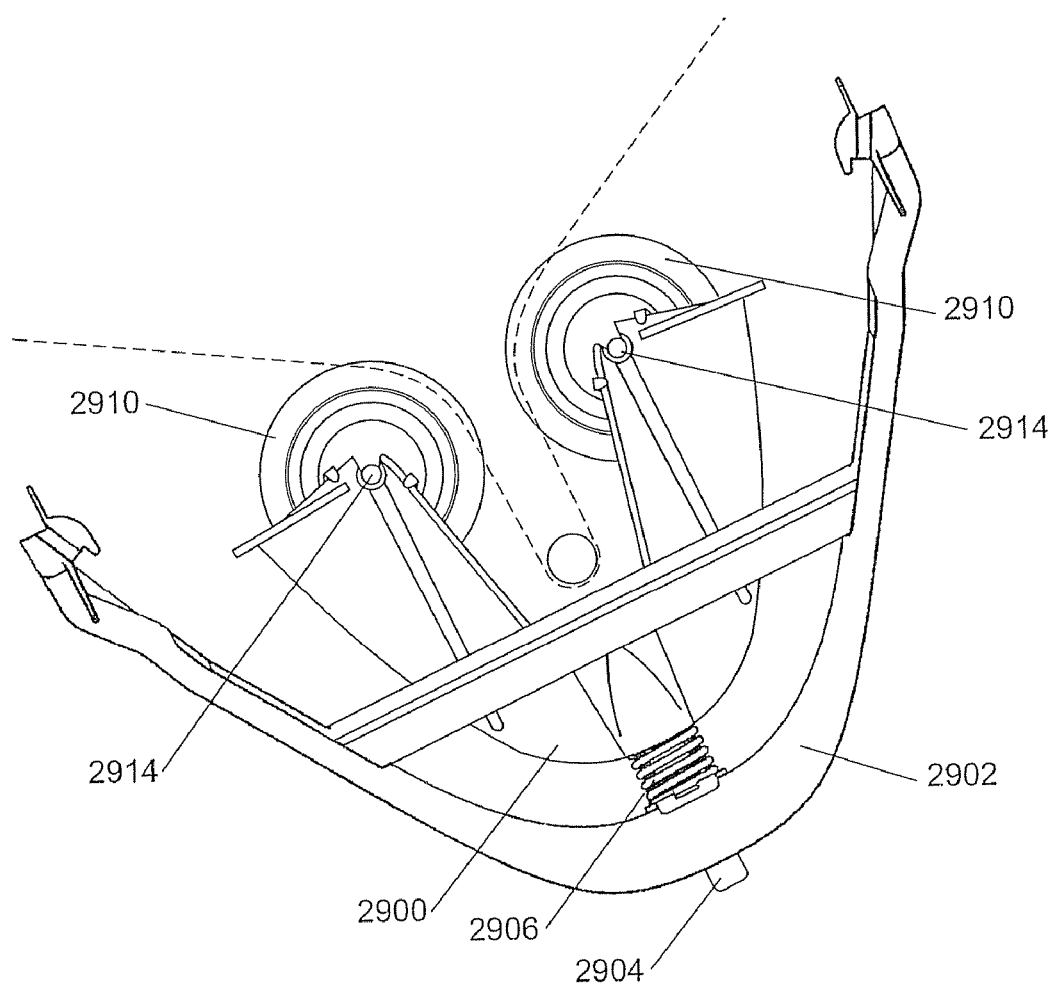
FIG. 29 is a side elevation of an alternative belt tensioner, generally similar to, but simpler than the belt tensioner of FIGS. 19 to 22. The belt tensioner of FIG. 29 is particularly suitable where the drive motor can be controlled to provide lower shock loads during reversal.
Figure 30:
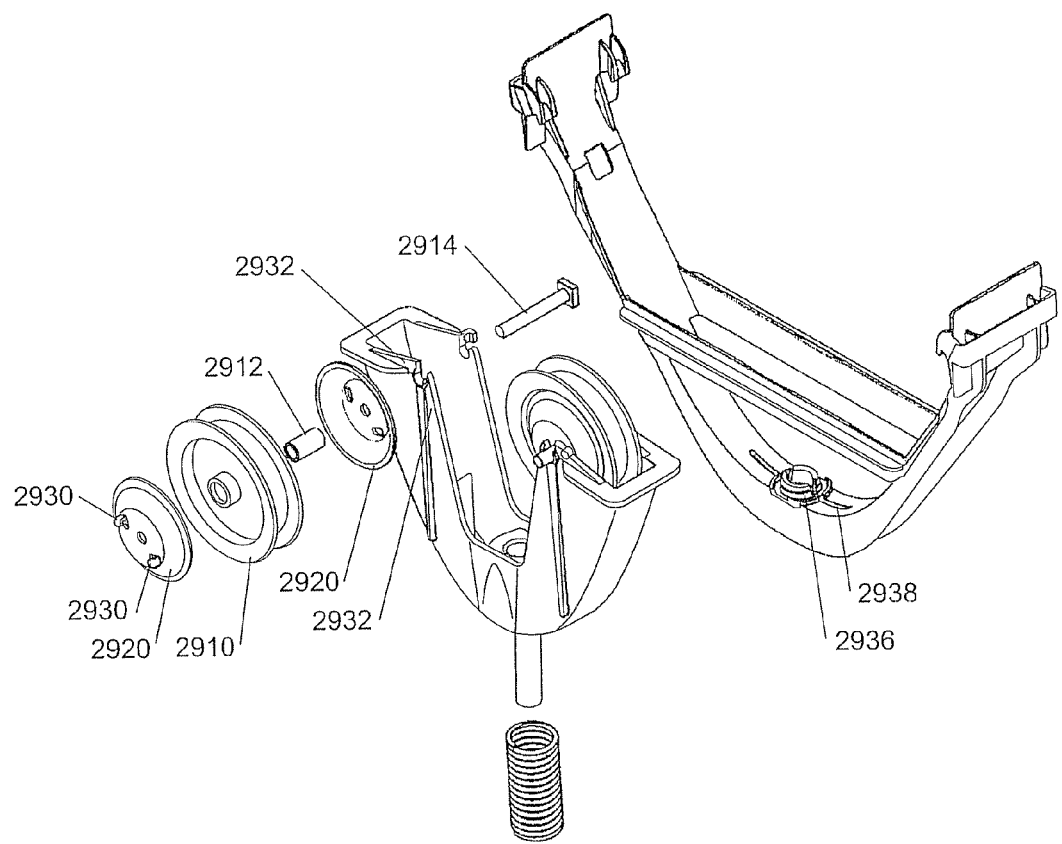
FIG. 30 is an assembly drawing of the belt tensioner of FIG. 29.

One preferred motor drive assembly and belt tensioner will be described with reference to FIGS. 1 and 18 to 22. Another preferred belt tensioner of broadly similar design is illustrated in FIGS. 29 and 30 and also described. The particular motor drive assembly, so far as it includes the mounting arrangement, and the particular preferred belt tensioners and mounting arrangements for the belt tensioner are described in the context of the preferred mechanical arrangement for the drying machine where the machine internals are movable out of the basic cabinet as a complete or nearly complete unit. Aspects of the motor drive assembly and the mounting arrangement for the belt tensioner could vary considerably while remaining within the intended scope of aspects of the present invention, particularly but not solely in embodiments of the laundry appliance that do not include this moving subassembly feature. In that case mounting the motor drive assembly directly from the base panel, and provision of idler pulleys directly and independently sprung from the side panel or base panel may suffice, although a simplified belt tensioner along the lines of those thereinafter described could still be used to advantage.

Figure 18:
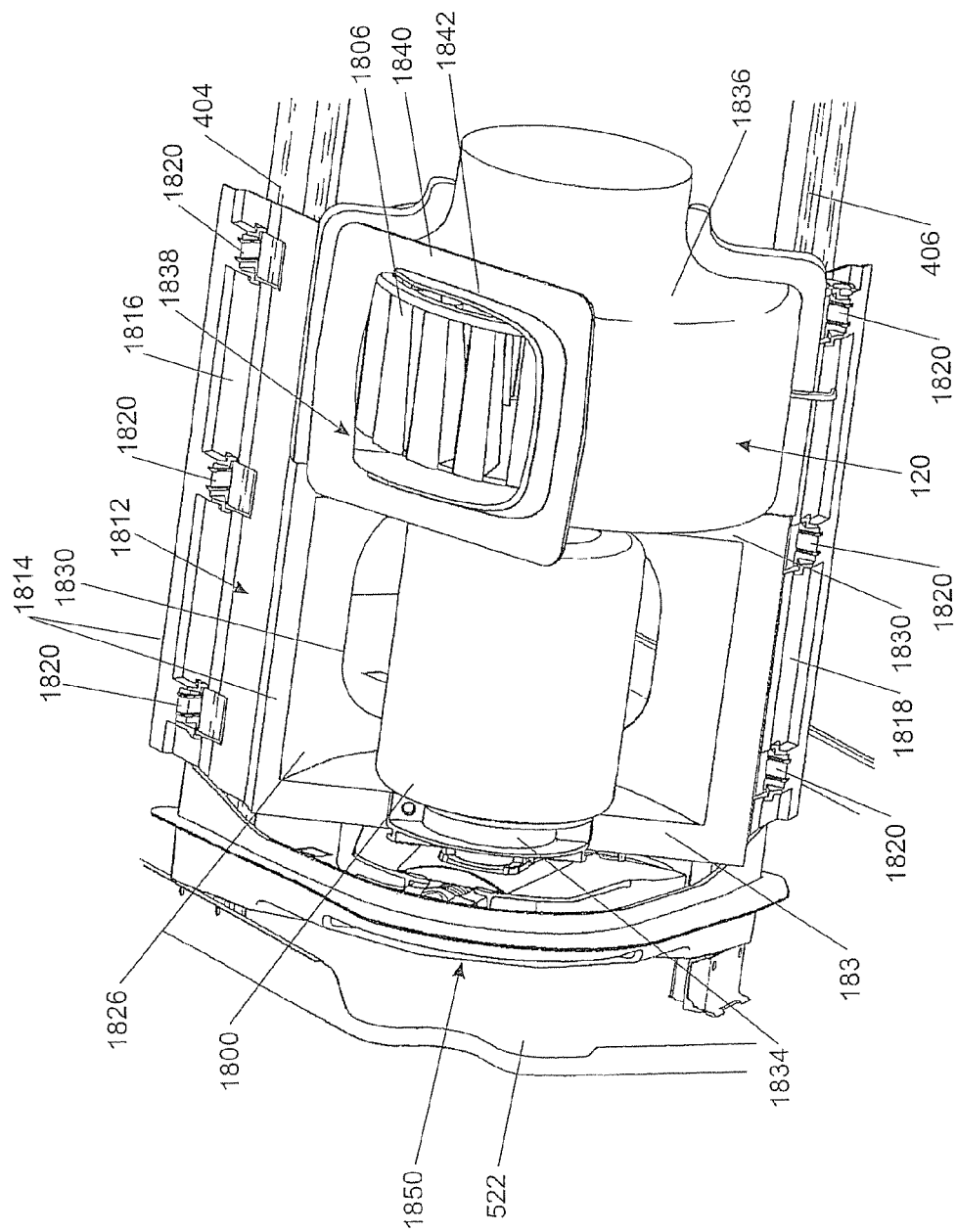
FIG. 18 is a view of the main drive assembly, including motor and housing, belt tensioner, fan and fan housing, all assembled to a side chassis panel and cross rails, viewed from below and to the rear, and without other components shown.
Figure 19:
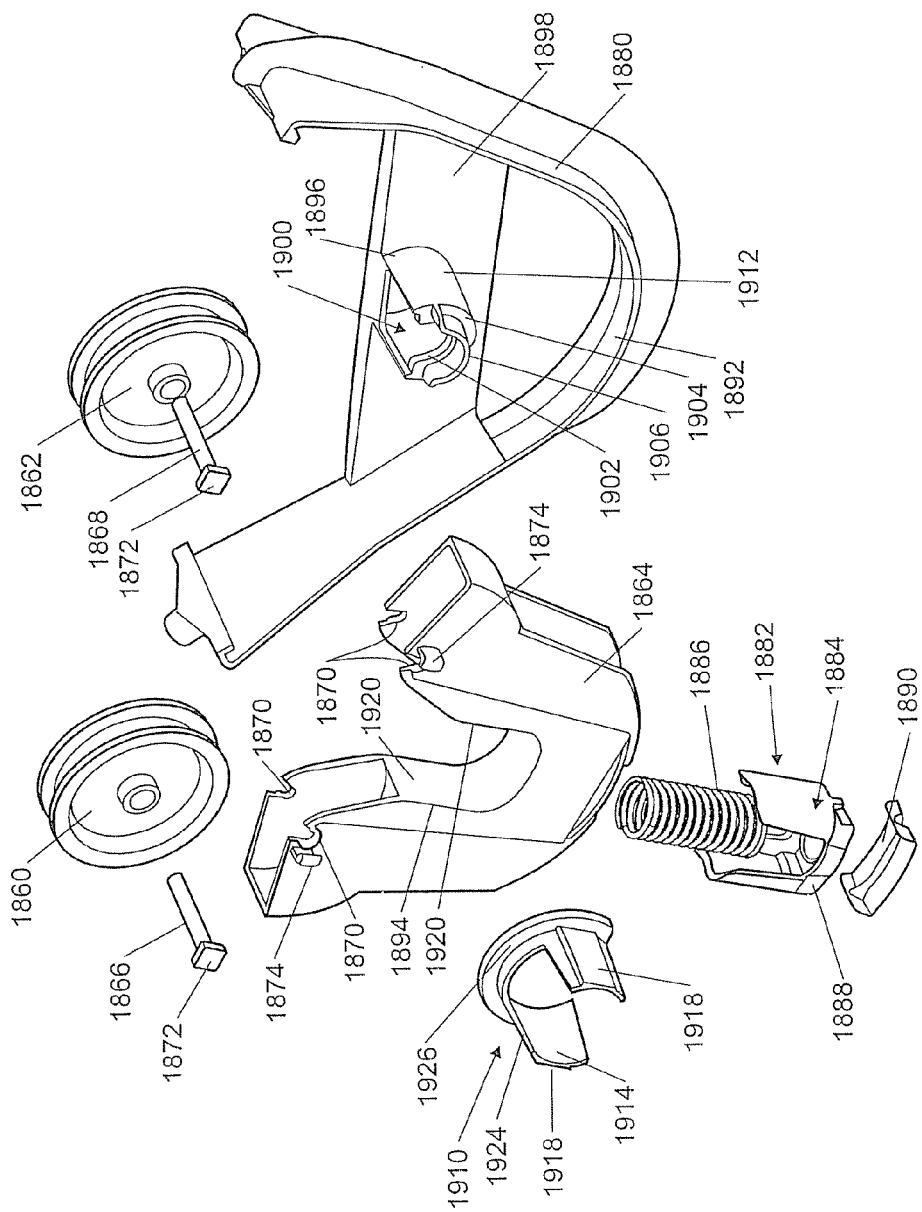
FIG. 19 is an assembly drawing of the belt tensioner assembly.
Figure 22:
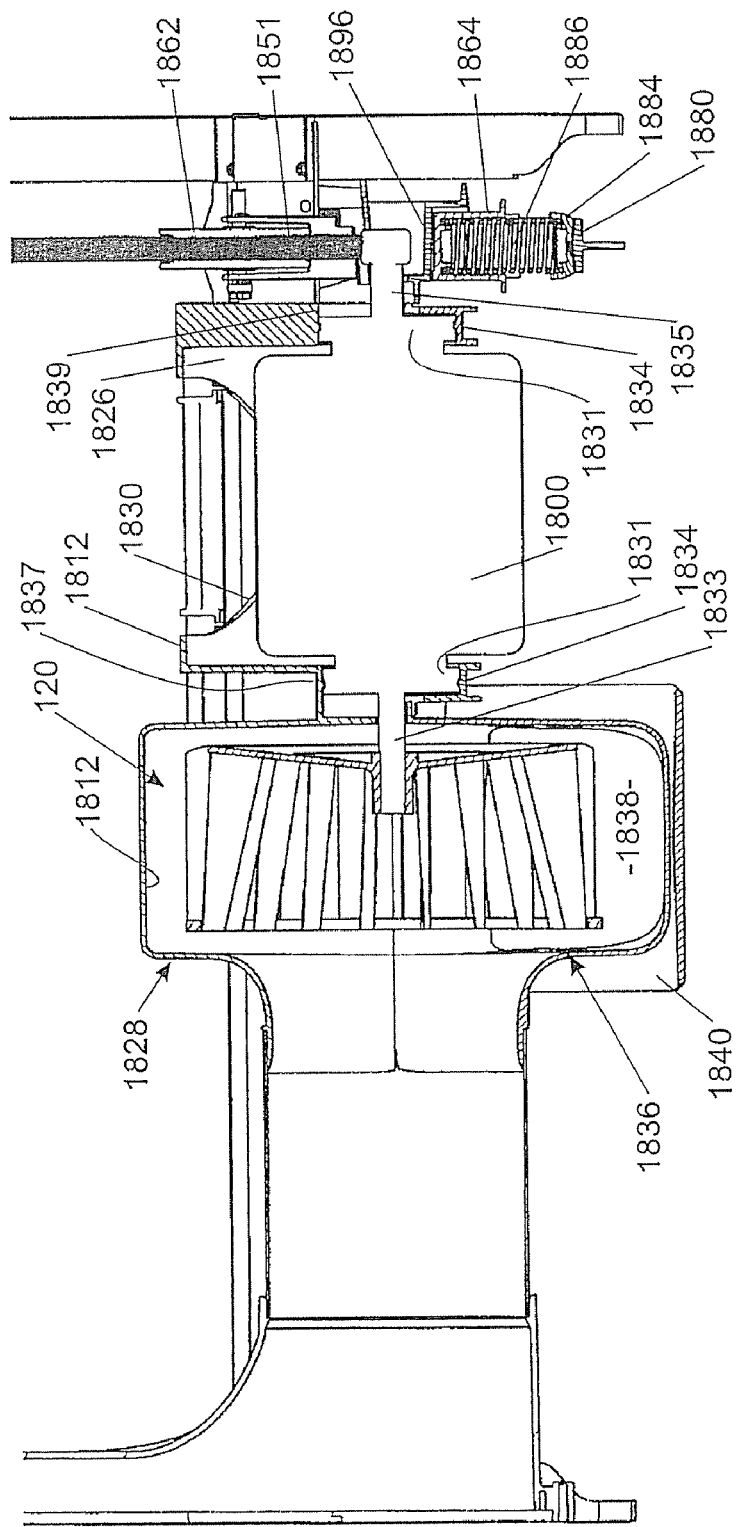
FIG. 22 is a cross section through the drum drive assembly including belt tensioner and drive motor and through the exhaust outlet duct, fan and fan housing.

Referring to FIGS. 18 and 22 the main drive motor 1800 and squirrel cage fan housing 120 are supported by a motor support bracket 1812 which in turn connects with connecting beams 406 and 404. The motor support bracket 1812 includes a frame 1814 and a pair of side members 1816 and 1818 each including a plurality of spaced apart clips 1820 which engage with turned over flanges of the respective connecting beams. The frame 1814 includes a motor well 1826 and the upper half 1828 (see FIG. 1) of fan housing 120.

The motor well 1826 preferably includes an aperture 1830 to elevate heat build up from the motor 1800. The motor 1800 includes a resilient mount 1831 at each end with the respective shaft portion 1833 and 1835 passing out through the resilient mount. The resilient mounts are connected with the motor housing and are non-rotating relative to the housing. The motor well 1826 has a pair of end walls 1832. Each end wall includes a semi-circular recess 8037, 1839 for receiving the respective resilient mounting of the motor. Motor mounting is completed by securing a mounting cover 1834 over each of the resilient mountings. The mounting covers 1834 have a second substantially semi circular recess such that with the covers 1834 engaged and secured with the end walls 1832 the resilient mountings of the motor are pressed and held by the semi circular recesses.

Prior to assembly of the motor to the motor support bracket 1812 a fan 1806 is secured to one projecting shaft 1833 and a drive pulley to the other shaft 1835. Once the motor is assembled with the motor bracket 1812, a lower half 1836 of fan housing 120 is secured to the motor bracket 1812 to substantially enclose the squirrel cage fan 1806. Referring to FIG. 23 the lower fan housing 1836 includes an outlet opening 1838 which is adjacent the cabinet outlet port 128 with the chassis rocked back in its operating position. The opening 1838 is surrounded by a flange 1840 with an upstand wall 1842 adjacent the lower perimeter of the opening 1838. The flange 1840 and upstand wall 1842 mate against an annular seal 1845 fitted to a complimentary surrounding flange 1843 of an outlet port component 1844 (FIG. 1). The annular seal may for example be a felt strip or similar soft and resilient material. The outlet port component 1844 includes an opening therethrough leading to outlet port 128 extending from its rear side.

With the supporting chassis rocked back into the cabinet the rearward and downward pressing of the combination of flange 1840 and upstand wall 1842 improves the sealing around the lower edge of opening 1838. A complimentary upstand wall 1847 from the surrounding flange of outlet port component 1844 partly extends to opening 1838 to improve the sealing of the upper portion of the connection. In addition to sealing against the resilient sealing material this arrangement further provides an overlapping seal across the connection between the lower fan housing 1836 and the outlet port component 1844.

A belt tensioner 1850 is secured to the connecting beams 404 and 406 in proximity with the drive pulley 1802.

The construction of one preferred embodiment the belt tensioner is particularly illustrated in FIGS. 19, 20*a* and 20*b* and FIG. 21. The construction of an alternative embodiment is illustrated in FIGS. 29 and 30.

Referring to FIGS. 19, 20*a*, 20*b*, and 21 the belt tensioner includes a pair of tensioner pulleys supported to have a fixed separation distance between their rotation axis and supported to be located with a bight of the drive belt passing therebetween. The bight 1851 of the drive belt passes between the tensioner of pulleys and around the main drive pulley 1802. The main drive pulley may optionally be machined on to the motor shaft. The support assembly for the tensioner pulleys presses the tensioner pulleys away from the drive pulley (toward the drum) 1802 in a direction to lengthen the bight passing therebetween, thereby promoting a longer overall belt path, but, being constrained by the drive belt, achieving instead a tensioning effect on the drive belt. The separation of the belt tensioner pulley running surfaces is also maintained to in tuin maintain a minimum angle of wrap of the drive belt around the drive pulley 1802.

On a machine without a subassembly capable of moving out of the interior of the cabinet carrying the drive system, these tensioner pulleys may be supported on a frame of any particular shape or design, supported from the cabinet base or walls or any drum supporting framework, and provided with a biasing agent to urge the pulleys toward the drum. For example the support may be by way of a spring loaded telescoping strut.

In the preferred construction of the drive belt tensioner the belt tensioner pulleys 1860 and 1862 are supported by a yoke component 1864 on shafts 1866 and 1868 respectively. The shafts 1866 and 1868 are located in receiving notches 1870 of the yoke 1864. The receiving notches 1870 include a tapering entry portion and part circular receiving portion. The shaft 1866 and 1868 pass a neck between the entry portion and receiving portion during assembly, to locate in the receiving portion and be captured there by the neck. Heads 1872 of the shafts 1866 and 1868 are captured by hooked protrusions 1874 located on the yoke 1864 adjacent each receiving notch 1870. The hooked protrusions 1874 prevent removal of shafts 1866 and 1868 from the yoke 1864 in an axial direction. Preferably the shaft heads are non-circular and cooperate with the protrusions 184 to prevent rotation relative to the yoke 164 which might otherwise induce wear in the receiving notches 1870 eventually leading to release of the shafts.

The yoke 1864 is supported from a belt tensioner bracket 1880 to be reciprocable relative to the diameter of the drive pulley 1802 and rotatable about the drive pulley 1802. A biasing agent is provided between the belt tensioner bracket 1880 and the yoke 1864 to press the yoke 1864 toward the drive pulley 1802. The biasing agent 1882 comprises a carrier 1884 which fits into a cavity 1885 (shown in dot-dash broken lines in FIGS. 20*a* and 20*b*) of yoke 1864 to be slidable into and out of the cavity 1885. A compression spring 1886 fits within the carrier 1884 and within the cavity in the yoke 1864 and operates between the yoke 1864 and the base 1888 of the carrier 1884. On its outer surface the base 1888 of carrier 1884 includes a wear resistant shoe 1890. With the belt tensioner assembled the shoe 1890 slides on an arcuate sliding track 1892 of the belt tensioner bracket 1880. The outer surface of shoe 1890 and the sliding surface 1892 are preferably of complimentary form to provide lateral location of the shoe 1890 on the sliding track. The complimentary form may comprise complimentary cross-sectional profiles such as concave and convex curves or square, trapezoidal or V-shaped ridges and channels. Preferably the profile is shallow to discourage the possibility of a binding engagement occurring between the sliding surfaces. In the preferred form depicted the profile is a shallow V-shaped channel for the outer surface of the shoe 1890 and a complimentary shallow V-shaped ridge for the sliding surface 1892 of the belt tensioning bracket 1880.

A pivotal slidable connection is provided between the yoke 1864 and the belt tensioner bracket 1880. A centre channel 1894 of yoke 1864 fitting over a central stub 1896 extending off a spanning web 1898 of belt tensioner bracket 1880. Web 1898 spans between the arms of bracket 1880. When assembled and in position the drive pulley 1802 of the drive motor projects into an open cavity 1900 of stub 1896 with the supporting shaft of the motor projecting through a notch 1902 in an end face 1904 of stub 1896. The cavity 1900 is open to its upper side such that in use the belt passing around the drive pulley passes out of the cavity 1900 through the open upper side. When assembled a part annular projection 1906 from stub 1896 locates against a receiving portion 1908 of resilient mount housing 1834. This ensures correct location of the pulley 1802 within the cavity 1900 and relative positioning of the pulley 1802 relative to the belt tensioner assembly.

A wear resistant low friction bush 1910 facilitates the pivotal connection between the yoke 1864 and belt tensioner bracket 1880. In particular the bush 1910 has a rotational interface with the stub 1896 and a slidable interface with the yoke 1864. The bush 1910 preferably includes at least one part frustoconical internal bearing surface 1914 matching an exterior part frustoconical surface 1912 of stub 1896. The bush 1910 further includes a pair of substantially parallel outwardly facing bearing surfaces 1918 which ride against inwardly facing bearing surfaces 1920 of the channel of the channel 1894 of yoke 1864. The bush 1910 includes an extensive notch 1924 in its upper portion to permit the belt to pass from cavity 1900 of stub 1896 when assembled. The bush 1910 includes a thrust flange 1926 which bears against a face of transverse web 1898 of the belt tensioner bracket when assembled. The thrust flange prevents the part frustoconical bearing surfaces of the stub 1896 and bush 1910 from binding in use.

Figure 20A:
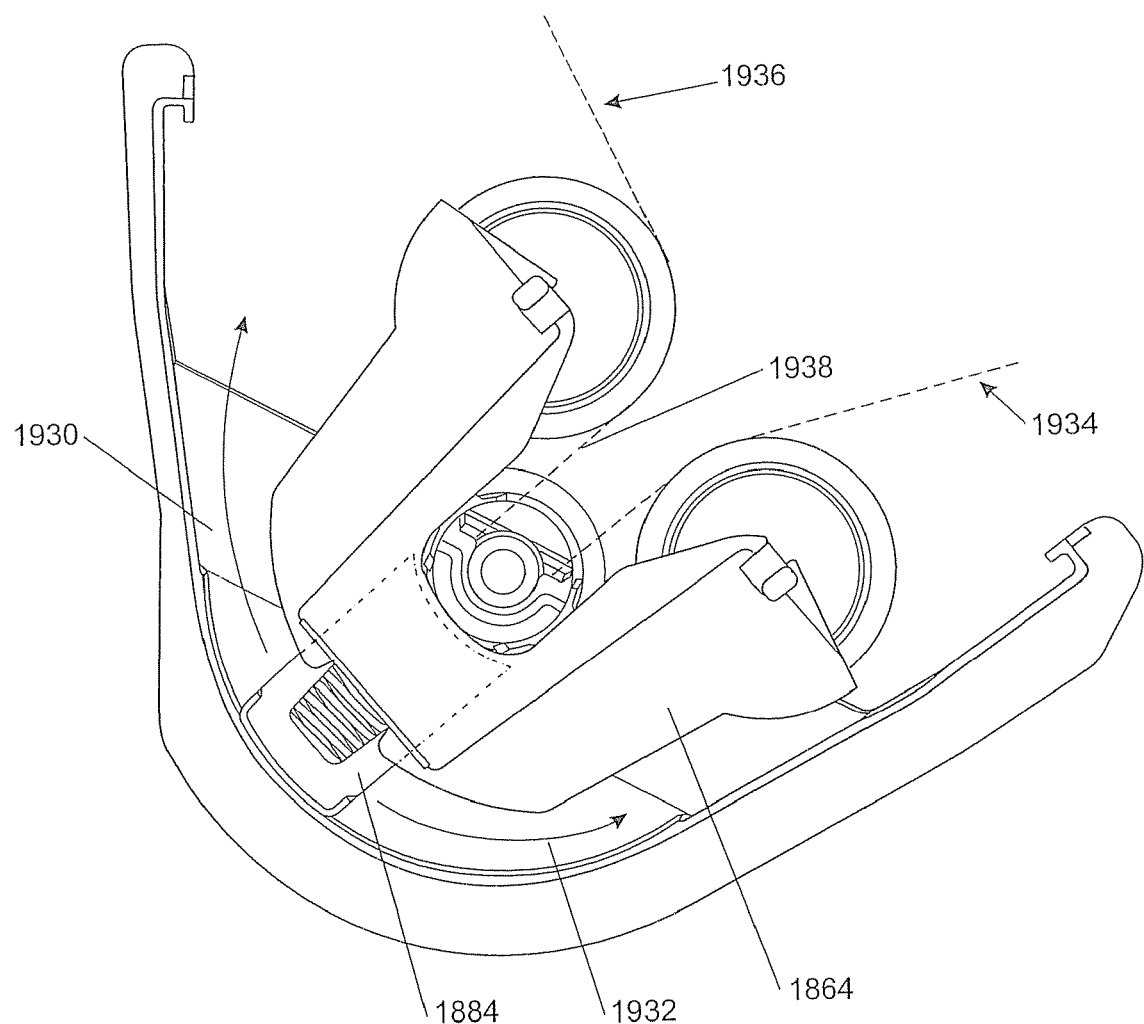
FIG. 20a is a side elevation of the belt tensioner assembly of FIG. 18, as assembled and showing the pulley carrier in a position of maximum belt take up.
Figure 20B:
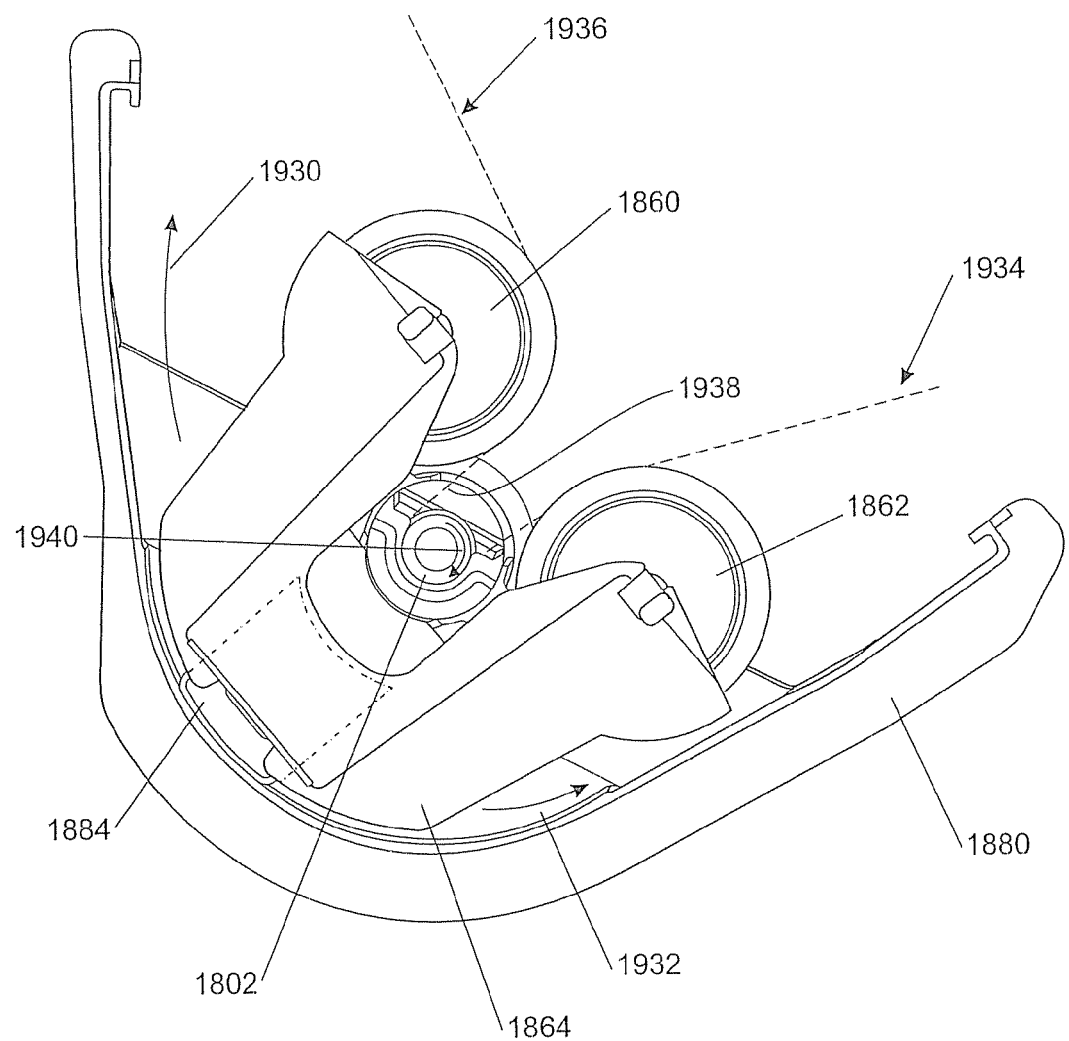
FIG. 20b is a side elevation of the belt tensioner assembly of FIG. 18, as assembled and showing the pulley carrier in a position of minimum belt take up.
Figure 21:
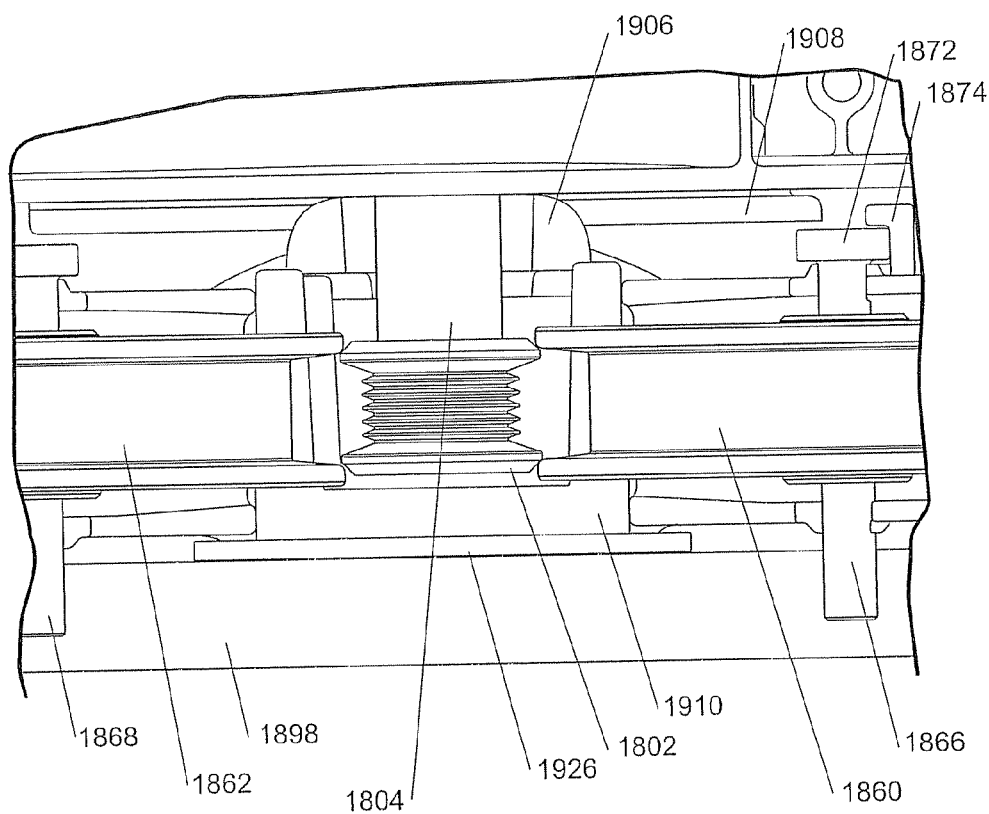
FIG. 21 is a view looking into the belt tensioner assembly, as assembled adjacent the motor support bracket, looking from above.

Referring now to FIGS. 20*a* and 20*b* operation of the belt tension is demonstrated. With a comparatively tight belt, for example a new belt, the yoke 1864 is prevented from significant forward movement toward the drive pulley 1802 by the tension in belt portions 1934 and 1936 which pass over the tension of pulleys 1860 and 1862. This is despite the pressing of the spring 1886 of biasing agent 1882. Carrier 1884 is depressed into the yoke 1864, retaining the spring 1886 in a compressed condition. This condition is depicted in FIG. 20*b*.

The spring 1886 continues to press the yoke 1864 toward the pulley 1802. Accordingly if the belt lengthens through age or wear the yoke 1864 is pressed forward to increase the length of the bight 1398 of the belt which passes around the pulley 1802, as is depicted in FIG. 20*a*. The tensioning pulleys continue to press against and tension the drive belt.

As has already been discussed the yoke 1864 is rotatable about the drive pulley 1802 as well as being slidable toward and away from the pulley. Rotation about the pulley 1802 is preferable to account for the differing belt tensions between the belt portions 1934 and 1936 with the pulley 1802 operating in differing rotational directions. In the FIGS. 20*a* and 20*b* a condition is shown which the yoke 1864 will adopt where the pulley is rotating in a clockwise direction as indicated by arrow 1940. Rotation in the clockwise direction results in a higher tension in belt portion 1934 than in belt portion 1936 causing the yoke 1864 to adopt this or a similar rotational position. If the pulley 1802 is rotated in the reverse, anti-clockwise, direction this will cause a greater tension in belt portion 1936 than in belt portion 1934 and will cause the yoke 1864 to rotate as indicated by arrow 1932, with the sliding carrier 1884 sliding across sliding surface 1892 of belt tensioner bracket 1880.

Accordingly the preferred belt tensioner
- is easy to install by clipping over the chassis beams,
- is compact, and rocks out with the chassis, with no connection to the cabinet or base panel,
- alters the belt path when the drive changes direction in a way which limits the maximum loads on the bearing surfaces of the tensioner pulleys, and
- provides frictional damping to the drive system, to control oscillation when changing speed or direction of drum rotation.

In the belt tensioner assembly most components may be formed from plastic materials. However some parts may be usefully formed from other materials. For example shafts 1866 and 1868 may be formed from steel and sliding shoe 1890 may be formed from a sheet metal pressing, for example from brass. Spring 1886 is preferably of conventional form and material for coil compression spring. It will be appreciated that other forms of spring, such as leaf spring or air spring may also be applicable. Given its function the bush 1910 preferably includes a friction reducing filler, for example a plastic composition including PTFE. The sliding carrier 1884 may also be advantageously provided with a similar low friction filler. In the motor support assembly, the motor support bracket 1812, lower fan housing 1836 and resilient support housings 1834 may all be moulded from suitable plastic material.

In the alternative embodiment of FIGS. 29 and 30 the biasing agent comprises a spring 2906 captured between the yoke 2900 and the bracket 2902. The yoke and the bracket are preferably provided with spring engagement features such as annular upstand 2936 on the bracket. A split through the upstand (and bracket in near vicinity) assists assembly by allowing the upstand to compress to fit within the bore of the spring. A spigot 2904 extends from the yoke and passes through an aperture in the bracket with generous clearance. The spring provides the yoke with flexibility of position with a limited centering force. This arrangement is suitable for motor arrangements giving low shock loading, such as an electronically commutated motor driven by a frequency controlled inverter.

Each pulley 2910 rotates on a bearing 2912 on a shaft 2914 supported by the yoke 2900. Heat dissipating flanges 2920 are connected with each shaft.

The heat dissipating flanges 2920 comprise a hub shield fitted on the shaft and substantially enclosing the hub region of either side of the pulley but not contacting the pulley. The hub shields, like the shaft, do not rotate and are screwed in place by lugs 2930, which clip over edges 2932 of the yoke. The shields are formed of material of high heat conductivity, preferably pressed sheet aluminum.

Drum Hatch 108

With particular reference to FIGS. 1 to 3 the drum (excluding the hatch) broadly is made up of a pair of circular drum ends 105 and 110 and part-cylindrical drum skin 107. The drum ends 105 and 110 are connected with the part-cylindrical drum skin 107 through a folded rim 150 formed along either circumferential periphery.

The drum further includes vanes 186 and 196 connected with the edges 160 and 151 respectively of the part-cylindrical drum skin defining edges of the drum opening. The vanes provide additional rigidity to the drum structure, supporting the drum skin (and in particular the free edges thereof). In addition the vanes are sculpted to assist with even distribution of the laundry load during operation.

The drum end 105 has a double skin in its hub region adjacent the air flow exit and lint collector. The internal face of the air exit and lint collector is displaced somewhat into the interior cylindrical chamber of the drum and is surrounded by inwardly dished facia 165. The outer layer 166 of the drum end includes an annular circle of dimples 153, with a non dimpled region 154 at known angular position relative to the drum opening. The region with an absence of dimples is used to detect the drum rotational position in operation. For locating purposes during manufacture, each vane includes an end protrusion 156 protruding through an aperture 157 in each drum end 105, 110.

Referring to FIG. 3, at the drum opening a pair of side baffles are fixed to the inner facing surfaces of the drum ends at the periphery of the drum and extending between the vanes 186 and 196. Each side baffle includes a tapering internal face and an inwardly facing track 109. The side baffles are preferably added plastic components and are connected with the respective drum ends by appropriate fasteners, such as self threading screws.

The drum hatch 108 includes a part cylindrical section 181 of stainless steel with opposed side edges 185, a leading edge 182 and a trailing edge 183. The side edges 185 are folded outward over on themselves to provide a reinforced edge and present a rolled edge to the channels. An S-bend 184 is formed in the trailing edge 183 of the drum hatch 108. The S-bend is formed to present both an inward hump and an outward hump at the trailing edge of the drum hatch 108 across the width of the drum hatch. The internal hump rides over the external surface of the part-cylindrical drum skin 107 and presents a low friction bearing surface to the drum skin. The external hump ensures that the cut edge of the hatch skin 181 is presented toward the drum rather than away from the drum, improving safety during any maintenance or corrective work on the machine.

The leading edge 182 of the drum hatch 108 is provided with parts of a mechanism for enabling the securement of the drum hatch position relative to the dryer cabinet. In particular the drum hatch is provided with a pair of T-shaped pivoting arms 200. The T-shaped pivoting arms 200 include transverse catch members 201 and a pivot aim 202 connecting between the transverse catch members 201 and the part-cylindrical drum hatch skin 181. The catch members 201 include an axial bore extending from their inner end toward their outer end. A joining rod 203 has its ends fitted within the axial bores 204 of the catch members 201. The rod 203 provides a strengthening backbone for the catch members 201 and reduces the degrees of freedom of their movement. The pivot arms 200 are connected with the drum hatch 108 at their ends away from the catch members 201. The pivot arms 202 are secured to a central double leg 233 of a flat spring member 230. The double arm 233 resides within a recess 213 in the outer face of the pivot arm 202 and is held in place around a centrally located upstand 210 at the head of the recess 213. The double leg 233 is connected to a pair of outer side legs 231 of the spring member 230 via a pair of laterally extending torten portions 232. The outer legs 231 of spring member 230 are clamped between the inner face 235 of a hatch edge stiffening plate 220 and the outer surface of the part-cylindrical drum hatch skin 181. The clamped portions of the spring member 230 may be located within grooves or channels formed in the inner face of the stiffening plate 220.

A stiffening plate 220 is preferably secured to the drum hatch 108. A leading lip 240 of the stiffening member 220 includes slots or recesses in a back edge thereof and is fitted over forward extending tongues 241 of the front edge 182 of drum hatch skin 181. The rear edge of the stiffening member 220 is secured to drum hatch skin 181 by fasteners passing into securing holes 224 of the stiffening member 220. The securing holes 224 preferably correspond with the apexes of the U-shaped sections formed by (sequentially) each connected outer leg 231, torten portion 232 and double leg 233 of spring member 230. This provides additional securement of the spring member 230 in its place between the stiffening member 220 and the drum hatch skin 181.

Figure 31:
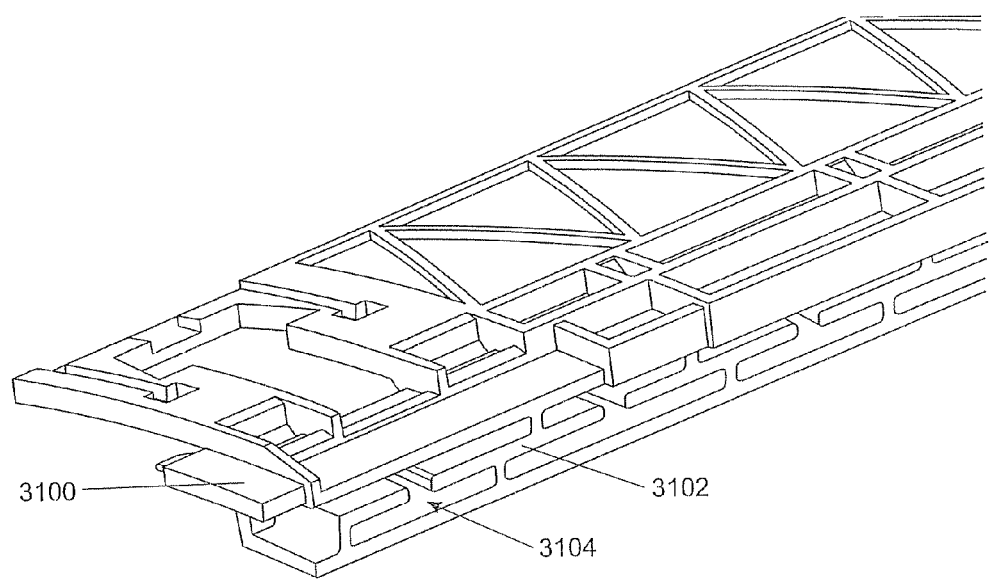
FIG. 31 is a view of one end of a drum lid leading edge bracket, according to one preferred embodiment which includes a first labyrinth arrangement.

According to an alternative embodiment of stiffening plate illustrated in FIG. 31, the plate includes a lateral wing 3100 at either end that slides within the track 109 to reduce any bending load on the edge of the hatch.

Referring again to FIG. 3 the flat spring 230 is secured in position with the central double leg 233 passing over a neck recess 236 between the screw securing holes 224 to secure on the outer face of the pivot arm 202.

The pivot arm 202 resides within a recess or aperture 221 of the stiffening member 220. The aperture 221 is preferably shaped to match the shape of pivot arm 202 to provide a snug location with the pivot arm 202 in a first position against the drum hatch skin 181.

The aperture 221 includes a forwardly facing butting face 225 adjacent the recessed neck 236 and securing holes 224. The butting face 225 butts against a corresponding butting face 211 at the end of pivot arm 202 distil from the catch member 201.

The aperture 221 also includes rear facing butting surfaces 222 which butt against forward facing butting surfaces 212 of pivot arm 202 with the pivot arm 202 in its first position. Therefore, at least in its first position, the pivot arm 202 is prevented from significant forward movement relative to the stiffening member 220 by butting of the faces 222 and 212.

The pivot arms 202 are pivotable about their ends distal from the catch 201 to a second condition away from the drum hatch skin 181. In both the first and second position the T-shaped pivot member 200 is restrained from rearward movement relative to the stiffening member 220 by butting of the pivot member butting surface 211 and the stiffening member butting surface 225.

Clearly an alternative but less preferred connection between the catch members 201 and the drum hatch 181 could include simple hinges fastened to the drum hatch skin with any appropriate spring mechanism operating between the drum hatch skin and the catch member.

However the presently described mechanism is preferred due its simplicity of assembly which is now described. The stiffening member 220 is fitted to the drum hatch skin 181 by fitting the recesses of lip 240 over tongues 241 and inserting fastenings through holes 250 of drum hatch skin 181 to secure through corresponding holes 224 of the stiffening member 220. The T-shaped pivot arms 200 are pre-assembled with the connecting rod 203. This pivoting assembly may then be secured to the stiffening member 220 by passing the outer legs 231 of the spring members 230 below the under side of the stiffening member 220 from the rearward edge thereof with the u-shaped section 233 pushed into the pivot arm recess 213.

Figure 32:
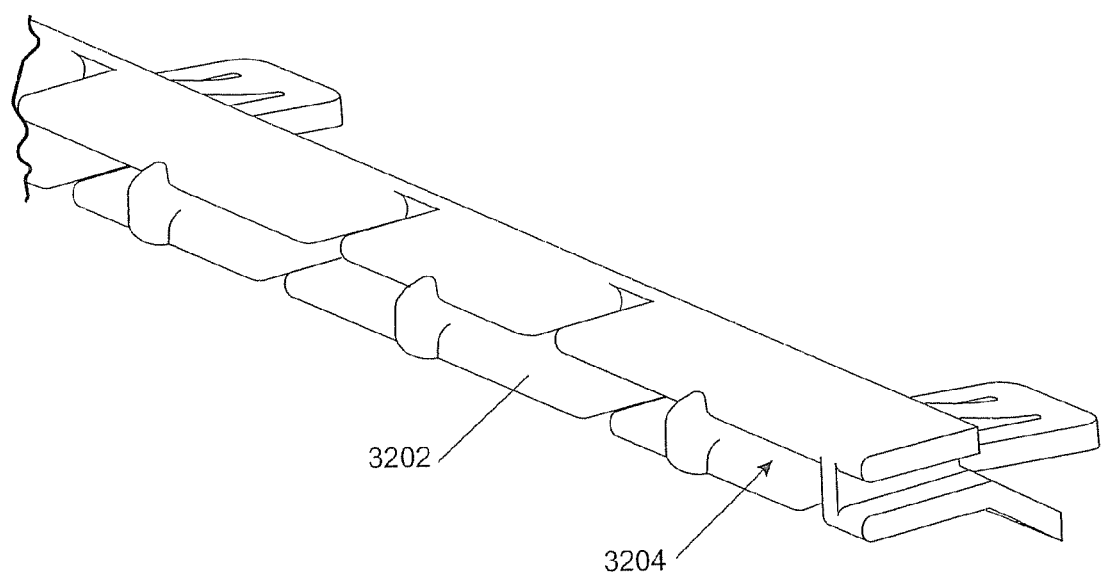
FIG. 32 is a view of an edge component for connecting with the edge of the drum skin to meet the leading edge of the lid. The edge component includes a complementary labyrinth arrangement for engaging with the labyrinth arrangement of the member of FIG. 31.
Figure 33:
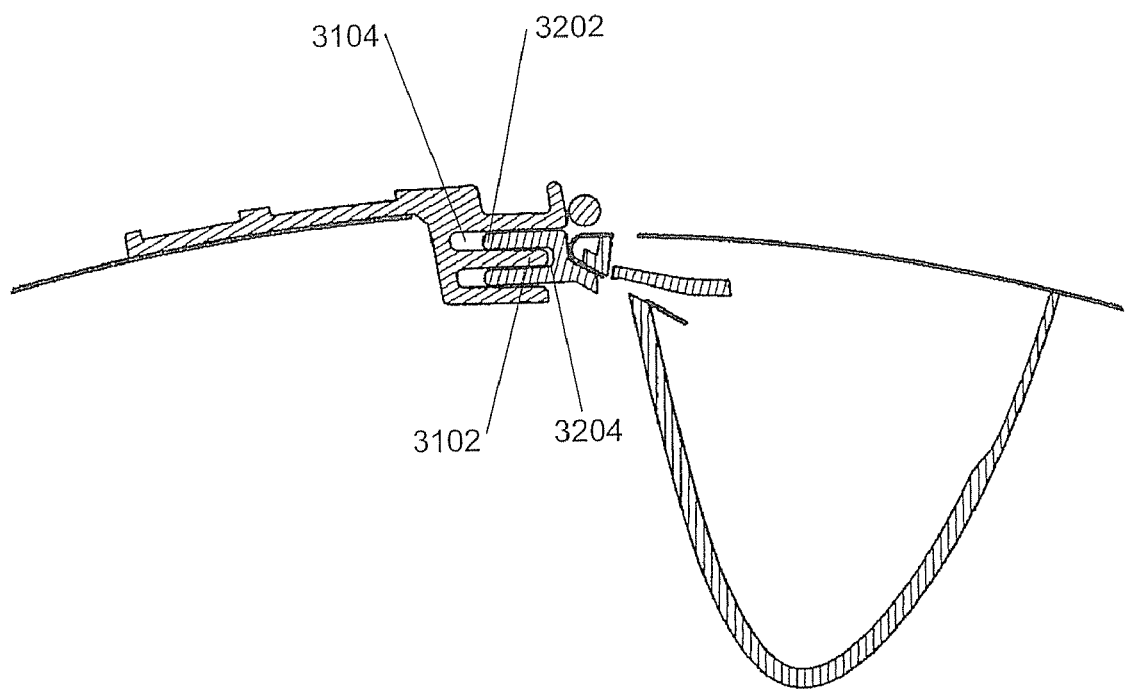
FIG. 33 is a cross section showing connection of the leading edge bracket of FIG. 31 to the leading edge of the drum lid and the connection of the edge component of FIG. 32 to the corresponding edge of the drum skin and to its respective vane.

According to an alternative and preferred embodiment illustrated in FIGS. 31 to 33 the drum hatch stiffening member includes a labyrinth formation along its opening edge and the opposed edge of the drum opening includes a complementary labyrinth form, such that, for the drum hatch to fully close the labyrinth forms must engage into one another with close tolerance.

The labyrinthine formation of the stiffening member (FIG. 31) and the labyrinthine form of the drum opening edge (FIG. 32) include interleaving protuberant walls 3102 and 3202 for engagement into complementary socket forms 3104 and 3204, of the opposed part.

The walls must fully engage in the sockets, as in FIG. 33, for the lid to fully close. If clothing is trapped in the closure the engagement is prohibited by the pressure of even very thin fabrics which span over the multiple spaces of the sockets.

Figure 33A:
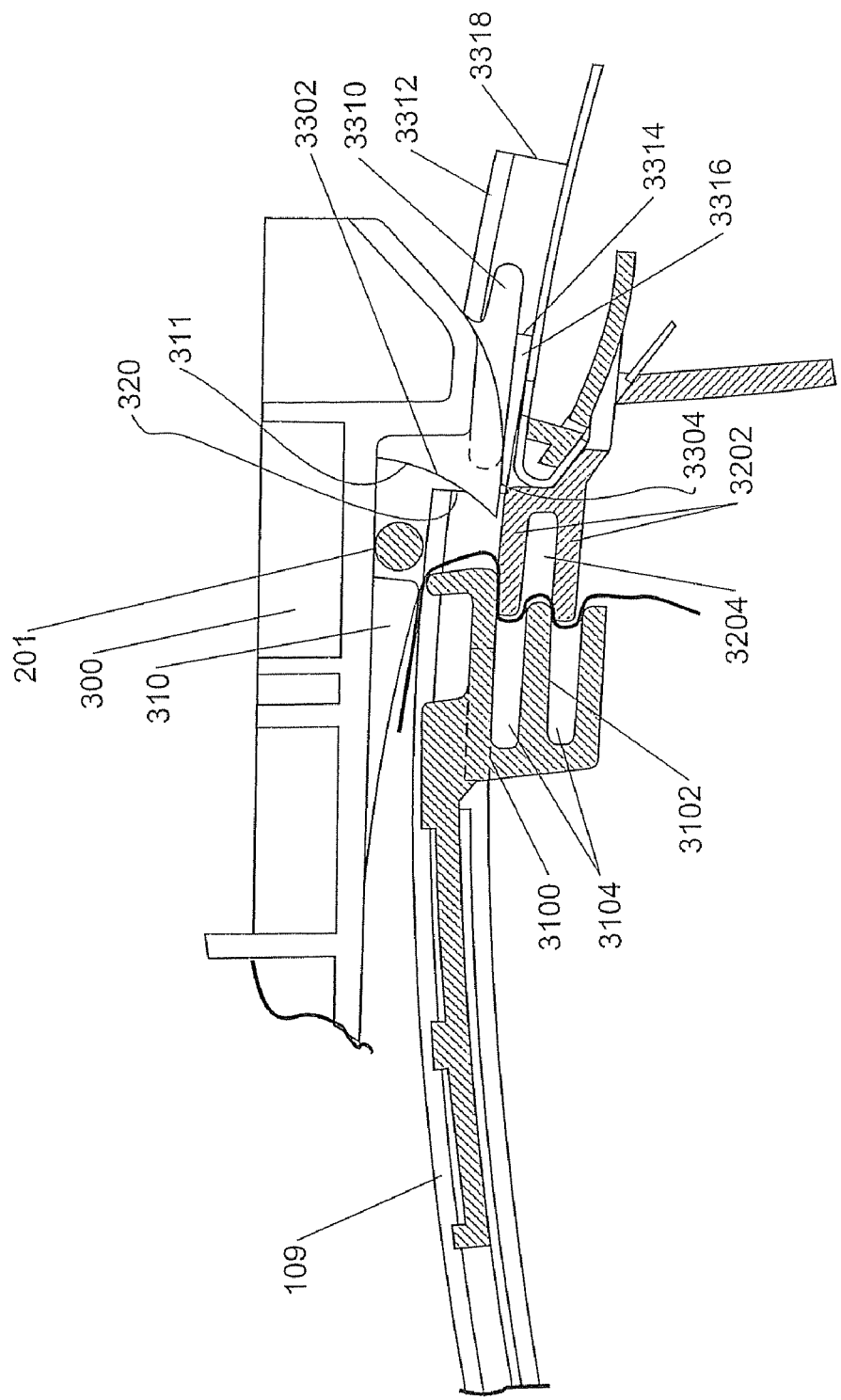
FIG. 33a is a cross section showing the parts depicted in FIG. 33 in a position retained open by an obstruction interposed between the closing edges.
Figure 34:
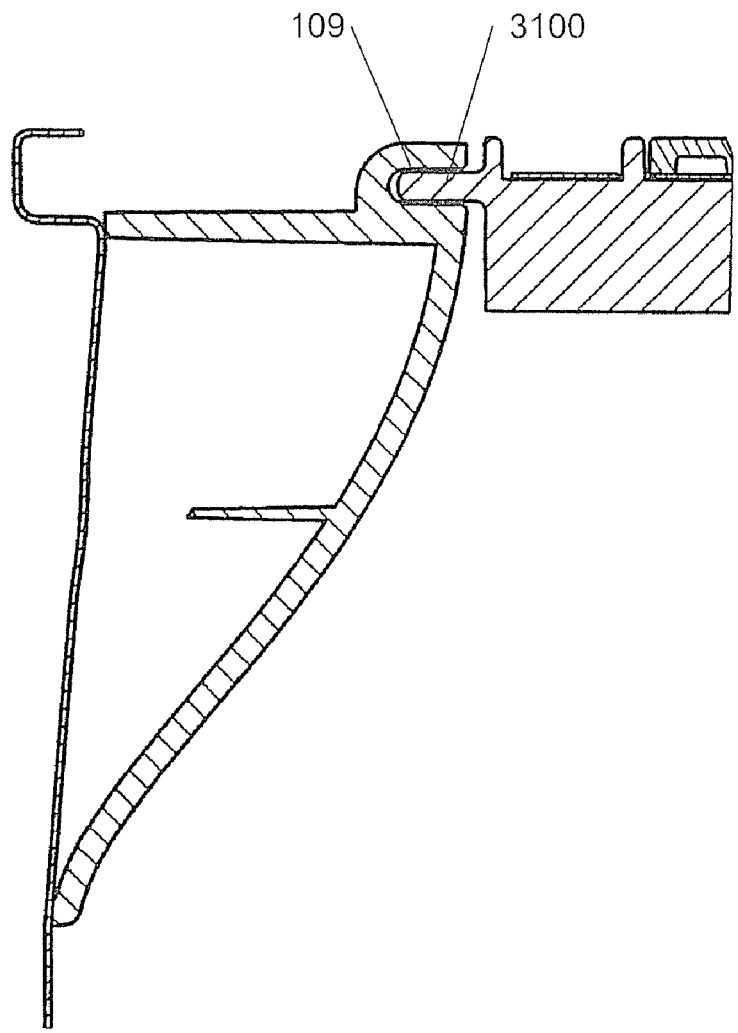
FIG. 34 is a cross section on a radial plane showing a peripheral portion of a drum end, with a drum end support member extending therefrom. The drum end support member includes an inwardly facing channel receiving a lateral wing of the lid edge bracket of FIG. 31.

As illustrated in FIG. 33A, if fabric is interposed in the closing gap when the stiffening member comes together with the open drum edge initial engagement of the pair of protuberant walls 3202 into the respective sockets 3104 binds and secures the fabric in two spaced apart regions. A bridge of fabric spanning between these regions is trapped over protuberant wall 3102 which is attempting to enter socket 3204. Close tolerancing of protuberant walls 3202 into sockets 3104 can ensure that this restraining bridge is created even by very thin materials, along the thinnest materials and/or very stretchy materials, such as pantyhose, may still not be sufficient to prevent closure with realistic tolerances. However it is also the case that materials which do not prevent closure are generally of insufficient strength to cause damage within the machine during operational rotation of the drum and are not generally present in valuable garments.

Also as illustrated in FIG. 33A until complete engagement of the complementary labyrinth forms the catch members 201 remain trapped within the confines of the drum engaging member above the outer surface of track 109. Thus the hatch is not released by the drum hatch engaging member and rotation of the drum is stalled. Preferably the motor controller detects cessation of drum rotation, such as by methods outlined later in relation to drum opening operations. Preferably the controller then reopens the drum by commencing a drum opening rotation, and operates an appropriate user notification.

Drum Hatch Engaging Mechanism

The clothes dryer is provided with a drum hatch engaging mechanism connected with the cabinet. The mechanism secures the drum hatch against movement relative to the housing at the beginning of a drum opening operation and throughout the period when the drum is open or partially open, and releases the drum hatch at the conclusion of a drum closing operation. In performing this function the drum hatch engaging mechanism operates to engage, hold and subsequently release the catch members 201 of T-shaped pivot arms 200.

Referring particularly to FIGS. 3 to 3B, 6 to 10 and to FIG. 33A, the drum hatch engaging mechanism includes an engaging member with one or more ramped abutments 311 associated with each of the catch members 201, for lifting and halting forward movement of the catch members 201 during an opening rotation of the drum, and one of more closing abutments 310 associated with each of the catch members 201, for holding the catch members 201 captive during a closing rotation of the drum.

In the preferred form of the invention the drum engaging member comprises a pivoting door or flap 300. The pivoting flap 300 includes a pivot bar 301 along a rear edge which extends laterally as a pair of cylindrical stubs 302 to engage within sockets of side housings 304 and 305. A channel member 361 spans between the housings 304 and 305 and is connected to the housings at its ends. The channel member 361 maintains accurate separation of the housings 304 and 305 and location of rotation bar 301 therebetween. The pivot bar 301 resides within an open channel 362 of the channel member 361. The channel 362 supports the pivot rod 301 along its length, reducing the stresses on stubs 302.

The flap 300 includes a leading face 315 spanning the width of the drum opening. The face 315 provides a barrier to entry into the space between the drum and the housing when the flap 300 is in its engaging position.

The ramped abutments 311 are provided projecting from an inside face backing on to leading face 315 and projecting toward the pivot bar 301. The ramped abutments take the form of teeth, tapering to a point spaced from the engaging member 300. Each tooth has an internal edge 3302 for receiving the catch member 201 and an external edge 3304 for sliding on the surface on the drum skin.

The flap 300 has a main connecting face 313 connecting between the internal face and the pivot bar 301 across the width of the flap. The closing abutments 310 project from the face 313 and have abutment edges 314 facing the ramped abutments 311. The projection of closing abutments 310 from the face 313 is significantly less than the projection of ramped abutments 311 from the face 313. In an opening operation the projections 310 will clear the catch member 201 while the points of ramped abutments 311 hook under the catch members 201.

The tracks 109 of drum 104 terminate at their forward ends 320 to provide end faces against which the outward ends of catch members 201 butt with the drum hatch 108 closed.

The T-shaped pivot arms 200 are raised to a drum opening position by riding up the ramped abutments 311 of drum engaging flap 300. During drum opening the catch members 201 are raised clear of the end faces of track ends 320. After initiation of opening rotation of the drum with the drum hatch held in place by the flap 300 the outer ends of catch members 201 reside above the outer surface of tracks 109. In this condition they are held between the outer surface of tracks 109 and the face 313 of flap 300. In a circumferential direction of the drum they are blocked from movement in one direction by the ramped abutments 311 and in the other direction by the closing abutments 310. During the opening rotation of the drum the catch members 201 will tend to bear against the ramped abutments 311.

During a closing rotation of the drum, as illustrated in FIG. 33A, the catch members will tend to bear against the closing abutments 310. Once the drum hatch reaches a fully closed condition the catch members 201 will fall off the outer surface of tracks 109 under influence of the spring members 230 and the closing abutments 310 will run clear above them. If the hatch cannot close due to obstruction (for example in FIG. 33A) the catch member will remain trapped above tracks 109 and the door will remain coupled to the cabinet.

The flap 300 is moveable between an engaging position and a non-engaging position. The effect of the drum engaging flap 300 in the engaging position has been described above. In the non-engaging position the drum engaging flap 300 is pivoted to have its drum engaging end away from the surface of the drum.

To assist with retention of the drum engaging flap 300 in a position to pick up the catch members 201 during an opening sequence an arrangement is preferably provided for retaining the flap 300 close to the drum from a point shortly in advance of initial abutment with the catch members 201 and then throughout subsequent opening and closing until the catch members 201 are released with the drum lid fully closed. Referring to FIG. 33A this retaining arrangement may take the form of a laterally extending wing 3310 extending from each end of the flap 300 at a location to engage within the respective track 109. To provide pre-retention a short additional track section 3312 is provided on the outside of the drum aligned with track 109. The short section of track 3312 has an open end 3318 distal from track 109, for receiving entry of wing 3310 at the beginning of an opening rotation. The end 3314 proximal to track 109 is separated from the end 320 of track 109 by catch member receiving notch 3316. Catch member 201 sits within notch 3316 when the hatch is fully closed. The wing 3310 is sufficiently long to span the notch 3316 to ensure the flap 300 is not released as the wing passes the notch.

Figure 10:
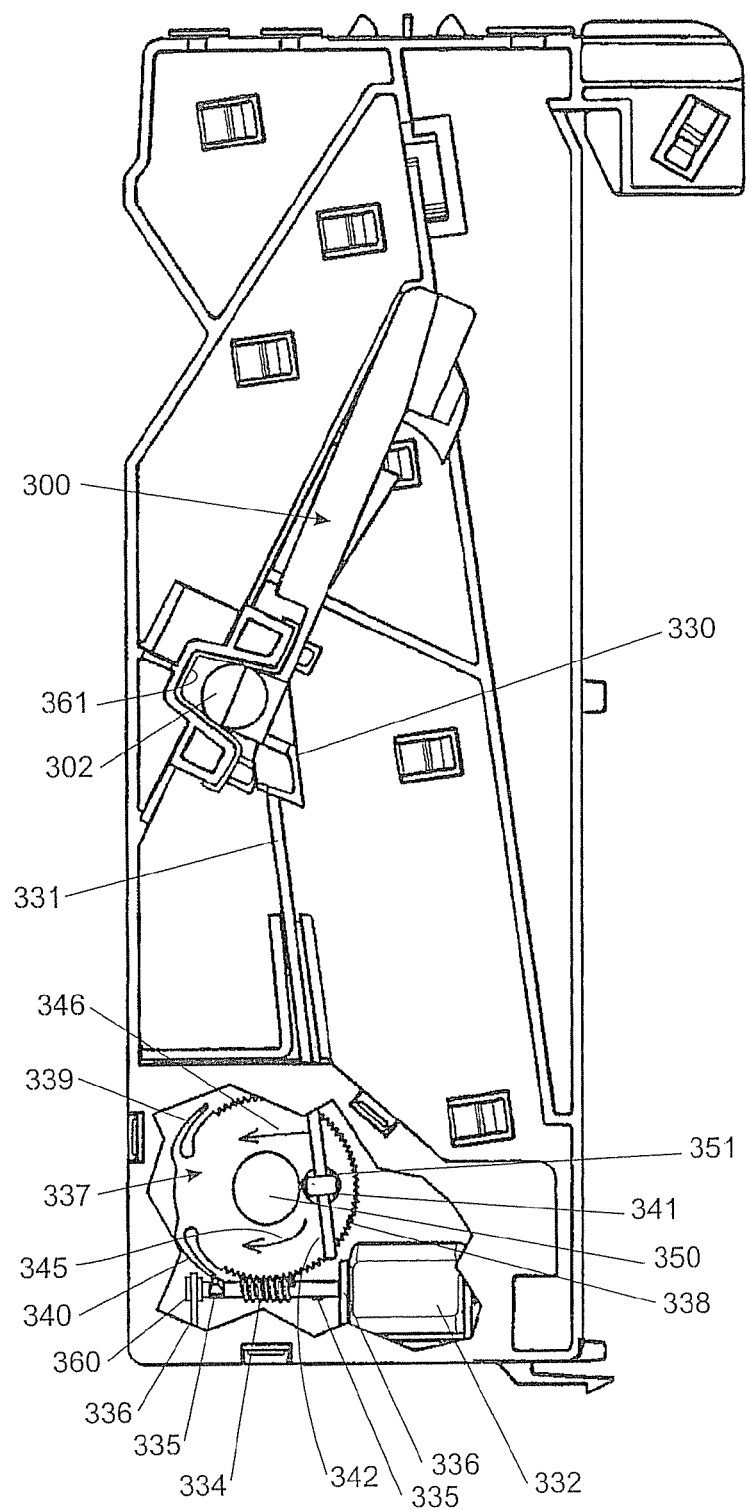
FIGS. 10 and 11 are side elevations of a drum hatch engaging assembly, with partial cutaway revealing an actuator mechanism.
Figure 11:
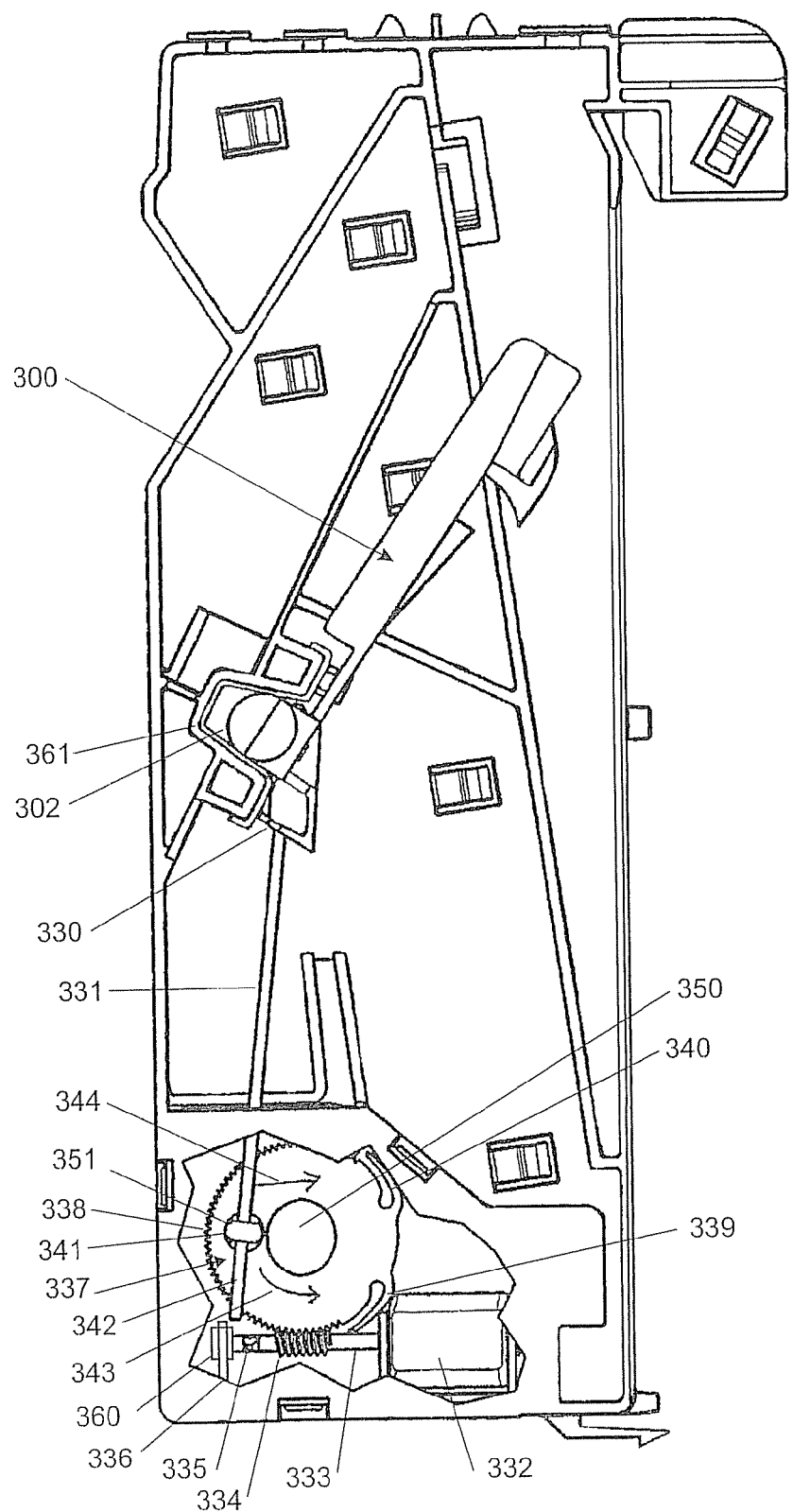

Pivoting of the hatch engaging flap 300 can be described with particular reference to FIGS. 10 and 11. The flap 300 is pivotally supported by stub ends 302 of pivot bar 301 and along the length of the pivot bar by support rail 361. The flap 300 includes a lever member 330. The lever member 330 extends from the flap 300 adjacent one end of the engaging member and from a point adjacent a pivot stub 302. An actuating rod 331 has one end connected with the lever member 330 in a moment resisting relationship. This connection may, for example, be by fitting within a pre-moulded channel or by overmoulding. The rod 331 has a distal end 342 that is moveable in a transverse direction (represented by arrows 346 and 344) by an actuator mechanism. The preferred actuator mechanism requires powered actuation in both movement directions.

The preferred actuation mechanism includes a worm drive gearbox with a first gear 337 rotatable about a hub 350 and including outwardly extending peripheral teeth 338. A drive gear 333 includes a spiral thread 334 engaged with teeth 338 of the first gear. The drive gear is supported between end support walls 336 and is driven by an electric motor 332.

To absorb vibration a rubber spacer (not shown) may be provided under the motor, lodged and compressed between the motor and the housing. Also to absorb vibration at least one of the ends of the drive gear 333 is supported within a resilient mounting in its respective support wall 336. For example, as illustrated, the far end may be supported within a bearing, such as in a seat or plastic bearing, with the bearing mounted within a rubber mounting board 360 fitted into an aperture in the wall 336.

The first gear 337 and/or the drive gear are formed so that in operation together a positive stop action is provided at either end of a drive envelope comprising less than a full turn of the first gear 337. The positive stop is provided by collision of drive gear structure with first gear structure when the first gear reaches either of its rotation limits. One preferred combination of drive gear and first gear structures is described below which absorbs the collision impact, but other structures are also envisaged to be within the scope of this invention. For example the spiral thread of the drive gear may have a square end at either end of the spiral in the first gear may lack expected teeth valleys at the requisite end stops. The square end of the spiral thread will collide against a respective face of the first gear when it reaches the unexpectedly missing valley.

Only a substantial proportion of the circumference of the first gear 337 includes peripheral teeth 338. Adjacent each end of the toothed portion of first gear 337 is an outwardly placed collision member 339, 340. The collision members 339, 340 have a greater radial extent than the peripheral teeth 338. The collision members 339 and 340 are preferably formed to provide flexibility adjacent the ends of the toothed portion 338 of the first gear 337. For example, collision members 339 and 340 preferably extend from the first gear 337 at a position circumferentially back from the toothed portion 338 of first gear 337 and extending in a circumferential manner, spaced from but parallel the form of first gear 337, to end adjacent the ends of toothed portion 338. Thus the ends of the collision members 339 and 340 may deflect somewhat under transverse pressure by flexing of the collision members.

Rotation of the first gear is stopped in either direction by collision of the respective collision member 339 or 340 with the drive gear. Preferably the drive gear includes protrusions from its shaft at positions displaced from the ends of spiral thread 334 and the collision of collision members 399 and 340 is with the protrusions 335 rather than with the spiral thread 334. Preferably these protrusions are non-annular and extend as a transverse lugs. Movement of the first gear is halted by the cessation of rotation of the drive gear on collision of the lugs 335 with the tips of collision members 339 and 340.

Cessation of rotation of the drive gear while the electric motor 332 is energised leads to a rapid and detectable increase in the motor current. The voltage applied to the motor may be removed upon detection of this increase in motor current although with some motor and power supply combinations this may not be necessary. In the preferred form of the invention the motor current is sensed by a one-bit digitisation circuit, as exceeding or not exceeding a threshold. An electronic controller switches off power supply to the motor as soon as the digitising circuit indicates the motor current has exceeded the threshold level.

Consequently the collision members 339 and 340 define the end limits of movement of the first gear 337. These end limits of movement are depicted in FIGS. 10 and 11 respectively. Rotation of first gear 337 in the direction of arrow 345 in FIG. 10 will, on completion of movement, lead to the position shown in FIG. 11. Rotation of first gear 337 in the direction of arrow 343 in FIG. 11 will, on completion, lead to the position to the FIG. 10.

A disc 341 is located in a circular aperture 351 in the body of first gear 337 opposite collision members 339 and 340. Actuation rod 331 extends through an aperture in a lug extending from disc 341. The lug is slidable along the collecting rod 331 and disc 341 is rotatable within its aperture 351 in the first gear 337.

In rotation of the first gear from the position shown in FIG. 10 to the position shown in FIG. 11 the disc 341 drags the distal end 342 of the actuation rod 331 from one side of hub 350 to the other in the direction of arrow 346. This rotates the actuation rod 331 about its end located in lever 330, thereby rotating lever 330 and hatch engaging flap 300 about pivot stubs 302.

In the reverse movement of first gear 337, between the conditions in FIG. 11 and the condition in FIG. 10, the distal end 342 of connecting rod 331 is dragged in the direction of arrow 344, causing rotation of the hatch engaging flap 300 from its engaging position to its non-engaging position.

Controller

Figure 12:
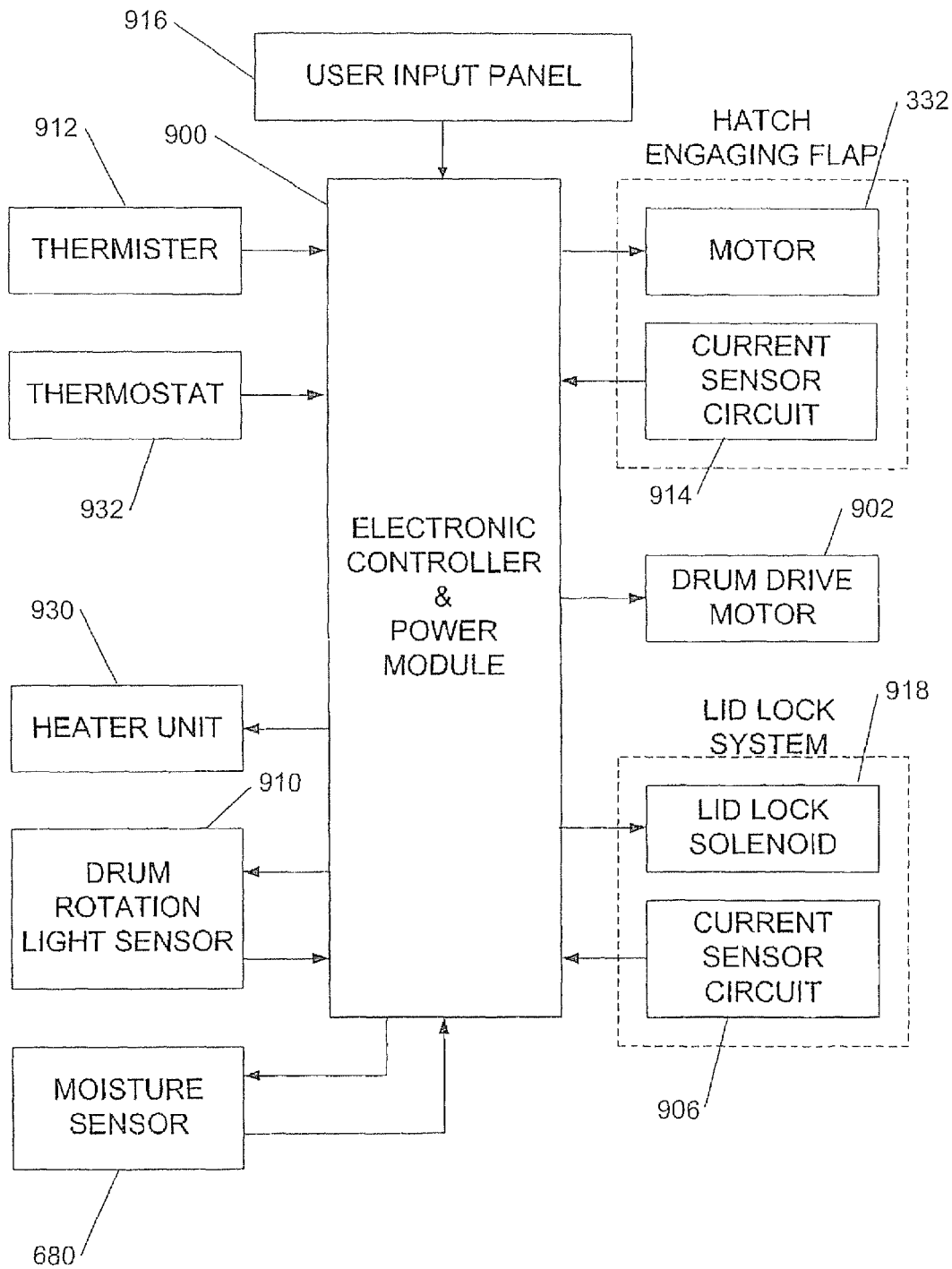
FIG. 12 is a block diagram of the control system of the dryer according to the preferred embodiment of the present invention.

Referring to FIG. 12 the clothes drier of the present invention includes an electronic controller 900 programmed to control operations of the machine in response to user inputs and sensor input. The electronic controller is physically embodied as a PCB mounted electronics module 139 in FIG. 1. In particular, the controller 900 controls the rotational speed and direction of the drum drive motor 902, energization in either direction of the hatch engaging member door actuator motor 332, activation and deactivation of a lid lock solenoid 918 and activation of a heater 930 (whether gas or electric element). The controller receives user inputs from user input panel 916, these inputs generally setting requested drying cycle operating conditions (eg: start time, cycle time, requested dryness and operating temperature) and operative controls (eg: start, stop, pause and enter cool down mode). The controller 900 receives additional inputs from current sensing circuit 906 sensing current through lid lock solenoid (which indicates whether or not the lid is closed), moisture sensor 680, a current sensing circuit 914 sensing the current through the motor 332, the output of a light sensor 910, the output of a thermistor 912 indicating the temperature in the drum, the output of a thermostat 932 detecting excessive temperature in the drum, and any monitoring outputs of the installed heater unit.

General drying operation of the dryer will not be described in detail. Once the dryer is in an operating mode the preferred operating mode involves appropriate cycling of the drum rotation through sequences of rotation in one direction with heat applied to incoming air followed by a briefer period of rotation in another direction without heat applied (or with heat applied at a lesser rate) generally for disentanglement proposes. In particular it is preferred that heat is only applied when the drive motor is driving the fan in its more efficient direction. If separate drive motors are employed to drive the drum and drive the fan then application of heat to the incoming air may be effected entirely independently of the drum rotation direction.

Moisture sensing of items in a drying load by resistance sensing between a pair of conductive contacts is also known in the art and will not be described in detail. Preferably the controller enters the dryer into a cool down mode (where the drum is rotated and air flow applied without heat) when the sensed moisture content is less than or equal to a moisture content corresponding with the user selected level. It will be appreciated that other methods of detecting moisture content (for example air outlet temperature profiles and air outlet moisture levels) may be used, and in all cases user selected moisture levels may correspond with raw or processed sensor levels rather than any absolute moisture content. Lid locks and operation thereof in conjunction with a lid sensing circuit are also well known in the art (particularly of top loading washing machines) and will not be described herein. Needless to say the controller institutes a lock out on operation of the machine in the absence of the sensor indicating the lid to be in a closed condition, and maintains the lid lock in a locked condition throughout operation.

Preferred methods of operation of the dryer through drum opening and drum closing operations, and through an initialisation procedure on power up, form aspects of the present invention and accordingly the preferred embodiment thereof will be described in detail with reference to the Figures.

General Operations

The opening and closing operations of the dryer and an initialisation procedure each include speed controlled operation of the drum to and/or from known rotational positions and actuation of the drum hatch engaging flap between retracted and extended positions.

Drum position is sensed via the light sensor 910. Referring in particular to FIGS. 5a and 5b drum end 726 includes an annular array of dimples 950 pressed out of the face thereof. At least the periphery of these dimples scatters light from the adjacent light sensor 910 during rotation of the drum. The dimples 950 are regularly spaced apart, with a single dimple missing from its expected position in the annular array. A position monitoring algorithm increments or decrements (depending on drum rotational direction) a drum position variable with the passing of each dimple. A missing dimple detection loop checks for the long unbroken signal indicating the missing dimple, incrementing or decrementing the position variable to account for the missing dimple and using this detection to reset the position variable when required. Position readings are therefore taken from the position from the missing dimple as datum, which is a known rotational position relative to the other physical features of the drum, such as opening and closing edges of the drum opening.

It is not necessary that the controller monitor drum position throughout normal drying operation, as drum position may be re-established within one full rotation of the drum when necessary for an opening operation.

The drum drive motor is preferably a standard AC induction motor. The drum drive motor speed is controlled for opening and closing operations by chopping the applied AC voltage with a variable duty cycle to vary the effective applied AC voltage. The drum speed may be continuingly sensed via the light sensor. The periodic interruption of the received light at the light sensor by the scattering of light from the drum end dimples is detected. The rate of interruption is directly proportional to the drum speed in a known relationship. The controller determines the relationship between the drum speed and the required drum speed for the opening operation by monitoring this interruption rate and feedback controls the chopping duty cycle to maintain the drum speed at or close to the desired drum opening speed.

Alternatively the drum drive motor may be speed controlled by a variable frequency inverter operating from a rectified power supply.

Where necessary the controller determines that the drum is still rotating by the continued periodic interruption of the light sensor signal. The timer detecting interruption intervals for the missing dimple detection loop also indicates a ceasing of drum rotation as soon as the elapsed time since the last signal interruption exceeds a predetermined threshold. The threshold may be a predetermined time period or derived from previous interruption intervals.

For drum engaging flap actuation, operation of the actuator motor has already been described, including detection of end points by current sensing of the actuator motor drive currents. In addition, during actuation of the actuator drive motor the controller tracks the elapsed time between initiating energisation of the actuator motor and the motor becoming stalled. The controller routinely checks this elapsed time against an expected range. An elapsed time outside the expected range indicates the possibility of incomplete activation of the hatch engaging flap.

Operation of Dryer through a Drum Opening Operation

Figure 15:
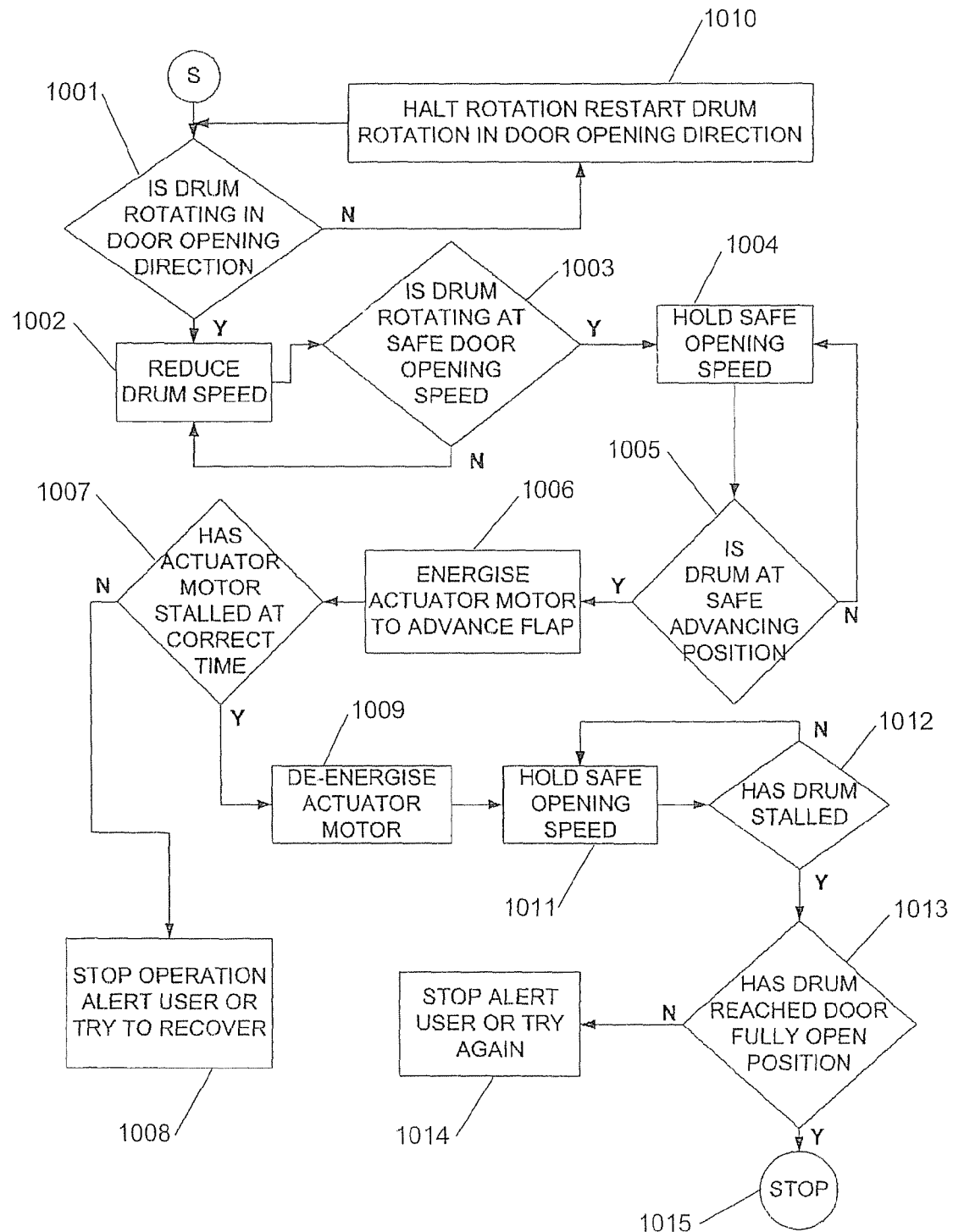
FIG. 15 is a flow diagram showing the sequence of operations of the drum opening method according to one aspect of the present invention.

The drum opening operation will be described with particular reference to FIGS. 12 and 15 and the sequence of cross sections, FIGS. 6 to 9.

A drum opening operation is generally performed at the termination of a drying cycle. At the beginning of the drum opening operation the drum is generally rotating at operating speed. At step 1001, the controller determines whether the drum is rotating in the door opening system. If the drum is rotating forwards (anti-clockwise in FIG. 6) then at step 1010 the controller halts rotation of the drum and restarts rotation in the reverse direction (clockwise in FIG. 6). Once it is determined at step 1001 that the drum is rotating in the correct direction then drum opening can begin.

At step 1002 the controller reduces the drum drive motor speed. Rotational speed is determined at step 1003, and further reduced at step 1002 until the speed of the drum reaches a safe drum opening speed. The controller then continues rotation at reduced speed until the loop of steps 1004 and 1005 determines that the drum has reached a rotational position that is a safe drum position for extending the drum hatch engaging flap. Preferably this position is set so the hatch engaging member will reach full extension with the drum so that the drum is not required to rotate through more than a short distance at low speed before the drum hatch is engaged.

At step 1006 the controller energises the actuator motor 323 to rotate the drum hatch engaging flap into its engaging position with the external edge of the ramped abutment teeth sliding on the surface of the drum skin. At step 1007 the controller detects the moment when the first gear arm 339 collides with the drive gear lug 335, by the increase in current in actuator motor 323. The controller times the interval between beginning energisation at step 1006 and stalling of the actuator motor and determines at step 1007 whether the interval is within an expected range. If the interval is within the expected range the controller de-energises the hatch engaging member motor at step 1009 and continues on its procedure. If the interval is outside an expected range this indicates possibility of a fault and at step 1008 the controller either ceases machine operation and indicates an alert or enters a recovery routine.

Figure 7:
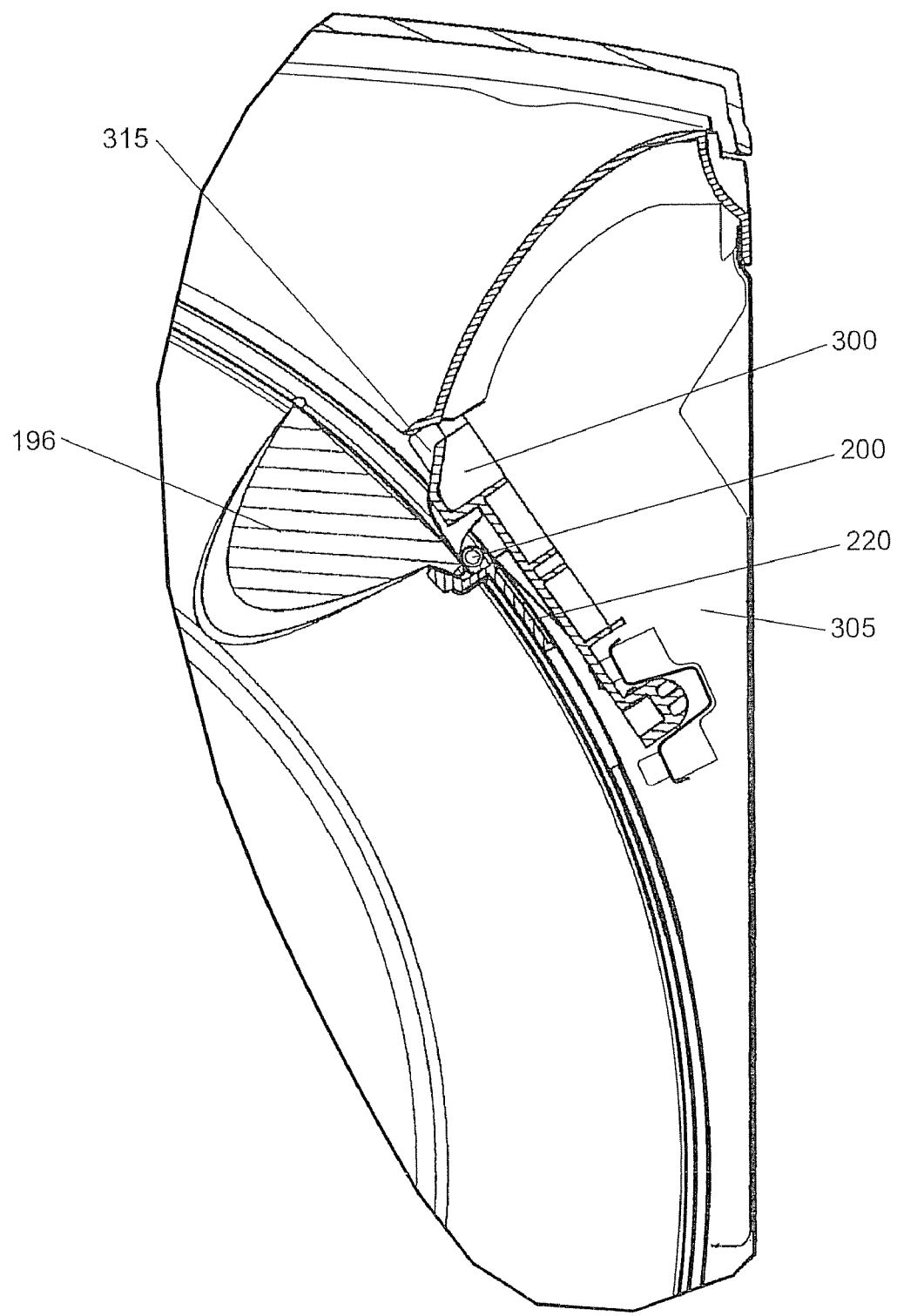
FIG. 7 is a cross sectional side elevation (from the left side) through a clothes dryer according to the preferred embodiment of the present invention, the position corresponding to the start of a drum opening operation or the conclusion of a drum closing operation.

This extended position of the drum engaging flap is depicted in FIG. 7, immediately as the rotation of the drum has advanced the leading edge of the hatch to meet the ramped abutments of the drum hatch engaging flap. The leading points of the ramped abutment teeth slide under the catch members 201 of the T shaped pivoting arms by further rotation of the drum until they are tucked up against the connecting face 313 of the flap. At this point no more forward movement of the catch members 201 is possible relative to the hatch engaging flap and accordingly movement of the hatch is halted but the drum continues to rotate. The catch members 201 riding up the edges of the ramped abutments also lifts the catch members from adjacent the drum surface. Further rotation of the drum relative to the hatch brings the catch members 201 above the hatch holding side channels. The catch members 201 are thus maintained in a pivoted out condition by the side channels while the drum is open or partially open. As described with reference to FIG. 33A lateral wings of the drum engaging flap slot into the side channels 109 to retain and support the flap in position through the drum opening and closing operations.

Referring again to FIG. 15, at a loop of steps 1011 and 1012 the controller continues to energise the drum drive motor to rotate the drum at the drum opening speed until such time as halting of rotation of the drum is detected by the controller at step 1012.

The controller continues to monitor the rate of interruptions of the light sensor signal to determine at step 1012 the instant when the drum ceases rotation. The controller may also be configured with a current sensing circuit to monitor the motor current to determine cessation of motor rotation by a rapid increase in motor current.

Rotation of the drum is eventually halted by an abutment on the underside of the hatch engaging flap 300 coming to rest against a halting abutment protruding from the outer surface of the side channel 109.

As soon as the controller detects halting of rotation of the drum at step 1012 it de-energises the drum drive motor. At step 1013 the controller determines whether the drum has reached a door fully open position from its current drum position calculation. If it is the controller stops operation of the machine and disengages the lid lock at step 1015. If the controller determines that the drum has not reached a door open position then at step 1014 the controller stops operation of the machine and indicates an alert or enters a recovery mode.

The controller may apply a mechanical or electrical brake to maintain the drum in its open position. The brake may for example comprise connecting a substantial electrical resistance across the windings of the drum drive motor.

Operation of Dryer through a Drum Closing Operation

The drum closing operation is largely the reverse of the drum opening operation. It will be described with reference to FIGS. 12 and 16 and the sequence of cross sections 9 to 6.

Prior to closing the drum in a drum closing operation the controller energises the lid lock solenoid at step 1020 and confirms at step 1022 that the lid lock has successfully activated. If the lid lock has not successfully activated then the lid lock solenoid is de-energised at step 1024 and a user alert is activated.

Once the lid lock has been successfully activated the closing operation proceeds to a drum slow closing loop comprising steps 1026, 1028 and 1030.

At step 1026 the controller energises the drum drive motor to rotate the drum in the drum closing direction at a drum closing speed.

The controller continues to energise the drum drive motor to rotate the drum at the drum closing speed until the drum is past a door closed position, detected at step 1030.

Between steps 1026 and 1030 in each loop the controller, determines that the drum is still rotating at step 1028. If it detects the drum has stalled then the controller executes an error catching operation, beginning with halting rotation of the drum by de-energising the drum motor at step 1032. The controller then executes a drum opening loop comprising steps 1034 and 1036. At step 1034 the controller energises the drive motor to rotate the drum in a door opening direction at a door opening speed, detecting completion of the opening operation at step 1036 by non rotation of the drum. Once the remedial drum opening operation is completed operation of the machine is stopped at step 1038 and a user alert is activated. Alternatively the controller may be configured to return to step 1026 and retry the closing operation.

Once it determines that it has reached the closed position at step 1030 the controller energises the actuator motor 323 at step 1040, in a reverse direction to withdraw the drum engaging flap to its disengaged position. At step 1042 the controller detects stalling of the actuator motor and compares the elapsed motor actuation time with an expected range. If the elapsed time is outside the expected range the controller ceases machine operation at step 1046 and activates a user alert. Alternatively the controller may be configured to initiate a recovery operation. If the elapsed time is within the expected range then at step 1044 the controller de-energises motor 323 at step 1044. The controller then begins operation in a drying cycle at step 1048, including accelerating the drum to normal operating speed by ceasing chopping of the driving voltage of the drum drive motor.

Therefore in the drum closing operation the drum starts from rest and is rotated in a forward direction (anti-clockwise in FIG. 9) while the hatch is held stationary by the engaging flap. Rotation of the drum continues at the drum closing speed (preferably the same as the drum opening speed) until the leading edge of the vane forming the rear edge of the drum opening reaches the leading edge of the drum hatch. As it does so the catch members 201 drops from the outer surface of the side tracks at the notch adjacent the leading edge of the drum vane, drawn to that position by the spring members 230. This releases the drum hatch from the drum hatch engaging flap. The drum hatch is secure from sliding from its closed position, in one direction by the catch members 201 being unable to pass the ends of the side tracks, and in the other direction by the leading edge 182 being against the leading edge of the drum vane.

If, as in FIG. 33A, anything is interposed in the opening during closing of the drum the catch members 201 do not reach the notch and therefore remain on the outer surface of the side tracks and held by the closing abutments of the door 300. Accordingly the hatch remains coupled to the stationary cabinet and rotation of the drum is halted by abutment against the hatch. The controller detects halting of the drum and rotates the drum to reopen so that a user may remedy the situation.

Initialisation Procedure

Generally the controller is active even when the drying appliance is not operating. In its soft powered down mode the controller continues to retain in memory a record of the current drum position and hatch engaging flap position. However these position records are lost if the appliance is hard powered down, for example due to a power supply failure or being switched off at the wall or being unplugged, including on initial installation.

Figure 17A:
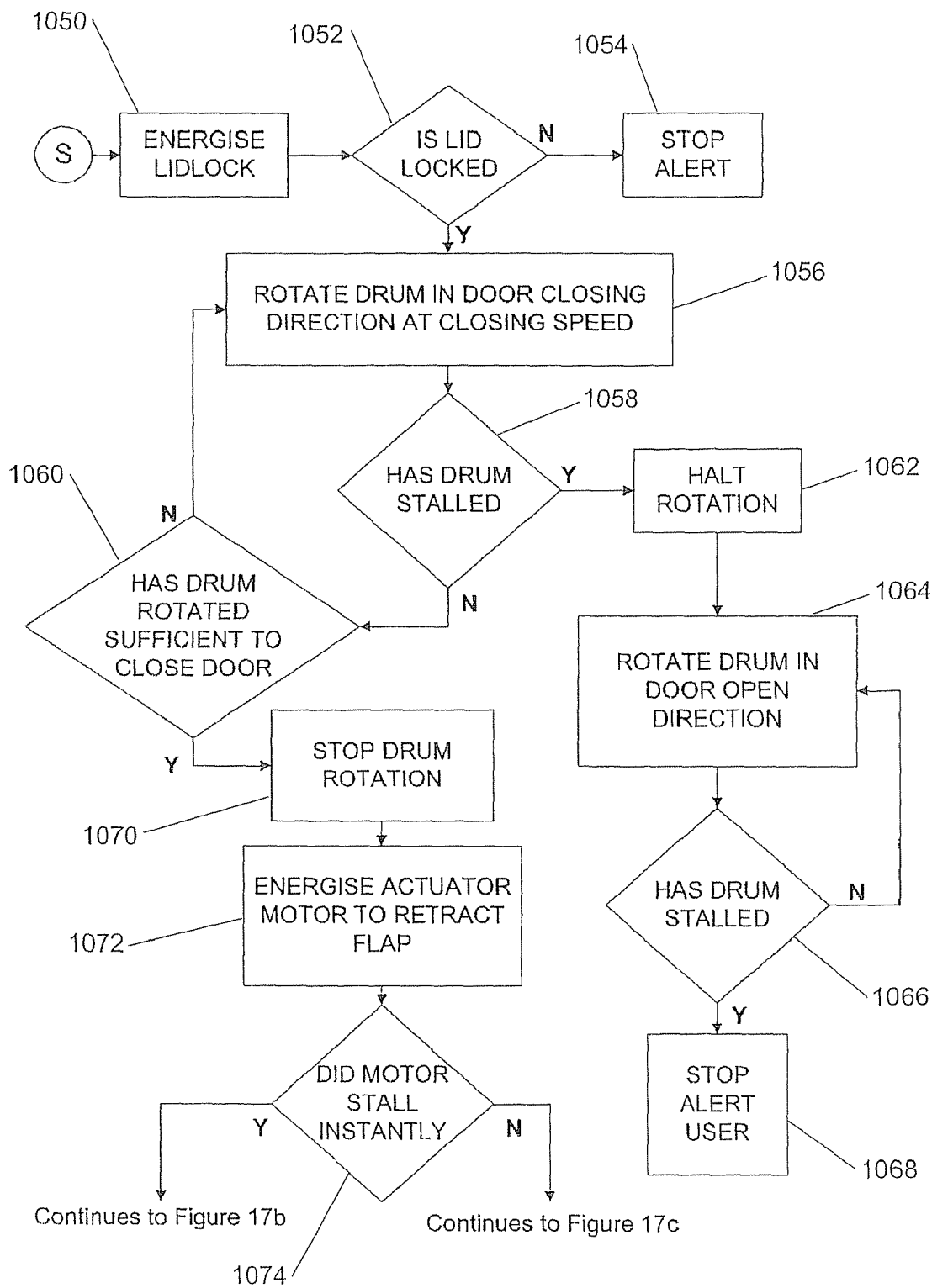
FIG. 17a to 17c are a flow diagram showing the sequence of operations of an reinitialization procedure according to one aspect of the present invention.
Figure 17B:
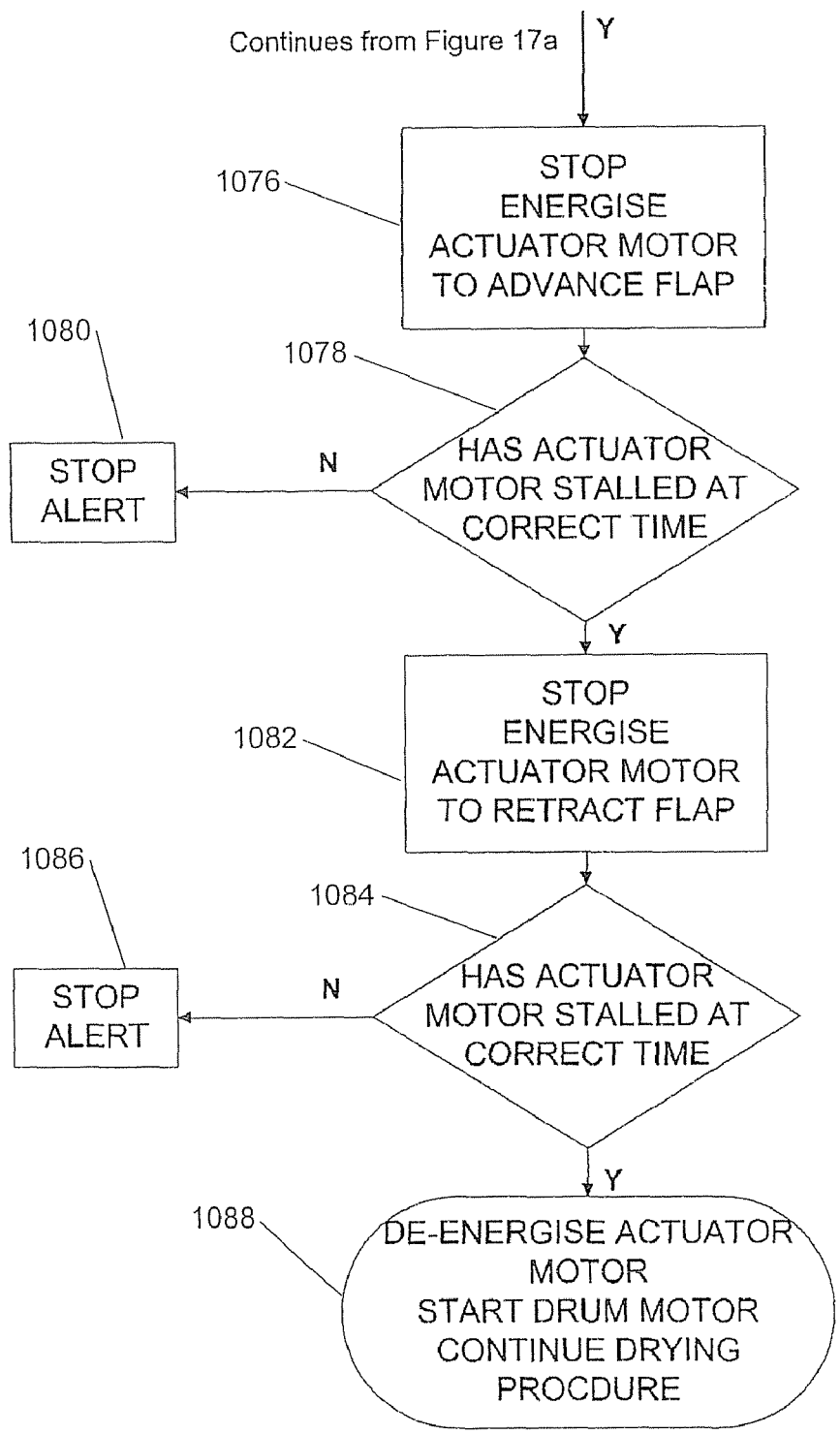
Figure 17C:
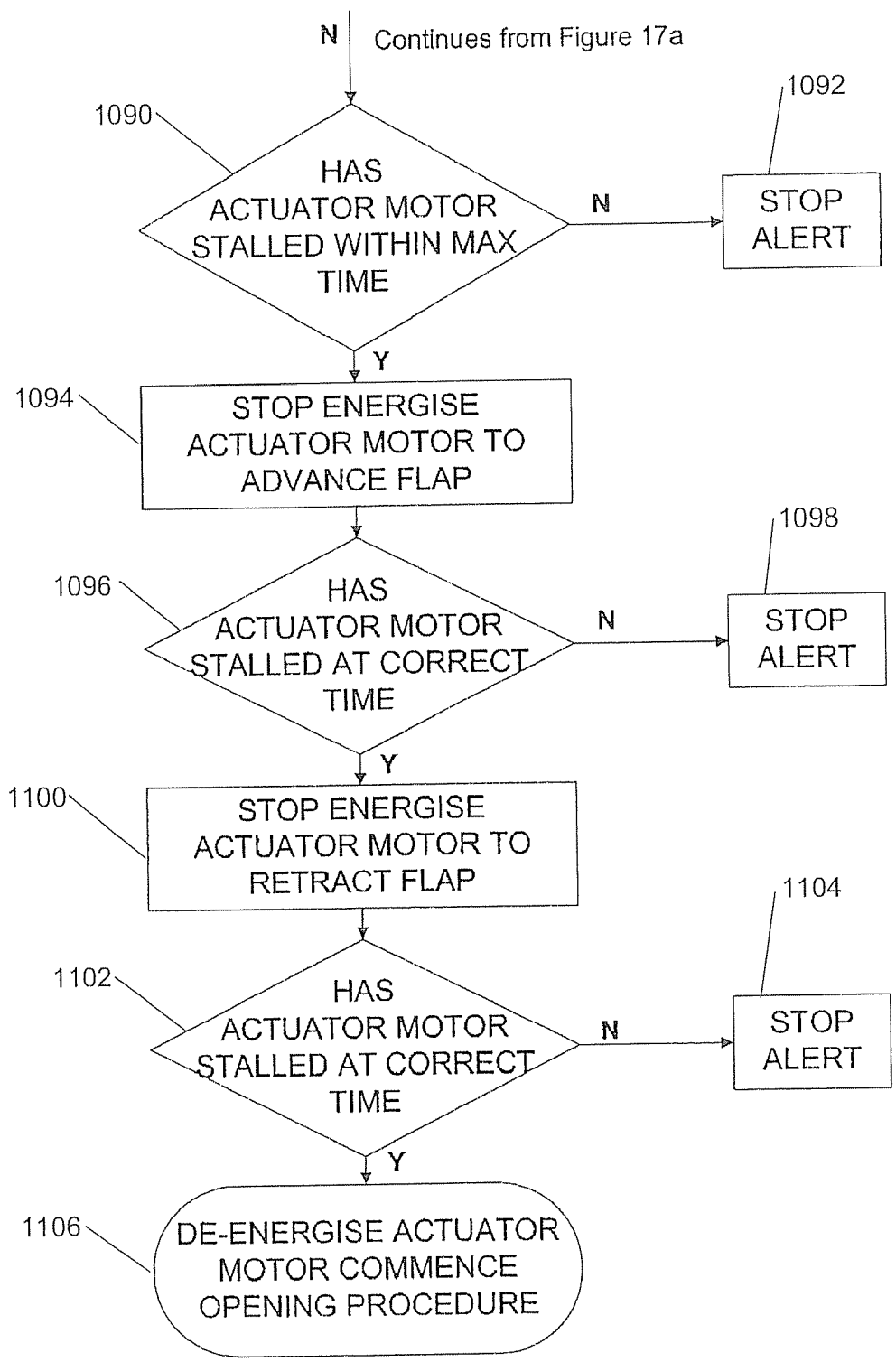

To establish correct status values for the appliance after a hard reset the controller progresses through an initialisation procedure. The initialisation procedure is illustrated in FIG. 17.

Figure 16:
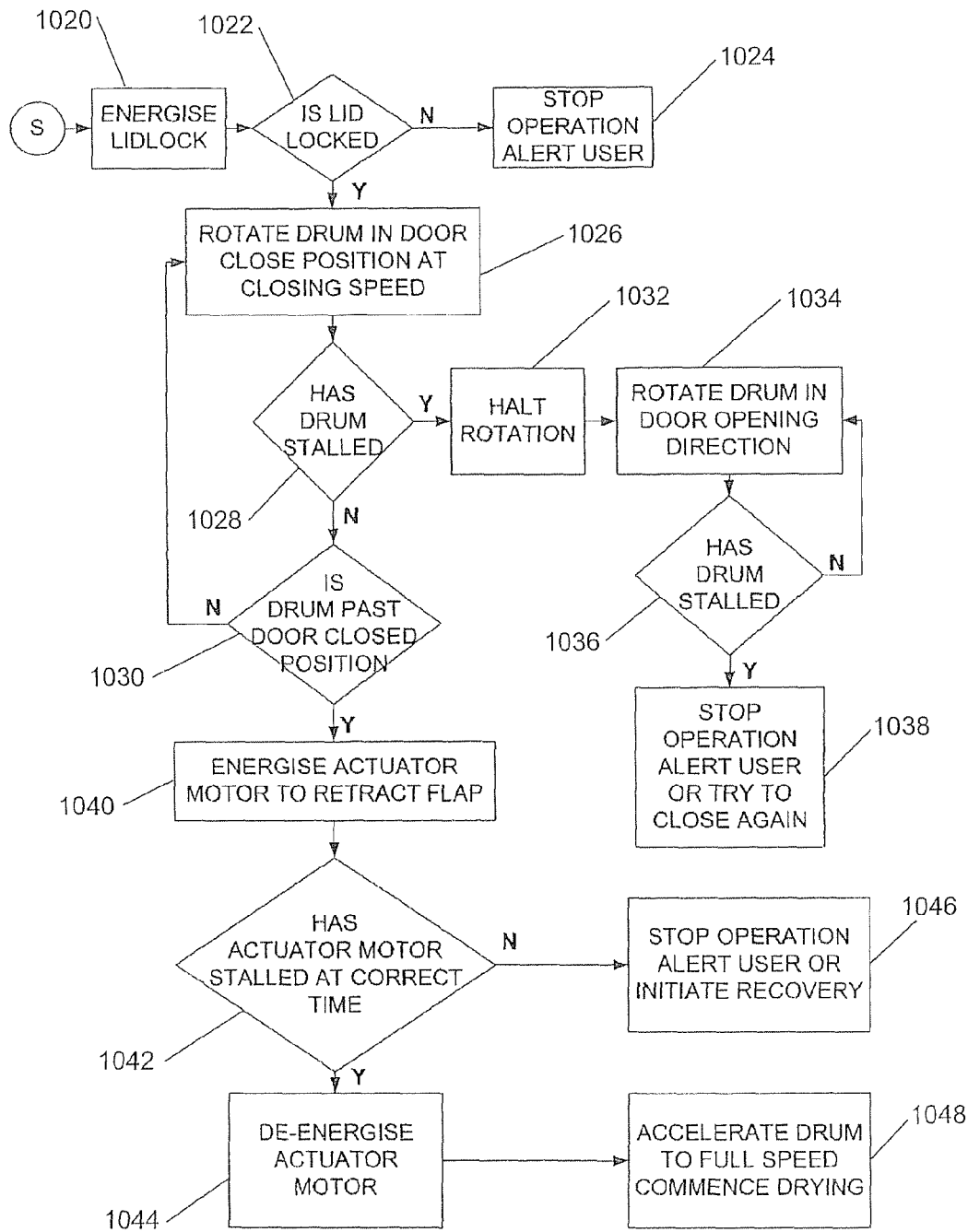
FIG. 16 is a flow diagram showing the sequence of operations of the drum closing method according to one aspect of the present invention.

The initialisation procedure begins with a drum closing operation substantially in accordance with steps 1020 to 1038 of FIG. 16.

In particular at step 1050 the controller energises the lid lock solenoid, and checks correct activation of the lid lock at step 1052, stopping operation and activating a user alert at step 1054 if the lid lock has not engaged. If the lid lock has properly engaged then the controller begins a drum closing loop of steps 1056, 1058 and 1060. Step 1060 differs from step 1030 of the normal closing operation in that it detects only that the drum has rotated a sufficient rotational angle to have fully closed the door if the door had been fully open. If the controller detects at step 1058 that the drum has stalled, before determining at step 1060 that the drum has rotated a sufficient angle to have closed the door, then it halts rotation of the drum at step 1062 and initiates a drum opening loop of steps 1064 and 1066. It initiates rotation of the drum in a door opening direction in step 1064 until determining the drum as stalled at step 1066 at which time it stops machine operation and activates a user alert at step 1068.

If the controller determines at step 1060 that the drum has rotated sufficient distance to have closed the door then at step 1070 the controller de-energises the drum drive motor at step 1070. The assumption is made that the drum is now in a closed condition irrespective of its starting condition.

At step 1072 the controller energises the hatch engaging flap actuator motor in a rotational direction to retract the hatch engaging flap. At step 1074 the controller determines if the actuator drive motor stalls within a short period, essentially instantly, and if so proceeds to a sub routine of steps 1076 to 1088.

If the motor did not stall instantly then at step 1090 the controller determines whether the actuator motor stalls within a present maximum time. If not then at step 1092 the controller stops operation of the machine and activates a user alert. If the actuator motor has stalled within a maximum time then at step 1094 the controller stops energisation of the actuator motor and re-energises the actuator motor in a direction to advance the drum hatch engaging flap. At step 1096 the controller determines whether actuator motor stalls within an expected elapsed time range, if not proceeding to step 1098, stopping machine operation activating a user alert. If the controller determines at step 1096 that the hatch engaging member motor has stalled with the elapsed time within the expected range then at step 1100 the controller stops energisation of the actuator motor, and re-energises the actuator motor in a direction to retract the drum hatch engaging flap, detecting at step 1102 whether the actuator motor stalls with an elapsed time within the expected range. If the controller detects at step 1102 that the elapsed time is outside the expected range then at step 1104 the controller stops operation of the machine and activates a user alert. Otherwise at step 1106 the controller commences an opening operation in accordance with FIG. 15.

If at step 1074 the controller determines that upon initial energisation the actuator motor stalled instantly, then at step 1076 the controller stops energisation of the actuator motor and re-energises the actuator motor in a direction to advance the drum hatch engaging flap. The controller determines at step 1078 whether the elapsed time between energising the actuator motor at step 1076 and the motor stalling falls within an expected range. If not, the controller stops operation of the machine at step 1080 and actuates an user alert. If at step 1078 the elapsed time was within the expected range then at step 1082 the controller stops energisation of the actuator motor and re-energises the actuator motor in a direction to retract the drum hatch engaging flap. At step 1084 the controller determines whether the elapsed time between energising the actuator motor at step 1082 and the motor stalling is within an expected range. If not then at step 1086 the controller stops operation of the machine and activates a user alert. Otherwise at step 1088 the controller de-energises the actuator motor, and commences a drying procedure including energising the drum drive motor at a normal operating speed. Automatically commencing a drying operation if the initialisation process indicated a closed drum position with hatch engaging member retracted may be a user option set in non volatile memory. It is a useful option which ensures that operations interrupted by power cut are completed without user intervention.

The invention claimed is:

1. A clothes drying appliance comprising:
a base structure,
a drum, having at least one drum end, and
an aperture forming an air outlet of said drum in said drum end,
a drum support structure supporting said drum for rotation,
a movement interface between said drum support structure and said base structure,
an outlet duct supported on said drum support structure and having an inlet end sealingly connected with said air outlet of said drum, and an outlet end, said outlet duct stationary when said drum is rotating, in use air drawn from inside said drum through said air outlet and into said inlet end, and
an exhaust duct connected with said base structure, said exhaust duct having an outlet port outside said base structure and an inlet port,
said drum support structure, said drum and said outlet duct movable between an operating position on said base structure, and a maintenance position where said drum, said drum support structure and said outlet duct are moved forward from said base structure,
said movement interface adapted to move said drum support structure, said drum and said outlet duct between said operating position and said maintenance condition,
said outlet end of said outlet duct positioned to sealingly mate with said inlet port of said exhaust duct with said drum support structure in said operating position.

2. A clothes drying appliance as claimed in claim 1 wherein said base structure is a cabinet or surround structure.

3. A clothes drying appliance as claimed in claim 1 wherein said drum support structure pivots about a forward lower edge of said base structure and said exhaust duct is located adjacent the rear lower edge of said base structure.

4. A clothes drying appliance as claimed in claim 3 wherein said outlet duct includes a fan housing adjacent said outlet end and an outlet of said fan housing is positioned on said inlet port of said exhaust duct at least in said operating position.

5. A clothes drying appliance as claimed in claim 1 wherein at least one of said outlet duct and said exhaust duct include a peripheral flange portion for butting against a flange or end face of the other said duct.

6. A clothes drying appliance as claimed in claim 5 wherein at least one of said peripheral flange portion and said flange or end face includes a soft or resilient sealing layer thereon.

7. A clothes drying appliance as claimed in claim 5 wherein said outlet duct includes an upstand wall around at least a lower part of said outlet end, said upstand wall dimensioned and positioned to fit within said exhaust duct inlet port with movement of said drum support structure into said operating position.

8. A clothes drying appliance as claimed in claim 5 wherein said exhaust duct includes an upstand wall extending from around at least the upper portion thereof and dimensioned and positioned to extend into the said outlet end of said outlet duct with said drum support structure moved into said operating position.

9. A clothes drying appliance as claimed in claim 8 wherein said upstand wall of said exhaust duct and said upstand wall of said outlet duct together encompass the entire perimeter of the mated openings, providing an interleaved connection therebetween around said perimeter.

10. A clothes drying appliance as claimed in claim 5 wherein said exhaust duct includes an upstand wall extending from around at least the upper portion thereof and dimensioned and positioned to extend into said outlet end of said outlet duct with said drum support structure moved into said operating position.

11. A clothes drying appliance as claimed in claim 1 wherein said drum support structure includes at least a pair of horizontally extending and spaced apart parallel connecting members, and
   a motor drive support member connected along one side with a first one of said pair of parallel connecting members and along another side with a second one of said pair of parallel connecting member.

12. A clothes drying appliance as claimed in claim 11 wherein said motor drive support member includes a first half fan housing, and
   said clothes drying appliance also includes a second half fan housing is connected with said first half fan housing to provide a complete fan housing with an air inlet opening at one side connected with, and forming part of, said outlet duct in use, and a fan shaft opening at its other side.

13. A clothes drying appliance as claimed in claim 12 wherein said motor drive support member includes a motor well defined at least in part by a pair of end walls, each said end wall including a bearing receiving recess, one said end wall forming a side wall portion of said first half of said fan housing.

14. A clothes drying appliance as claimed in claim 13 wherein said clothes drying appliance further comprises a motor mounted in said motor well, and motor includes a drive shaft extending from each end thereof beyond said end walls, one said end projecting into said fan housing and the other said end including a main drum drive pulley mounted thereon.

15. A clothes drying appliance as claimed in claim 14 wherein said appliance includes a belt tensioning device including a yoke extending around said drive pulley, a support for said yoke which enables pivoting and sliding movement of said yoke in relation to said drive pulley, a pair of spaced apart tensioning pulleys, each having an axis of rotation substantially parallel with the axis of rotation of said drive pulley, with the line between the centres of said tensioning pulleys separating said drive pulley from said drum, said tensioning pulleys spaced sufficiently close to impinge upon the path of a belt which passes around said pulley and said drum, and
   a biasing agent pressing said pulleys toward said drum.

\* \* \* \* \*

UNITED STATES PATENT AND TRADEMARK OFFICE
CERTIFICATE OF CORRECTION

| | | |
|---|---|---|
| PATENT NO. | : 7,762,007 B2 | |
| APPLICATION NO. | : 11/739484 | |
| DATED | : July 27, 2010 | |
| INVENTOR(S) | : Allen James Guinibert et al. | |

It is certified that error appears in the above-identified patent and that said Letters Patent is hereby corrected as shown below:

Column 31, Line 19 Claim 12 "fan housing is connected" should read -- fan housing connected --

Signed and Sealed this
Eighth Day of February, 2011

David J. Kappos
*Director of the United States Patent and Trademark Office*